US012712922B1

(12) United States Patent
Neldon

(10) Patent No.: US 12,712,922 B1
(45) Date of Patent: Aug. 18, 2026

(54) EFFICIENT MANAGEMENT OF ANALYTICS IN ANALYTICS MANAGEMENT SERVICE

(71) Applicant: Cisco Technology, Inc., San Jose, CA (US)

(72) Inventor: Brian Neldon, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/426,845

(22) Filed: Jan. 30, 2024

(51) Int. Cl.
*H04L 9/40* (2022.01)

(52) U.S. Cl.
CPC ........ *H04L 63/205* (2013.01); *H04L 63/1425* (2013.01); *H04L 2463/121* (2013.01)

(58) Field of Classification Search
CPC ............... H04L 63/205; H04L 63/1425; H04L 2463/121
See application file for complete search history.

(56) References Cited

U.S. PATENT DOCUMENTS 7,937,344 B2 5/2011 Baum et al.
8,112,425 B2 2/2012 Baum et al.
8,751,529 B2 6/2014 Zhang et al.
8,788,525 B2 7/2014 Neels et al.
9,215,240 B2 12/2015 Merza et al.
9,286,413 B1 3/2016 Coates et al.
10,127,258 B2 11/2018 Lamas et al.
2019/0098106 A1 3/2019 Mungel et al.
2021/0117251 A1* 4/2021 Cristofi ................. G06F 21/554
2021/0136120 A1* 5/2021 Crabtree ............. G06F 16/9024
2023/0120915 A1* 4/2023 Scott ....................... H04L 63/20 726/22
2024/0267403 A1* 8/2024 Birsan ..................... G06F 21/56
2025/0061209 A1* 2/2025 Wang ...................... H04L 9/008
2025/0097244 A1* 3/2025 White .................. H04L 65/102

OTHER PUBLICATIONS

Splunk Enterprise 8.0.0 Overview, available online, retrieved May 20, 2020 from docs.splunk.com.
Splunk Cloud 8.0.2004 User Manual, available online, retrieved May 20, 2020 from docs.splunk.com.

(Continued)

*Primary Examiner* — Amir Mehrmanesh
*Assistant Examiner* — Thomas A Gyorfi
(74) *Attorney, Agent, or Firm* — Shook, Hardy & Bacon L.L.P.

(57) ABSTRACT

Embodiments described herein are directed to facilitating efficient management of analytics. In one embodiment, data representing an event associated with a tenant is obtained. Based on the tenant, an analytics pipeline corresponding to the tenant is accessed. The analytics pipeline may include a sequence of analytic indicators referencing a set of cybersecurity analytics, from among cybersecurity analytics in an analytics pool, desired for use in analyzing the data representing the event. The set of cybersecurity analytics, referenced by the analytic indicators in the analytics pipeline, is applied to the data to produce an analytic result. In embodiments, each cybersecurity analytic in the analytics pool is configured to detect a cybersecurity-related anomaly or threat. In accordance with detecting an analytic result, the analytic result, or data associated therewith, is provided to an external user computer system.

20 Claims, 15 Drawing Sheets

(56) References Cited

OTHER PUBLICATIONS

Splunk Quick Reference Guide, updated 2019, available online at https://www.splunk.com/pdfs/solution-guides/splunk-quick-reference-guide.pdf, retrieved May 20, 2020.
Carraso, David, "Exploring Splunk," published by CITO Research, New York, NY, Apr. 2012.
Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

* cited by examiner

302

302A 127.0.0.1 – eva [10/Oct/2000:13:55:36-0700] "GET/apache.gif HTTP/1.0" 200 2326 0.0947
127.0.0.1 – emerson [10/Oct/2000:13:56:36-0700] "GET/eastwood.gif HTTP/1.0" 200 2980 0.0899

302C 302B 127.0.0.3 – eliza [10/Oct/2000:13:57:36-0700] "GET/ezra.gif HTTP/1.0" 200 2900 0.0857
[Sunday Oct 10 1:58:33 2010] [error] [client 127.10.1.1.015] File does not exist: /home/emmeline/pub_html/images/alisia.gif 302E 302D 91.205.189.15 - - [28/Apr/2014:18:22:16] *GET /oldlink?itemId=EST-14&JSESSIONID=SD6SL7FF7ADFF53113 HTTP 1.1" 200 1665 "http://www.buttercupgames.com/oldlink?itemId=EST-14" "Mozilla/5.0 (Windwos NT 6.1; WOW 64) AppleWebKit/536.5 (KHTML, like Gecko) Chrome/19.0.1084.46 Safari/536.5" 159

304 docker: {
container_id: f7360a148a670c4c257f4ee024be81284b6017d72ae41ea8ee5d
}
kubernetes: {
container_name: kube-apiserver
host: ip-172-20-43-173.ec2.internal
labels: {
k8s-app: kube-apiserver
}
master_url: https://100.64.0.1:443/api
namespace_id: e5af26aa-4ef9-11e8-a4e1-0a2bf2ab4bba
namespace_name: kube-system
pod_id: 0a73017b-4efa-11e8-a4e1-0a2bf2ab4bba
pod_name: kube-apiserver-ip-172-20-43-173.ec2.internal
}
log: I0503 23:04:12.595203 1 wrap.go:42] GET /apis/admissionregistrations.k8s.io/v1beta1/validatingwebhookconfiguration 200 [[kube-apiserver/v1.9.3 (linux/amd64) kubernetes/d283541] 127.0.0.1:55026 stream: stdout
time: 2018-05-03T23:04:12.619948395Z
}

304A

304B

306

| time | ID | CPU | memory |
|---|---|---|---|
| 10/10/00 12:01:00.013 | eliza | 14% | 80% |
| 10/10/00 12:01:05.153 | eva | 26% | 70% |

*FIG. 3A*

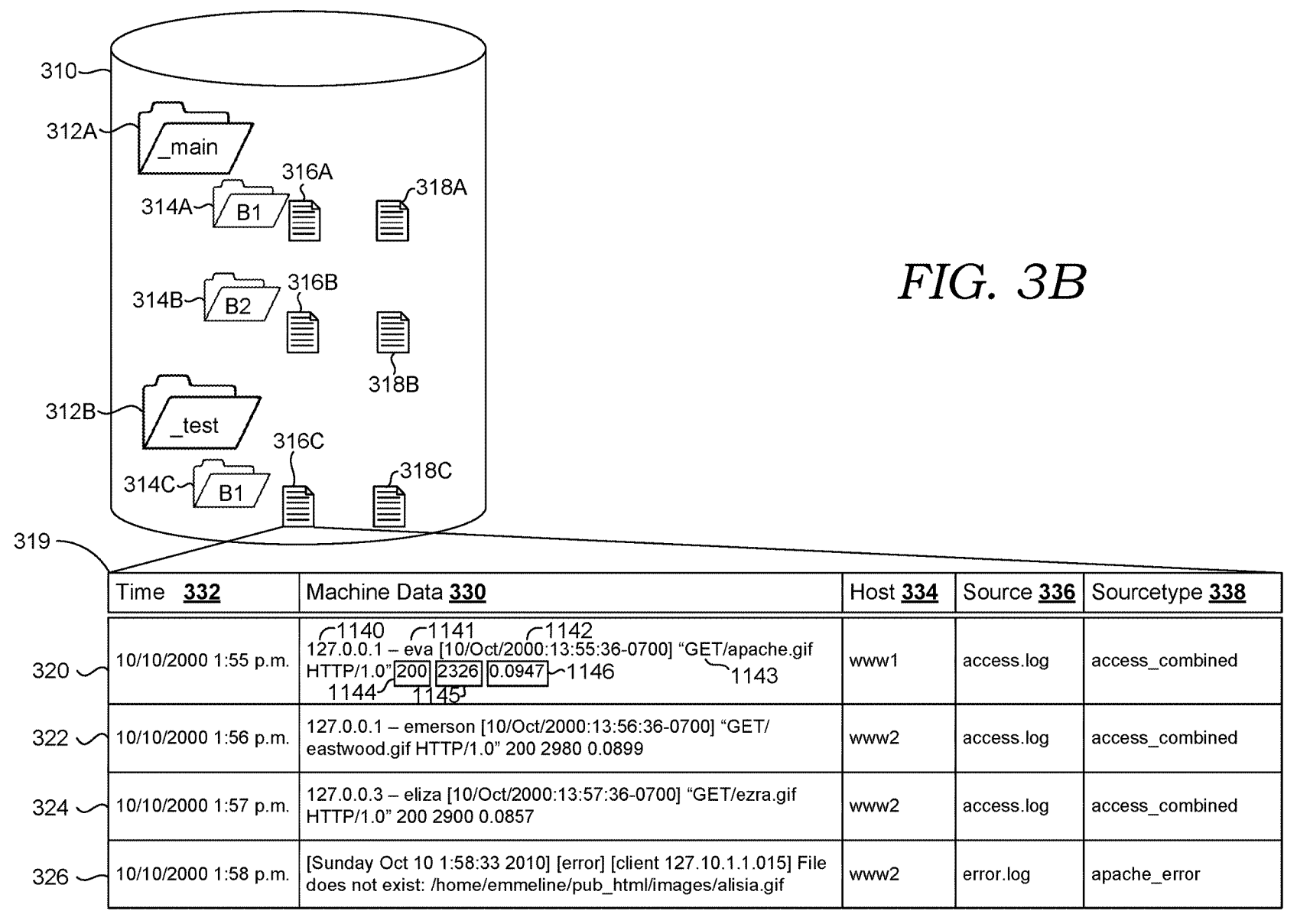

| Time 332 | Machine Data 330 | Host 334 | Source 336 | Sourcetype 338 |
|---|---|---|---|---|
| 10/10/2000 1:55 p.m. | 127.0.0.1 – eva [10/Oct/2000:13:55:36-0700] "GET/apache.gif HTTP/1.0" 200 2326 0.0947 (1140, 1141, 1142, 1143, 1144, 1145, 1146) | www1 | access.log | access_combined |
| 10/10/2000 1:56 p.m. | 127.0.0.1 – emerson [10/Oct/2000:13:56:36-0700] "GET/ eastwood.gif HTTP/1.0" 200 2980 0.0899 | www2 | access.log | access_combined |
| 10/10/2000 1:57 p.m. | 127.0.0.3 – eliza [10/Oct/2000:13:57:36-0700] "GET/ezra.gif HTTP/1.0" 200 2900 0.0857 | www2 | access.log | access_combined |
| 10/10/2000 1:58 p.m. | [Sunday Oct 10 1:58:33 2010] [error] [client 127.10.1.1.015] File does not exist: /home/emmeline/pub_html/images/alisia.gif | www2 | error.log | apache_error |

*FIG. 3B*

| 1 | 2 | 3 | 4 | 5 | 6 | 7 | 8 | 9 | 10 | 11 | 12 |
|---|---|---|---|---|---|---|---|---|---|---|---|
| 16:21:20.000 3/1/17 | 16:21:45.000 3/1/17 | 16:22:30.000 3/1/17 | 16:22:53.020 3/1/17 | 16:22:54.815 3/1/17 | 16:24:15.100 3/1/17 | 16:24:37.610 3/1/17 | 16:26:01.000 3/1/17 | 16:27:50.000 3/1/17 | 16:27:56.470 3/1/17 | 16:28:08.120 3/1/17 | 16:28:17.000 3/1/17 |
| Address1 | Address2 | Address3 | Address4 | Address5 | Address6 | Address7 | Address8 | Address9 | Address10 | Address11 | Address12 |

*Cont. on Fig. 10B*

EFFICIENT MANAGEMENT OF ANALYTICS IN ANALYTICS MANAGEMENT SERVICE

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon Web Services (AWS), and other data systems that store passively or actively generated data, including machine-generated data ("machine data"). The machine data can include log data, performance data, diagnostic data, metrics, tracing data, or any other data that can be analyzed to diagnose equipment performance problems, monitor user interactions, and to derive other insights.

The large amount and diversity of data systems containing large amounts of structured, semi-structured, and unstructured data relevant to any search query can be massive, and continues to grow rapidly. This technological evolution can give rise to various challenges in relation to managing, understanding, and effectively utilizing the data. To reduce the potentially vast amount of data that may be generated, some data systems pre-process data based on anticipated data analysis needs. In particular, specified data items may be extracted from the generated data and stored in a data system to facilitate efficient retrieval and analysis of those data items at a later time. At least some of the remainder of the generated data is typically discarded during pre-processing.

However, storing massive quantities of minimally processed or unprocessed data (collectively and individually referred to as "raw data") for later retrieval and analysis is becoming increasingly more feasible as storage capacity becomes more inexpensive and plentiful. In general, storing raw data and performing analysis on that data later can provide greater flexibility because it enables an analyst to analyze all of the generated data instead of only a fraction of it. Although the availability of vastly greater amounts of diverse data on diverse data systems provides opportunities to derive new insights, it also gives rise to technical challenges to search and analyze the data in a performant way.

BRIEF DESCRIPTION OF THE DRAWINGS

Illustrative examples are described in detail below with reference to the following figures:

FIG. 3A is a block diagram illustrating an embodiment of machine data received by the data intake and query system.

FIGS. 3B and 3C are block diagrams illustrating embodiments of various data structures for storing data processed by the data intake and query system.

DETAILED DESCRIPTION

Figure 2:
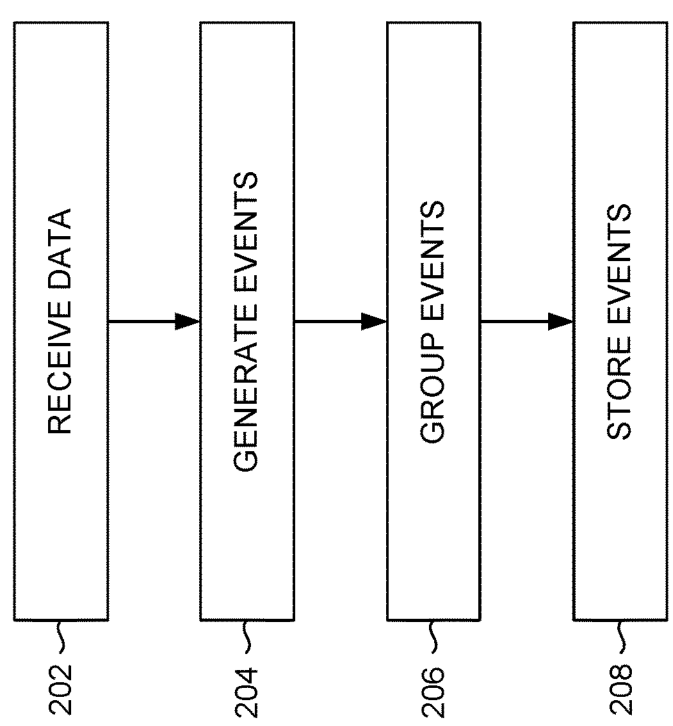
FIG. 2 is a flow diagram illustrating an embodiment of a routine implemented by the data intake and query system to process, index, and store data.

Modern data centers and other computing environments can comprise anywhere from a few host computer systems to thousands of systems configured to process data, service requests from remote clients, and perform numerous other computational tasks. During operation, various components within these computing environments often generate significant volumes of machine data. Machine data is any data produced by a machine or component in an information technology (IT) environment and that reflects activity in the IT environment. For example, machine data can be raw machine data that is generated by various components in IT environments, such as servers, sensors, routers, mobile devices, Internet-of-Things (IoT) devices, etc. Machine data can include system logs, network packet data, sensor data, application program data, error logs, stack traces, system performance data, etc. In general, machine data can also include performance data, diagnostic information, and many other types of data that can be analyzed to diagnose performance problems, monitor user interactions, and to derive other insights.

A number of tools are available to analyze machine data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that concurrently report these types of information.

These challenges can be addressed by using an event-based data intake and query system, such as the SPLUNK® ENTERPRISE, SPLUNK® CLOUD, or SPLUNK® CLOUD SERVICE system developed by Splunk Inc. of San Francisco, California. These systems represent the leading platform for providing real-time operational intelligence that enables organizations to collect, index, and search machine data from various websites, applications, servers, networks, and mobile devices that power their businesses. The data intake and query system is particularly useful for analyzing data that is commonly found in system log files, network data, metrics data, tracing data, and other data input sources.

In the data intake and query system, machine data is collected and stored as "events." An event comprises a portion of machine data and is associated with a specific point in time. The portion of machine data may reflect activity in an IT environment and may be produced by a component of that IT environment, where the events may be searched to provide insight into the IT environment, thereby improving the performance of components in the IT environment. Events may be derived from "time series data," where the time series data comprises a sequence of data points (e.g., performance measurements from a computer system, etc.) that are associated with successive points in time. In general, each event has a portion of machine data that is associated with a timestamp. The timestamp may be derived from the portion of machine data in the event, determined through interpolation between temporally proximate events having known timestamps, and/or may be determined based on other configurable rules for associating timestamps with events.

In some instances, machine data can have a predefined structure, where data items with specific data formats are stored at predefined locations in the data. For example, the machine data may include data associated with fields in a database table. In other instances, machine data may not have a predefined structure (e.g., may not be at fixed, predefined locations), but may have repeatable (e.g., non-random) patterns. This means that some machine data can comprise various data items of different data types that may be stored at different locations within the data. For example, when the data source is an operating system log, an event can include one or more lines from the operating system log containing machine data that includes different types of performance and diagnostic information associated with a specific point in time (e.g., a timestamp).

Examples of components that may generate machine data from which events can be derived include, but are not limited to, web servers, application servers, databases, firewalls, routers, operating systems, and software applications that execute on computer systems, mobile devices, sensors, Internet-of-Things (IoT) devices, etc. The machine data generated by such data sources can include, for example and without limitation, server log files, activity log files, configuration files, messages, network packet data, performance measurements, sensor measurements, etc.

The data intake and query system can use flexible schema to specify how to extract information from events. A flexible schema may be developed and redefined as needed. The flexible schema can be applied to events "on the fly," when it is needed (e.g., at search time, index time, ingestion time, etc.). When the schema is not applied to events until search time, the schema may be referred to as a "late-binding schema."

During operation, the data intake and query system receives machine data from any type and number of sources (e.g., one or more system logs, streams of network packet data, sensor data, application program data, error logs, stack traces, system performance data, etc.). The system parses the machine data to produce events, each having a portion of machine data associated with a timestamp, and stores the events. The system enables users to run queries against the stored events to, for example, retrieve events that meet filter criteria specified in a query, such as criteria indicating certain keywords or having specific values in defined fields. Additional query terms can further process the event data, such as by transforming the data, etc.

As used herein, the term "field" can refer to a location in the machine data of an event containing one or more values for a specific data item. A field may be referenced by a field name associated with the field. As will be described in more detail herein, in some cases, a field is defined by an extraction rule (e.g., a regular expression) that derives one or more values or a sub-portion of text from the portion of machine data in each event to produce a value for the field for that event. The set of values produced are semantically related (such as by IP address), even though the machine data in each event may be in different formats (e.g., semantically related values may be in different positions in the events derived from different sources).

As described above, the system stores the events in a data store. The events stored in the data store are field-searchable, where field-searchable herein refers to the ability to search the machine data (e.g., the raw machine data) of an event based on a field specified in search criteria. For example, a search having criteria that specifies a field name "UserID" may cause the system to field search the machine data of events to identify events that have the field name "UserID." In another example, a search having criteria that specifies a field name "UserID" with a corresponding field value "12345" may cause the system to field search the machine data of events to identify events having that field-value pair (e.g., field name "UserID" with a corresponding field value of "12345"). Events are field-searchable using one or more configuration files associated with the events. Each configuration file can include one or more field names, where each field name is associated with a corresponding extraction rule and a set of events to which that extraction rule applies. The set of events to which an extraction rule applies may be identified by metadata associated with the set of events. For example, an extraction rule may apply to a set of events that are each associated with a particular host, source, or sourcetype. When events are to be searched based on a particular field name specified in a search, the system can use one or more configuration files to determine whether there is an extraction rule for that particular field name that applies to each event that falls within the criteria of the search. If so, the event is considered as part of the search results (and additional processing may be performed on that event based on criteria specified in the search). If not, the next event is similarly analyzed, and so on.

As noted above, the data intake and query system can utilize a late-binding schema while performing queries on events. One aspect of a late-binding schema is applying extraction rules to events to extract values for specific fields during search time. More specifically, the extraction rule for a field can include one or more instructions that specify how to extract a value for the field from an event. An extraction rule can generally include any type of instruction for extracting values from machine data or events. In some cases, an extraction rule comprises a regular expression, where a sequence of characters form a search pattern. An extraction rule comprising a regular expression is referred to herein as a regex rule. The system applies a regex rule to machine data or an event to extract values for a field associated with the regex rule, where the values are extracted by searching the machine data/event for the sequence of characters defined in the regex rule.

In the data intake and query system, a field extractor may be configured to automatically generate extraction rules for certain fields in the events when the events are being created, indexed, or stored, or possibly at a later time. Alternatively, a user may manually define extraction rules for fields using a variety of techniques. In contrast to a conventional schema for a database system, a late-binding schema is not defined at data-ingestion time. Instead, the late-binding schema can be developed on an ongoing basis until the time a query is actually executed. This means that extraction rules for the fields specified in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the data intake and query system maintains the underlying machine data and uses a late-binding schema for searching the machine data, it enables a user to continue investigating and learn valuable insights about the machine data.

In some embodiments, a common field name may be used to reference two or more fields containing equivalent and/or similar data items, even though the fields may be associated with different types of events that possibly have different data formats and different extraction rules. By enabling a common field name to be used to identify equivalent and/or similar fields from different types of events generated by disparate data sources, the system facilitates use of a "common information model" (CIM) across the disparate data sources.

In some embodiments, the configuration files and/or extraction rules described above can be stored in a catalog, such as a metadata catalog. In certain embodiments, the content of the extraction rules can be stored as rules or actions in the metadata catalog. For example, the identification of the data to which the extraction rule applies can be referred to a rule, and the processing of the data can be referred to as an action.

1.0. Operating Environment

Figure 1:
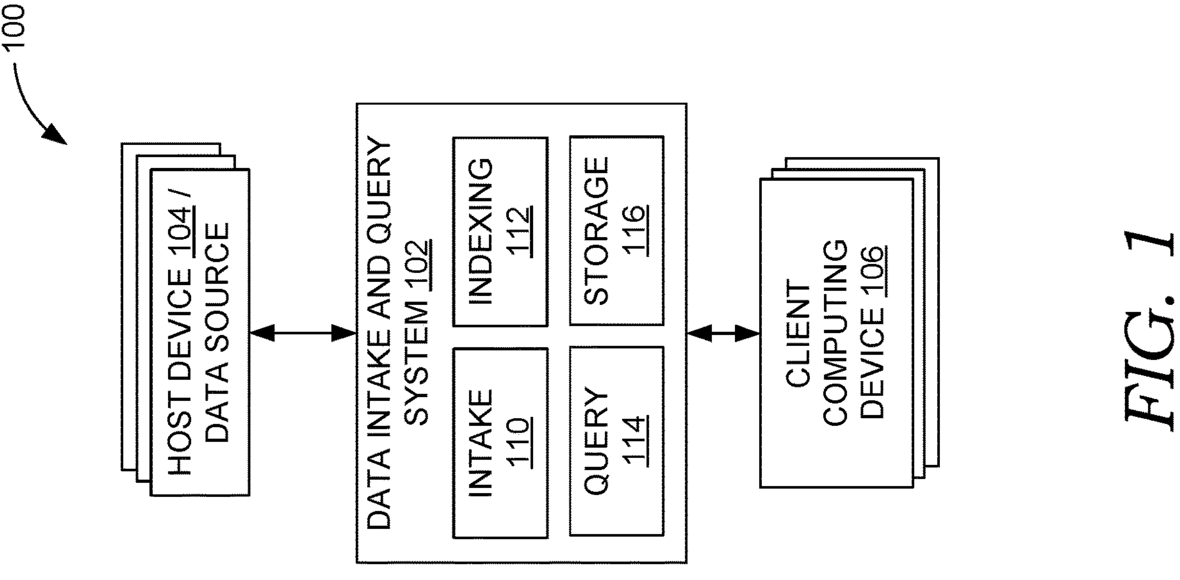
FIG. 1 is a block diagram of an embodiment of a data processing environment.

FIG. 1 is a block diagram of an embodiment of a data-processing environment 100. In the illustrated embodiment, the environment 100 includes a data intake and query system 102, one or more host devices 104, and one or more client computing devices 106 (generically referred to as client device[s] 106).

The data intake and query system 102, host devices 104, and client devices 106 can communicate with each other via one or more networks, such as a local area network (LAN), wide area network (WAN), private or personal network, cellular networks, intranetworks, and/or internetworks using any of wired, wireless, terrestrial microwave, satellite links, etc., and may include the Internet. Although not explicitly shown in FIG. 1, it will be understood that a client computing device 106 can communicate with a host device 104 via one or more networks. For example, if the host device 104 is configured as a web server and the client computing device 106 is a laptop, the laptop can communicate with the web server to view a website.

A client device 106 can correspond to a distinct computing device that can configure, manage, or send queries to the system 102. Examples of client devices 106 may include, without limitation, smart phones, tablet computers, handheld computers, wearable devices, laptop computers, desktop computers, servers, portable media players, gaming devices, or other device that includes computer hardware (e.g., processors, non-transitory, computer-readable media, etc.) and so forth. In certain cases, a client device 106 can include a hosted, virtualized, or containerized device, such as an isolated execution environment, that shares computing resources (e.g., processor, memory, etc.) of a particular machine with other isolated execution environments.

The client devices 106 can interact with the system 102 (or a host device 104) in a variety of ways. For example, the client devices 106 can communicate with the system 102 (or a host device 104) over an Internet (Web) protocol, via a gateway, via a command line interface, via a software developer kit (SDK), a standalone application, etc. As another example, the client devices 106 can use one or more executable applications or programs to interface with the system 102.

A host device 104 can correspond to a distinct computing device or system that includes or has access to data that can be ingested, indexed, and/or searched by the system 102. Accordingly, in some cases, a client device 106 may also be a host device 104 (e.g., it can include data that is ingested by the system 102, and it can submit queries to the system 102). The host devices 104 can include, but are not limited to, servers, sensors, routers, personal computers, mobile devices, Internet-of-Things (IOT) devices, or hosting devices, such as computing devices in a shared computing resource environment on which multiple isolated execution environments (e.g., virtual machines, containers, etc.) can be instantiated, or other computing devices in an IT environment (e.g., device that includes computer hardware, e.g., processors, non-transitory, computer-readable media, etc.). In certain cases, a host device 104 can include a hosted, virtualized, or containerized device, such as an isolated execution environment, that shares computing resources (e.g., processor, memory, etc.) of a particular machine (e.g., a hosting device or hosting machine) with other isolated execution environments.

As mentioned, host devices 104 can include or have access to data sources for the system 102. The data sources can include machine data found in log files, data files, distributed file systems, streaming data, publication-subscribe (pub/sub) buffers, directories of files, data sent over a network, event logs, registries, streaming data services (examples of which can include, by way of non-limiting example, Amazon's Simple Queue Service ("SQS") or Kinesis™ services, devices executing Apache Kafka™ software, or devices implementing the Message Queue Telemetry Transport (MQTT) protocol, Microsoft Azure EventHub, Google Cloud PubSub, devices implementing the Java Message Service (JMS) protocol, devices implementing the Advanced Message Queuing Protocol [AMQP]), cloud-based services (e.g., AWS, Microsoft Azure, Google Cloud, etc.), operating-system-level virtualization environments (e.g., Docker), container orchestration systems (e.g., Kubernetes), virtual machines using full virtualization or paravirtualization, or other virtualization techniques or isolated execution environments.

In some cases, one or more applications executing on a host device may generate various types of machine data during operation. For example, a web server application executing on a host device 104 may generate one or more web server logs detailing interactions between the web server and any number of client devices 106 or other devices. As another example, a host device 104 implemented as a router may generate one or more router logs that record information related to network traffic managed by the router. As yet another example, a database server application executing on a host device 104 may generate one or more logs that record information related to requests sent from other devices (e.g., web servers, application servers, client devices, etc.) for data managed by the database server. Similarly, a host device 104 may generate and/or store computing resource utilization metrics, such as, but not limited to, CPU utilization, memory utilization, number of processes being executed, etc. Any one or any combination of the files or data generated in such cases can be used as a data source for the system 102.

In some embodiments, an application may include a monitoring component that facilitates generating performance data related to the host device's operating state, including monitoring network traffic sent and received from the host device and collecting other device- and/or application-specific information. A monitoring component may be an integrated component of the application, a plug-in, an extension, or any other type of add-on component, or a standalone process.

Such monitored information may include, but is not limited to, network performance data (e.g., a URL requested, a connection type (e.g., HTTP, HTTPS, etc.), a connection start time, a connection end time, an HTTP status code, request length, response length, request headers, response headers, connection status (e.g., completion, response time [s], failure, etc.) or device performance information (e.g., current wireless signal strength of the device, a current connection type and network carrier, current memory performance information, processor utilization, memory utilization, a geographic location of the device, a device orientation, and any other information related to the operational state of the host device, etc.), device profile information (e.g., a type of client device, a manufacturer, and model of the device, versions of various software applications installed on the device, etc.) In some cases, the monitoring component can collect device performance information by monitoring one or more host device operations, or by making calls to an operating system and/or one or more other applications executing on a host device for performance information. The monitored information may be stored in one or more files and/or streamed to the system 102.

In general, a monitoring component may be configured to generate performance data in response to a monitor trigger in the code of a client application or other triggering application event, as described above, and to store the performance data in one or more data records. Each data record, for example, may include a collection of field-value pairs, each field-value pair storing a particular item of performance data in association with a field for the item. For example, a data record generated by a monitoring component may include a "network latency" field (not shown in the Figure) in which a value is stored. This field indicates a network latency measurement associated with one or more network requests. The data record may include a "state" field to store a value indicating a state of a network connection, and so forth for any number of aspects of collected performance data.

In some embodiments, such as in a shared computing resource environment (or hosted environment), a host device 104 may include logs or machine data generated by an application executing within an isolated execution environment (e.g., web server log file if the isolated execution environment is configured as a web server or database server log files if the isolated execution environment is configured as database server, etc.), machine data associated with the computing resources assigned to the isolated execution environment (e.g., CPU utilization of the portion of the CPU allocated to the isolated execution environment, memory utilization of the portion of the memory allocated to the isolated execution environment, etc.), logs or machine data generated by an application that enables the isolated execution environment to share resources with other isolated execution environments (e.g., logs generated by a Docker manager or Kubernetes manager executing on the host device 104), and/or machine data generated by monitoring the computing resources of the host device 104 (e.g., CPU utilization, memory utilization, etc.) that are shared between the isolated execution environments. Given the separation (and isolation) between isolated execution environments executing on a common computing device, in certain embodiments, each isolated execution environment may be treated as a separate host device 104 even if they are, in fact, executing on the same computing device or hosting device.

Accordingly, as used herein, obtaining data from a data source may refer to communicating with a host device 104 to obtain data from the host device 104 (e.g., from one or more data source files, data streams, directories on the host device 104, etc.). For example, obtaining data from a data source may refer to requesting data from a host device 104 and/or receiving data from a host device 104. In some such cases, the host device 104 can retrieve and return the requested data from a particular data source, and/or the system 102 can retrieve the data from a particular data source of the host device 104 (e.g., from a particular file stored on a host device 104).

The data intake and query system 102 can ingest, index, and/or store data from heterogeneous data sources and/or host devices 104. For example, the system 102 can ingest, index, and/or store any type of machine data, regardless of the form of the machine data or whether the machine data matches or is similar to other machine data ingested, indexed, and/or stored by the system 102. In some cases, the system 102 can generate events from the received data, group the events, and store the events in buckets. The system 102 can also search heterogeneous data that it has stored or search data stored by other systems (e.g., other system 102 systems or other non-system 102 systems). For example, in response to received queries, the system 102 can assign one or more components to search events stored in the storage system or search data stored elsewhere.

As will be described herein in greater detail below, the system 102 can use one or more components to ingest, index, store, and/or search data. In some embodiments, the system 102 is implemented as a distributed system that uses multiple components to perform its various functions. For example, the system 102 can include any one or any combination of an intake system 110 (including one or more components) to ingest data, an indexing system 112 (including one or more components) to index the data, a storage system 116 (including one or more components) to store the data, and/or a query system 114 (including one or more components) to search the data, etc.

In the illustrated embodiment, the system 102 is shown having four subsystems 110, 112, 114, and 116. However, it will be understood that the system 102 may include any one or any combination of the intake system 110, indexing system 112, query system 114, or storage system 116. Further, in certain embodiments, one or more of the intake system 110, indexing system 112, query system 114, or storage system 116 may be used alone or apart from the system 102. For example, the intake system 110 may be used alone to glean information from streaming data that is not indexed or stored by the system 102, or the query system 114 may be used to search data that is unaffiliated with the system 102.

In certain embodiments, the components of the different systems may be distinct from each other or there may be some overlap. For example, one component of the system 102 may include some indexing functionality and some searching functionality and thus be used as part of the indexing system 112 and query system 114, while another computing device of the system 102 may only have ingesting or search functionality and only be used as part of those respective systems. Similarly, the components of the storage system 116 may include data stores of individual components of the indexing system and/or may be a separate shared data storage system, like Amazon S3, that is accessible to distinct components of the intake system 110, indexing system 112, and query system 114.

In some cases, the components of the system 102 are implemented as distinct computing devices having their own computer hardware (e.g., processors, non-transitory, computer-readable media, etc.) and/or as distinct hosted devices (e.g., isolated execution environments) that share computing resources or hardware in a shared computing resource environment.

For simplicity, references made herein to the intake system 110, indexing system 112, storage system 116, and query system 114 can refer to those components used for ingesting, indexing, storing, and searching, respectively. However, it will be understood that although reference is made to two separate systems, the same underlying component may be performing the functions for the two different systems. For example, reference to the indexing system indexing data and storing the data in the storage system 116 or the query system searching the data may refer to the same component (e.g., same computing device or hosted device) indexing the data, storing the data, and then searching the data that it stored.

As will be described in greater detail herein, the intake system 110 can receive data from the host devices 104 or data sources, perform one or more preliminary processing operations on the data, and communicate the data to the indexing system 112, query system 114, storage system 116, or to other systems (which may include, for example, data-processing systems, telemetry systems, real-time analytics systems, data stores, databases, etc., any of which may be operated by an operator of the system 102 or a third party). Given the amount of data that can be ingested by the intake system 110, in some embodiments, the intake system can include multiple distributed computing devices or components working concurrently to ingest the data.

The intake system 110 can receive data from the host devices 104 in a variety of formats or structures. In some embodiments, the received data corresponds to raw machine data, structured or unstructured data, correlation data, data files, directories of files, data sent over a network, event logs, registries, messages published to streaming data sources, performance metrics, sensor data, image and video data, etc.

The preliminary processing operations performed by the intake system 110 can include, but is not limited to, associating metadata with the data received from a host device 104, extracting a timestamp from the data, identifying individual events within the data, extracting a subset of machine data for transmittal to the indexing system 112, enriching the data, etc. As part of communicating the data to the indexing system, the intake system 110 can route the data to a particular component of the intake system 110 or dynamically route the data based on load-balancing, etc. In certain cases, one or more components of the intake system 110 can be installed on a host device 104.

1.4.2. Indexing System Overview

As will be described in greater detail herein, the indexing system 112 can include one or more components (e.g., indexing nodes) to process the data and store it, for example, in the storage system 116. As part of processing the data, the indexing system can identify distinct events within the data, timestamps associated with the data, organize the data into buckets or time series buckets, convert editable buckets to non-editable buckets, store copies of the buckets in the storage system 116, merge buckets, generate indexes of the data, etc. In addition, the indexing system 112 can update various catalogs or databases with information related to the buckets (pre-merged or merged) or data that is stored in the storage system 116, and can communicate with the intake system 110 about the status of the data storage.

As will be described in greater detail herein, the query system 114 can include one or more components to receive, process, and execute queries. In some cases, the query system 114 can use the same component to process and execute the query or use one or more components to receive and process the query (e.g., a search head) and use one or more other components to execute at least a portion of the query (e.g., search nodes). In some cases, a search node and an indexing node may refer to the same computing device or hosted device performing different functions. In certain cases, a search node can be a separate computing device or hosted device from an indexing node.

Queries received by the query system 114 can be relatively complex and identify a set of data to be processed and a manner of processing the set of data from one or more client devices 106. In certain cases, the query can be implemented using a pipelined command language or other query language. As described herein, in some cases, the query system 114 can execute parts of the query in a distributed fashion (e.g., one or more mapping phases or parts associated with identifying and gathering the set of data identified in the query) and execute other parts of the query on a single component (e.g., one or more reduction phases). However, it will be understood that in some cases multiple components can be used in the map and/or reduce functions of the query execution.

In some cases, as part of executing the query, the query system 114 can use one or more catalogs or databases to identify the set of data to be processed or its location in the storage system 116 and/or can retrieve data from the storage system 116. In addition, in some embodiments, the query system 114 can store some or all of the query results in the storage system 116.

In some cases, the storage system 116 may include one or more data stores associated with or coupled to the components of the indexing system 112 that are accessible via a system bus or local area network. In certain embodiments, the storage system 116 may be a shared storage system 116, like Amazon S3 or Google Cloud Storage, that are accessible via a wide area network.

As mentioned and as will be described in greater detail below, the storage system 116 can be made up of one or more data stores storing data that has been processed by the indexing system 112. In some cases, the storage system includes data stores of the components of the indexing system 112 and/or query system 114. In certain embodiments, the storage system 116 can be implemented as a shared storage system 116. The shared storage system 116 can be configured to provide high-availability, highly resilient, low-loss data storage. In some cases, to provide the high-availability, highly resilient, low-loss data storage, the shared storage system 116 can store multiple copies of the data in the same and different geographic locations and across different types of data stores (e.g., solid-state, hard drive, tape, etc.). Further, as data is received at the shared storage system 116, it can be automatically replicated multiple times according to a replication factor to different data stores across the same and/or different geographic locations. In some embodiments, the shared storage system 116 can correspond to cloud storage, such as Amazon Simple Storage Service (S3) or Elastic Block Storage (EBS), Google Cloud Storage, Microsoft Azure Storage, etc.

In some embodiments, indexing system 112 can read to and write from the shared storage system 116. For example, the indexing system 112 can copy buckets of data from its local or shared data stores to the shared storage system 116. In certain embodiments, the query system 114 can read from, but cannot write to, the shared storage system 116. For example, the query system 114 can read the buckets of data stored in shared storage system 116 by the indexing system 112, but may not be able to copy buckets or other data to the shared storage system 116. In some embodiments, the intake system 110 does not have access to the shared storage system 116. However, in some embodiments, one or more components of the intake system 110 can write data to the shared storage system 116 that can be read by the indexing system 112.

As described herein, in some embodiments, data in the system 102 (e.g., in the data stores of the components of the indexing system 112, shared storage system 116, or search nodes of the query system 114) can be stored in one or more time series buckets. Each bucket can include raw machine data associated with a timestamp and additional information about the data or bucket, such as, but not limited to, one or more filters, indexes (e.g., TSIDX, inverted indexes, keyword indexes, etc.), bucket summaries, etc. In some embodiments, the bucket data and information about the bucket data is stored in one or more files. For example, the raw machine data, filters, indexes, bucket summaries, etc., can be stored in respective files in or associated with a bucket. In certain cases, the group of files can be associated together to form the bucket.

The system 102 can include additional components that interact with any one or any combination of the intake system 110, indexing system 112, query system 114, and/or storage system 116. Such components may include, but are not limited to, an authentication system, orchestration system, one or more catalogs or databases, a gateway, etc.

An authentication system can include one or more components to authenticate users to access, use, and/or configure the system 102. Similarly, the authentication system can be used to restrict what a particular user can do on the system 102 and/or what components or data a user can access, etc.

An orchestration system can include one or more components to manage and/or monitor the various components of the system 102. In some embodiments, the orchestration system can monitor the components of the system 102 to detect when one or more components has failed or is unavailable and enable the system 102 to recover from the failure (e.g., by adding additional components, fixing the failed component, or having other components complete the tasks assigned to the failed component). In certain cases, the orchestration system can determine when to add components to or remove components from a particular system 110, 112, 114, and 116 (e.g., based on usage, user/tenant requests, etc.). In embodiments where the system 102 is implemented in a shared computing resource environment, the orchestration system can facilitate the creation and/or destruction of isolated execution environments or instances of the components of the system 102, etc.

In certain embodiments, the system 102 can include various components that enable it to provide stateless services or enable it to recover from an unavailable or unresponsive component without data loss in a time efficient manner. For example, the system 102 can store contextual information about its various components in a distributed way such that if one of the components becomes unresponsive or unavailable, the system 102 can replace the unavailable component with a different component and provide the replacement component with the contextual information. In this way, the system 102 can quickly recover from an unresponsive or unavailable component while reducing or eliminating the loss of data that was being processed by the unavailable component.

In some embodiments, the system 102 can store the contextual information in a catalog, as described herein. In certain embodiments, the contextual information can correspond to information that the system 102 has determined or learned based on use. In some cases, the contextual information can be stored as annotations (manual annotations and/or system annotations), as described herein.

In certain embodiments, the system 102 can include an additional catalog that monitors the location and storage of data in the storage system 116 to facilitate efficient access of the data during search time. In certain embodiments, such a catalog may form part of the storage system 116.

In some embodiments, the system 102 can include a gateway or other mechanism to interact with external devices or to facilitate communications between components of the system 102. In some embodiments, the gateway can be implemented using an application programming interface (API). In certain embodiments, the gateway can be implemented using a representational state transfer API (REST API).

In some environments, a user of a system 102 may install and configure, on computing devices owned and operated by the user, one or more software applications that implement some or all of the components of the system 102. For example, with reference to FIG. 1, a user may install a software application on server computers owned by the user and configure each server to operate as one or more components of the intake system 110, indexing system 112, query system 114, shared storage system 116, or other components of the system 102. This arrangement generally may be referred to as an "on-premises" solution. That is, the system 102 is installed and operates on computing devices directly controlled by the user of the system 102. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 102 operate.

In certain embodiments, one or more of the components of the system 102 can be implemented in a shared computing resource environment. In this context, a shared computing resource environment or cloud-based service can refer to a service hosted by one more computing resources that are accessible to end users over a network, for example, by using a web browser or other application on a client device to interface with the remote computing resources. For example, a service provider may provide a system 102 by managing computing resources configured to implement various aspects of the system (e.g., intake system 110, indexing system 112, query system 114, shared storage system 116, other components, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

When implemented in a shared computing resource environment, the underlying hardware (non-limiting examples: processors, hard drives, solid-state memory, RAM, etc.) on which the components of the system 102 execute can be shared by multiple customers or tenants as part of the shared computing resource environment. In addition, when implemented in a shared computing resource environment as a cloud-based service, various components of the system 102 can be implemented using containerization or operating-system-level virtualization, or other virtualization technique. For example, one or more components of the intake system 110, indexing system 112, or query system 114 can be implemented as separate software containers or container instances. Each container instance can have certain computing resources (e.g., memory, processor, etc.) of an underlying hosting computing system (e.g., server, microprocessor, etc.) assigned to it, but may share the same operating system and may use the operating system's system call interface. Each container may provide an isolated execution environment on the host system, such as by providing a memory space of the hosting system that is logically isolated from the memory space of other containers. Further, each container may run the same or different computer applications concurrently or separately, and may interact with each other. Although reference is made herein to containerization and container instances, it will be understood that other virtualization techniques can be used. For example, the components can be implemented using virtual machines using full virtualization or paravirtualization, etc. Thus, where reference is made to "containerized" components, it should be understood that such components may additionally or alternatively be implemented in other isolated execution environments, such as a virtual machine environment.

Implementing the system 102 in a shared computing resource environment can provide a number of benefits. In some cases, implementing the system 102 in a shared computing resource environment can make it easier to install, maintain, and update the components of the system 102. For example, rather than accessing designated hardware at a particular location to install or provide a component of the system 102, a component can be remotely instantiated or updated as desired. Similarly, implementing the system 102 in a shared computing resource environment or as a cloud-based service can make it easier to meet dynamic demand. For example, if the system 102 experiences significant load at indexing or search, additional compute resources can be deployed to process the additional data or queries. In an "on-premises" environment, this type of flexibility and scalability may not be possible or feasible.

In addition, by implementing the system 102 in a shared computing resource environment or as a cloud-based service can improve compute resource utilization. For example, in an on-premises environment, if the designated compute resources are not being used, they may sit idle and unused. In a shared computing resource environment, if the compute resources for a particular component are not being used, they can be reallocated to other tasks within the system 102 and/or to other systems unrelated to the system 102.

As mentioned, in an on-premises environment, data from one instance of a system 102 is logically and physically separated from the data of another instance of a system 102 by virtue of each instance having its own designated hardware. As such, data from different customers of the system 102 is logically and physically separated from each other. In a shared computing resource environment, components of a system 102 can be configured to process the data from one customer or tenant or from multiple customers or tenants. Even in cases where a separate component of a system 102 is used for each customer, the underlying hardware on which the components of the system 102 are instantiated may still process data from different tenants. Accordingly, in a shared computing resource environment, the data from different tenants may not be physically separated on distinct hardware devices. For example, data from one tenant may reside on the same hard drive as data from another tenant or be processed by the same processor. In such cases, the system 102 can maintain logical separation between tenant data. For example, the system 102 can include separate directories for different tenants and apply different permissions and access controls to access the different directories or to process the data, etc.

In certain cases, the tenant data from different tenants is mutually exclusive and/or independent from each other. For example, in certain cases, Tenant A and Tenant B do not share the same data, similar to the way in which data from a local hard drive of Customer A is mutually exclusive and independent of the data (and not considered part of) of a local hard drive of Customer B. While Tenant A and Tenant B may have matching or identical data, each tenant would have a separate copy of the data. For example, with reference again to the local hard drive of Customer A and Customer B example, each hard drive could include the same file. However, each instance of the file would be considered part of the separate hard drive and would be independent of the other file. Thus, one copy of the file would be part of Customer A's hard drive, and a separate copy of the file would be part of Customer B's hard drive. In a similar manner, to the extent Tenant A has a file that is identical to a file of Tenant B, each tenant would have a distinct and independent copy of the file stored in different locations on a data store or on different data stores.

Further, in certain cases, the system 102 can maintain the mutual exclusivity and/or independence between tenant data even as the tenant data is being processed, stored, and searched by the same underlying hardware. In certain cases, to maintain the mutual exclusivity and/or independence between the data of different tenants, the system 102 can use tenant identifiers to uniquely identify data associated with different tenants.

In a shared computing resource environment, some components of the system 102 can be instantiated and designated for individual tenants, and other components can be shared by multiple tenants. In certain embodiments, a separate intake system 110, indexing system 112, and query system 114 can be instantiated for each tenant, whereas the shared storage system 116 or other components (e.g., data store, metadata catalog, and/or acceleration data store, described below) can be shared by multiple tenants. In some such embodiments where components are shared by multiple tenants, the components can maintain separate directories for the different tenants to ensure their mutual exclusivity and/or independence from each other. Similarly, in some such embodiments, the system 102 can use different hosting computing systems or different isolated execution environments to process the data from the different tenants as part of the intake system 110, indexing system 112, and/or query system 114.

In some embodiments, individual components of the intake system 110, indexing system 112, and/or query system 114 may be instantiated for each tenant or shared by multiple tenants. For example, some individual intake system components (e.g., forwarders, output ingestion buffers, etc.) may be instantiated and designated for individual tenants, while other intake system components (e.g., a data retrieval subsystem, intake ingestion buffer, and/or streaming data processor), may be shared by multiple tenants.

In certain embodiments, an indexing system 112 (or certain components thereof) can be instantiated and designated for a particular tenant or shared by multiple tenants. In some embodiments where a separate indexing system 112 is instantiated and designated for each tenant, different resources can be reserved for different tenants. For example, Tenant A can be consistently allocated a minimum of four indexing nodes, and Tenant B can be consistently allocated a minimum of two indexing nodes. In some such embodiments, the four indexing nodes can be reserved for Tenant A, and the two indexing nodes can be reserved for Tenant B, even if Tenant A and Tenant B are not using the reserved indexing nodes.

In embodiments where an indexing system 112 is shared by multiple tenants, components of the indexing system 112 can be dynamically assigned to different tenants. For example, if Tenant A has greater indexing demands, additional indexing nodes can be instantiated or assigned to Tenant A's data. However, as the demand decreases, the indexing nodes can be reassigned to a different tenant, or terminated. Further, in some embodiments, a component of the indexing system 112 can concurrently process data from the different tenants.

In some embodiments, one instance of query system 114 may be shared by multiple tenants. In some such cases, the same search head can be used to process/execute queries for different tenants, and/or the same search nodes can be used to execute queries for different tenants. Further, in some such cases, different tenants can be allocated different amounts of compute resources. For example, Tenant A may be assigned more search heads or search nodes than another tenant based on demand or based on a service-level arrangement. However, once a search is completed, the search head and/or nodes assigned to Tenant A may be assigned to Tenant B, deactivated, or their resource may be reallocated to other components of the system 102, etc.

In some cases, by sharing more components with different tenants, the functioning of the system 102 can be improved. For example, by sharing components across tenants, the system 102 can improve resource utilization, thereby reducing the amount of resources allocated as a whole. For example, if four indexing nodes, two search heads, and four search nodes are reserved for each tenant, then those compute resources are unavailable for use by other processes or tenants, even if they go unused. In contrast, by sharing the indexing nodes, search heads, and search nodes with different tenants and instantiating additional compute resources, the system 102 can use fewer resources overall while providing improved processing time for the tenants that are using the compute resources. For example, if tenant A is not using any search nodes 506 and tenant B has many searches running, the system 102 can use search nodes that would have been reserved for tenant A to service tenant B. In this way, the system 102 can decrease the number of compute resources used/reserved, while improving the search time for tenant B and improving compute resource utilization.

2.0. Data Ingestion, Indexing, and Storage

FIG. 2 is a flow diagram illustrating an embodiment of a routine implemented by the system 102 to process, index, and store data received from host devices 104. The data flow illustrated in FIG. 2 is provided for illustrative purposes only. It will be understood that one or more of the steps of the processes illustrated in FIG. 2 may be removed or that the ordering of the steps may be changed. Furthermore, for the purposes of illustrating a clear example, one or more particular system components are described in the context of performing various operations during each of the data flow stages. For example, the intake system 110 is described as receiving machine data, and the indexing system 112 is described as generating events, grouping events, and storing events. However, other system arrangements and distributions of the processing steps across system components may be used. For example, in some cases, the intake system 110 may generate events.

At block 202, the intake system 110 receives data from a host device 104. The intake system 110 initially may receive the data as a raw data stream generated by the host device 104. For example, the intake system 110 may receive a data stream from a log file generated by an application server, from a stream of network data from a network device, or from any other source of data. Non-limiting examples of machine data that can be received by the intake system 110 are described herein with reference to FIG. 3A.

In some embodiments, the intake system 110 receives the raw data and may segment the data stream into messages, possibly of a uniform data size, to facilitate subsequent processing steps. The intake system 110 may thereafter process the messages in accordance with one or more rules to conduct preliminary processing of the data. In one embodiment, the processing conducted by the intake system 110 may be used to indicate one or more metadata fields applicable to each message. For example, the intake system 110 may include metadata fields within the messages, or publish the messages to topics indicative of a metadata field. These metadata fields may, for example, provide information related to a message as a whole and may apply to each event that is subsequently derived from the data in the message. For example, the metadata fields may include separate fields specifying each of a host, a source, and a sourcetype related to the message. A host field may contain a value identifying a host name or IP address of a device that generated the data. A source field may contain a value identifying a source of the data, such as a pathname of a file or a protocol and port related to received network data. A sourcetype field may contain a value specifying a particular sourcetype label for the data. Additional metadata fields may also be included, such as a character encoding of the data, if known, and possibly other values that provide information relevant to later processing steps. In certain embodiments, the intake system 110 may perform additional operations, such as, but not limited to, identifying individual events within the data, determining timestamps for the data, further enriching the data, etc.

At block 204, the indexing system 112 generates events from the data. In some cases, as part of generating the events, the indexing system 112 can parse the data of the message. In some embodiments, the indexing system 112 can determine a sourcetype associated with each message (e.g., by extracting a sourcetype label from the metadata fields associated with the message, etc.) and refer to a sourcetype configuration corresponding to the identified sourcetype to parse the data of the message. The sourcetype definition may include one or more properties that indicate to the indexing system 112 to automatically determine the boundaries within the received data that indicate the portions of machine data for events. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a sourcetype for the data is unknown to the indexing system 112, the indexing system 112 may infer a sourcetype for the data by examining the structure of the data. Then, the indexing system 112 can apply an inferred sourcetype definition to the data to create the events.

In addition, as part of generating events from the data, the indexing system 112 can determine a timestamp for each event. Similar to the process for parsing machine data, the indexing system 112 may again refer to a sourcetype definition associated with the data to locate one or more properties that indicate instructions for determining a timestamp for each event. The properties may, for example, instruct the indexing system 112 to extract a time value from a portion of data for the event (e.g., using a regex rule), to interpolate time values based on timestamps associated with temporally proximate events, to create a timestamp based on a time the portion of machine data was received or generated, to use the timestamp of a previous event, or use any other rules for determining timestamps, etc.

The indexing system 112 can also associate events with one or more metadata fields. In some embodiments, a timestamp may be included in the metadata fields. These metadata fields may include any number of "default fields" that are associated with all events, and may also include one or more custom fields as defined by a user. In certain embodiments, the default metadata fields associated with each event may include a host, source, and sourcetype field including or in addition to a field storing the timestamp.

In certain embodiments, the indexing system 112 can also apply one or more transformations to event data that is to be included in an event. For example, such transformations can include removing a portion of the event data (e.g., a portion used to define event boundaries, extraneous characters from the event, other extraneous text, etc.), masking a portion of event data (e.g., masking a credit card number), removing redundant portions of event data, etc. The transformations applied to event data may, for example, be specified in one or more configuration files and referenced by one or more sourcetype definitions.

At block 206, the indexing system 112 can group events. In some embodiments, the indexing system 112 can group events based on time. For example, events generated within a particular time period or events that have a timestamp within a particular time period can be grouped together to form a bucket. A non-limiting example of a bucket is described herein with reference to FIG. 3B.

In certain embodiments, multiple components of the indexing system, such as an indexing node, can concurrently generate events and buckets. Furthermore, each indexing node that generates and groups events can concurrently generate multiple buckets. For example, multiple processors of an indexing node can concurrently process data, generate events, and generate buckets. Further, multiple indexing nodes can concurrently generate events and buckets. As such, ingested data can be processed in a highly distributed manner.

In some embodiments, as part of grouping events together, the indexing system 112 can generate one or more inverted indexes for a particular group of events. A non-limiting example of an inverted index is described herein with reference to FIG. 3C. In certain embodiments, the inverted indexes can include location information for events of a bucket. For example, the events of a bucket may be compressed into one or more files to reduce their size. The inverted index can include location information indicating the particular file and/or location within a particular file of a particular event.

In certain embodiments, the inverted indexes may include keyword entries or entries for field values or field name-value pairs found in events. In some cases, a field name-value pair can include a pair of words connected by a symbol, such as an equals sign or colon. The entries can also include location information for events that include the keyword, field value, or field value pair. In this way, relevant events can be quickly located. In some embodiments, fields can automatically be generated for some or all of the field names of the field name-value pairs at the time of indexing. For example, if the string "dest=10.0.1.2" is found in an event, a field named "dest" may be created for the event, and assigned a value of "10.0.1.2." In certain embodiments, the indexing system can populate entries in the inverted index with field name-value pairs by parsing events using one or more regex rules to determine a field value associated with a field defined by the regex rule. For example, the regex rule may indicate how to find a field value for a userID field in certain events. In some cases, the indexing system 112 can use the sourcetype of the event to determine which regex to use for identifying field values.

Figure 3C:
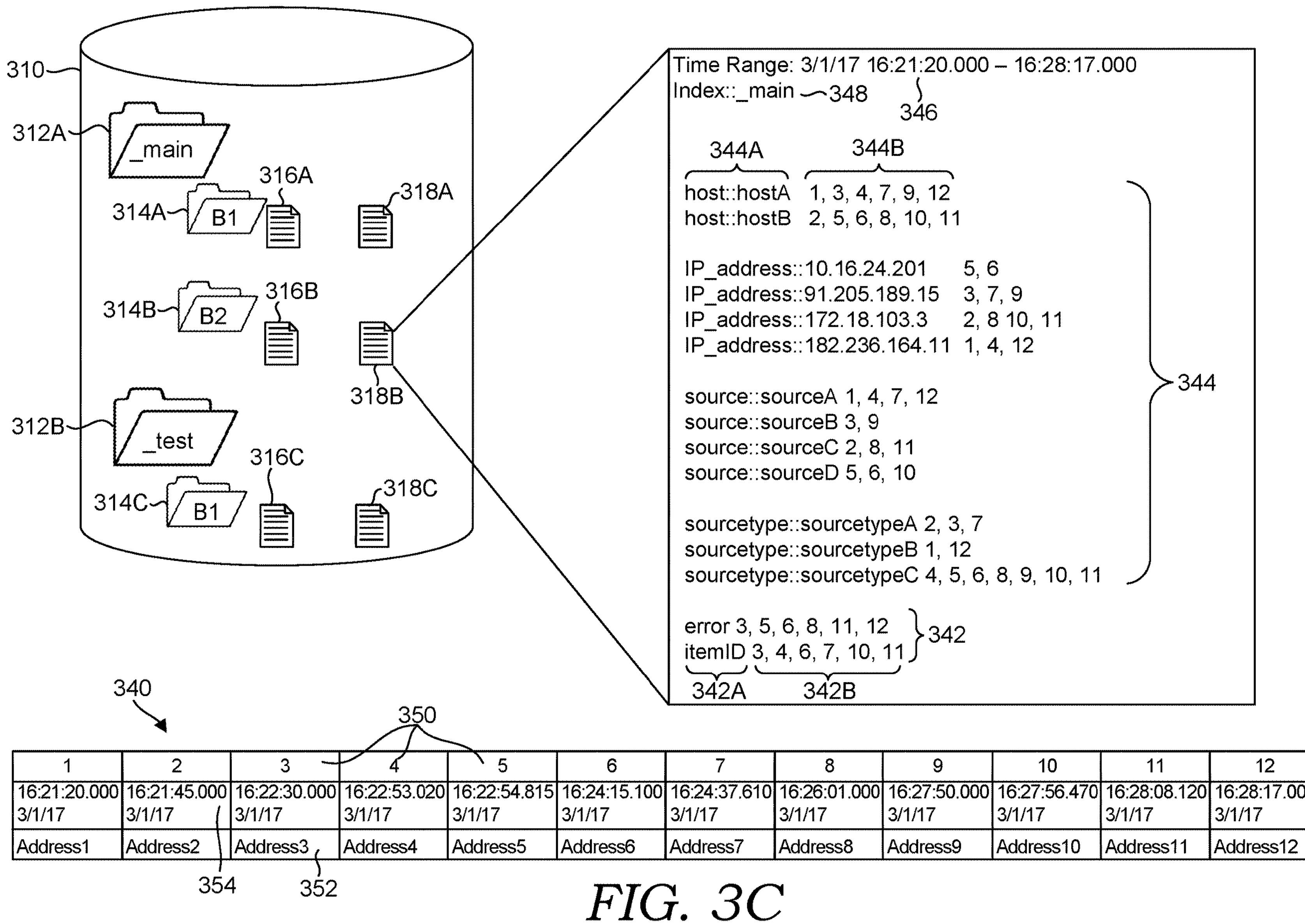

At block 208, the indexing system 112 stores the events with an associated timestamp in the storage system 116, which may be in a local data store and/or in a shared storage system. Timestamps enable a user to search for events based on a time range. In some embodiments, the stored events are organized into "buckets," where each bucket stores events associated with a specific time range based on the timestamps associated with each event. As mentioned, FIGS. 3B and 3C illustrate an example of a bucket. This improves time-based searching, as well as allows for events with recent timestamps, which may have a higher likelihood of being accessed, to be stored in a faster memory to facilitate faster retrieval. For example, buckets containing the most recent events can be stored in flash memory rather than on a hard disk. In some embodiments, each bucket may be associated with an identifier, a time range, and a size constraint.

The indexing system 112 may be responsible for storing the events in the storage system 116. As mentioned, the events or buckets can be stored locally on a component of the indexing system 112 or in a shared storage system 116. In certain embodiments, the component that generates the events and/or stores the events (indexing node) can also be assigned to search the events. In some embodiments separate components can be used for generating and storing events (indexing node) and for searching the events (search node).

By storing events in a distributed manner (either by storing the events at different components or in a shared storage system 116), the query system 114 can analyze events for a query in parallel. For example, using map-reduce techniques, multiple components of the query system (e.g., indexing or search nodes) can concurrently search and provide partial responses for a subset of events to another component (e.g., search head) that combines the results to produce an answer for the query. By storing events in buckets for specific time ranges, the indexing system 112 may further optimize the data retrieval process by the query system 114 to search buckets corresponding to time ranges that are relevant to a query. In some embodiments, each bucket may be associated with an identifier, a time range, and a size constraint. In certain embodiments, a bucket can correspond to a file system directory, and the machine data, or events, of a bucket can be stored in one or more files of the file system directory. The file system directory can include additional files, such as one or more inverted indexes, high-performance indexes, permissions files, configuration files, etc.

In embodiments where components of the indexing system 112 store buckets locally, the components can include a home directory and a cold directory. The home directory can store hot buckets and warm buckets, and the cold directory stores cold buckets. A hot bucket can refer to a bucket that is capable of receiving and storing additional events. A warm bucket can refer to a bucket that can no longer receive events for storage, but has not yet been moved to the cold directory. A cold bucket can refer to a bucket that can no longer receive events and may be a bucket that was previously stored in the home directory. The home directory may be stored in faster memory, such as flash memory, as events may be actively written to the home directory, and the home directory may typically store events that are more frequently searched and thus are accessed more frequently. The cold directory may be stored in slower and/or larger memory, such as a hard disk, as events are no longer being written to the cold directory, and the cold directory may typically store events that are not as frequently searched and thus are accessed less frequently. In some embodiments, components of the indexing system 112 may also have a quarantine bucket that contains events having potentially inaccurate information, such as an incorrect timestamp associated with the event or a timestamp that appears to be an unreasonable timestamp for the corresponding event. The quarantine bucket may have events from any time range; as such, the quarantine bucket may always be searched at search time. Additionally, components of the indexing system may store old, archived data in a frozen bucket that is not capable of being searched at search time. In some embodiments, a frozen bucket may be stored in slower and/or larger memory, such as a hard disk, and may be stored in offline and/or remote storage.

In some embodiments, components of the indexing system 112 may not include a cold directory and/or cold or frozen buckets. For example, in embodiments where buckets are copied to a shared storage system 116 and searched by separate components of the query system 114, buckets can be deleted from components of the indexing system as they are stored to the storage system 116. In certain embodiments, the shared storage system 116 may include a home directory that includes warm buckets copied from the indexing system 112 and a cold directory of cold or frozen buckets as described above.

FIG. 3A is a block diagram illustrating an embodiment of machine data received by the system 102. The machine data can correspond to data from one or more host devices 104 or data sources. As mentioned, the data source can correspond to a log file, data stream, or other data structure that is accessible by a host device 104. In the illustrated embodiment of FIG. 3A, the machine data has different forms. For example, the machine data 302 may be log data that is unstructured or that does not have any clear structure or fields, and may include different portions of 302A-302E that correspond to different entries of the log and that are separated by boundaries. Such data may also be referred to as raw machine data.

The machine data 304 may be referred to as structured or semi-structured machine data, as it does include some data in a JavaScript Object Notation (JSON) structure defining certain fields and field values (e.g., machine data 304A showing field name: field values container_name:kube-apiserver, host:ip 172 20 43 173.ec2.internal, pod_id: 0a73017b-4efa-11e8-a4e1-0a2bf2ab4bba, etc.), but other parts of the machine data 304 are unstructured or raw machine data (e.g., machine data 304B). The machine data 306 may be referred to as structured data, as it includes particular rows and columns of data with field names and field values.

In some embodiments, the machine data 302 can correspond to log data generated by a host device 104 configured as an Apache server, the machine data 304 can correspond to log data generated by a host device 104 in a shared computing resource environment, and the machine data 306 can correspond to metrics data. Given the differences between host devices 104 that generated the log data 302 and 304, the form of the log data 302 and 304 is different. In addition, as the log data 304 is from a host device 104 in a shared computing resource environment, it can include log data generated by an application being executed within an isolated execution environment (304B, excluding the field name "log:") and log data generated by an application that enables the sharing of computing resources between isolated execution environments (all other data in 304). Although shown together in FIG. 3A, it will be understood that machine data with different hosts, sources, or sourcetypes can be received separately and/or found in different data sources and/or host devices 104.

As described herein, the system 102 can process the machine data based on the form in which it is received. In some cases, the intake system 110 can utilize one or more rules to process the data. In certain embodiments, the intake system 110 can enrich the received data. For example, the intake system may add one or more fields to the data received from the host devices 104, such as fields denoting the host, source, sourcetype, index, or tenant associated with the incoming data. In certain embodiments, the intake system 110 can perform additional processing on the incoming data, such as transforming structured data into unstructured data (or vice versa), identifying timestamps associated with the data, removing extraneous data, parsing data, indexing data, separating data, categorizing data, routing data based on criteria relating to the data being routed, and/or performing other data transformations, etc.

In some cases, the data processed by the intake system 110 can be communicated or made available to the indexing system 112, the query system 114, and/or to other systems. In some embodiments, the intake system 110 communicates or makes available streams of data using one or more shards. For example, the indexing system 112 may read or receive data from one shard, and another system may receive data from another shard. As another example, multiple systems may receive data from the same shard.

As used herein, a partition can refer to a logical division of data. In some cases, the logical division of data may refer to a portion of a data stream, such as a shard from the intake system 110. In certain cases, the logical division of data can refer to an index or other portion of data stored in the storage system 116, such as different directories or file structures used to store data or buckets. Accordingly, it will be understood that the logical division of data referenced by the term "partition" will be understood based on the context of its use.

FIGS. 3B and 3C are block diagrams illustrating embodiments of various data structures for storing data processed by the system 102. FIG. 3B includes an expanded view illustrating an example of machine data stored in a data store 310 of the data storage system 116. It will be understood that the depiction of machine data and associated metadata as rows and columns in the table 319 of FIG. 3B is merely illustrative and is not intended to limit the data format in which the machine data and metadata is stored in various embodiments described herein. In one particular embodiment, machine data can be stored in a compressed or encrypted format. In such embodiments, the machine data can be stored with or be associated with data that describes the compression or encryption scheme with which the machine data is stored. The information about the compression or encryption scheme can be used to decompress or decrypt the machine data, and any metadata with which it is stored, at search time.

In the illustrated embodiment of FIG. 3B the data store 310 includes a directory 312 (individually referred to as 312A and 312B) for each index (or partition) that contains a portion of data stored in the data store 310 and a sub-directory 314 (individually referred to as 314A, 314B, and 314C) for one or more buckets of the index. In the illustrated embodiment of FIG. 3B, each sub-directory 314 corresponds to a bucket and includes an event data file 316 (individually referred to as 316A, 316B, and 316C) and an inverted index 318 (individually referred to as 318A, 318B, and 318C). However, it will be understood that each bucket can be associated with fewer or more files and each sub-directory 314 can store fewer or more files.

In the illustrated embodiment, the data store 310 includes a _main directory 312A associated with an index "_main" and a _test directory 312B associated with an index "_test." However, the data store 310 can include fewer or more directories. In some embodiments, multiple indexes can share a single directory or all indexes can share a common directory. Additionally, although illustrated as a single data store 310, it will be understood that the data store 310 can be implemented as multiple data stores storing different portions of the information shown in FIG. 3C. For example, a single index can span multiple directories or multiple data stores.

Furthermore, although not illustrated in FIG. 3B, it will be understood that, in some embodiments, the data store 310 can include directories for each tenant and sub-directories for each index of each tenant, or vice versa. Accordingly, the directories 312A and 312B can, in certain embodiments, correspond to sub-directories of a tenant or include sub-directories for different tenants.

In the illustrated embodiment of FIG. 3B, two sub-directories 314A and 314B of the _main directory 312A and one sub-directory 312C of the _test directory 312B are shown. The sub-directories 314A, 314B, and 314C can correspond to buckets of the indexes associated with the directories 312A and 312B. For example, the sub-directories 314A and 314B can correspond to buckets "B1" and "B2," respectively, of the index "_main" and the sub-directory 314C can correspond to bucket "B1" of the index "_test." Accordingly, even though there are two "B1" buckets shown, as each "B1" bucket is associated with a different index (and corresponding directory 312), the system 102 can uniquely identify them.

Although illustrated as buckets "B1" and "B2," it will be understood that the buckets (and/or corresponding sub-directories 314) can be named in a variety of ways. In certain embodiments, the bucket (or sub-directory) names can include information about the bucket. For example, the bucket name can include the name of the index with which the bucket is associated, a time range of the bucket, etc.

As described herein, each bucket can have one or more files associated with it, including, but not limited to, one or more raw machine data files, bucket summary files, filter files, inverted indexes (also referred to herein as high-performance indexes or keyword indexes), permissions files, configuration files, etc. In the illustrated embodiment of FIG. 3B, the files associated with a particular bucket can be stored in the sub-directory corresponding to the particular bucket. Accordingly, the files stored in the sub-directory 314A can correspond to or be associated with bucket "B1" of index "_main," the files stored in the sub-directory 314B can correspond to or be associated with bucket "B2" of index "_main," and the files stored in the sub-directory 314C can correspond to or be associated with bucket "B1" of index "test."

FIG. 3B further illustrates an expanded event data file 316C showing an example of data that can be stored therein. In the illustrated embodiment, four events 320, 322, 324, and 326 of the machine data file 316C are shown in four rows. Each event 320-326 includes machine data 330 and a timestamp 332. The machine data 330 can correspond to the machine data received by the system 102. For example, in the illustrated embodiment, the machine data 330 of events 320, 322, 324, and 326 corresponds to portions 302A, 302B, 302C, and 302D, respectively, of the machine data 302 after it was processed by the indexing system 112.

Metadata 334-338 associated with the events 320-326 is also shown in the table 319. In the illustrated embodiment, the metadata 334-338 includes information about a host 334, source 336, and sourcetype 338 associated with the events 320-326. Any of the metadata can be extracted from the corresponding machine data, or supplied or defined by an entity, such as a user or computer system. The metadata fields 334-338 can become part of, stored with, or otherwise associated with the events 320-326. In certain embodiments, the metadata 334-338 can be stored in a separate file of the sub-directory 314C and associated with the machine data file 316C. In some cases, while the timestamp 332 can be extracted from the raw data of each event, the values for the other metadata fields may be determined by the indexing system 112 based on information it receives pertaining to the host device 104 or data source of the data separate from the machine data.

While certain default or user-defined metadata fields can be extracted from the machine data for indexing purposes, the machine data within an event can be maintained in its original condition. As such, in embodiments in which the portion of machine data included in an event is unprocessed or otherwise unaltered, it is referred to herein as a portion of raw machine data. For example, in the illustrated embodiment, the machine data of events 320-326 is identical to the portions of the machine data 302A-302D, respectively, used to generate a particular event. Similarly, the entirety of the machine data 302 may be found across multiple events. As such, unless certain information needs to be removed for some reasons (e.g., extraneous information, confidential information, etc.), all the raw machine data contained in an event can be preserved and saved in its original form. Accordingly, the data store in which the event records are stored is sometimes referred to as a "raw record data store." The raw record data store contains a record of the raw event data tagged with the various fields.

In other embodiments, the portion of machine data in an event can be processed or otherwise altered relative to the machine data used to create the event. With reference to the machine data 304, the machine data of a corresponding event (or events) may be modified such that only a portion of the machine data 304 is stored as one or more events. For example, in some cases, only machine data 304B of the machine data 304 may be retained as one or more events, or the machine data 304 may be altered to remove duplicate data, confidential information, etc.

In FIG. 3B, the first three rows of the table 319 present events 320, 322, and 324 and are related to a server access log that records requests from multiple clients processed by a server, as indicated by entry of "access.log" in the source column 336. In the example shown in FIG. 3B, each of the events 320-324 is associated with a discrete request made to the server by a client. The raw machine data generated by the server and extracted from a server access log can include the IP address 1140 of the client, the user id 1141 of the person requesting the document, the time 1142 the server finished processing the request, the request line 1143 from the client, the status code 1144 returned by the server to the client, the size of the object 1145 returned to the client (in this case, the GIF file requested by the client), and the time spent 1146 to serve the request in microseconds. In the illustrated embodiments of FIGS. 3A and 3B, all the raw machine data retrieved from the server access log is retained and stored as part of the corresponding events 320-324 in the file 316C.

Event 326 is associated with an entry in a server error log, as indicated by "error.log" in the source column 336 that records errors that the server encountered when processing a client request. Similar to the events related to the server access log, all the raw machine data in the error log file pertaining to event 326 can be preserved and stored as part of the event 326.

Saving minimally processed or unprocessed machine data in a data store associated with metadata fields in the manner similar to that shown in FIG. 3B is advantageous because it allows a search of all the machine data at search time instead of searching only previously specified and identified fields or field-value pairs. As mentioned above, because data structures used by various embodiments of the present disclosure maintain the underlying raw machine data and use a late-binding schema for searching the raw machines data, it enables a user to continue investigating and learn valuable insights about the raw data. In other words, the user is not compelled to know about all the fields of information that will be needed at data-ingestion time. As a user learns more about the data in the events, the user can continue to refine the late-binding schema by defining new extraction rules, or modifying or deleting existing extraction rules used by the system.

FIG. 3C illustrates an embodiment of another file that can be included in one or more sub-directories 314 or buckets. Specifically, FIG. 3C illustrates an exploded view of an embodiment of an inverted index 318B in the sub-directory 314B, associated with bucket "B2" of the index "_main," as well as an event reference array 340 associated with the inverted index 318B.

In some embodiments, the inverted indexes 318 can correspond to distinct time-series buckets. As such, each inverted index 318 can correspond to a particular range of time for an index. In the illustrated embodiment of FIG. 3C, the inverted indexes 318A and 318B correspond to the buckets "B1" and "B2," respectively, of the index "_main," and the inverted index 318C corresponds to the bucket "B1" of the index "_test." In some embodiments, an inverted index 318 can correspond to multiple time-series buckets (e.g., can include information related to multiple buckets) or inverted indexes 318 can correspond to a single time-series bucket.

Each inverted index 318 can include one or more entries, such as keyword (or token) entries 342 or field-value pair entries 344. Furthermore, in certain embodiments, the inverted indexes 318 can include additional information, such as a time range 346 associated with the inverted index or an index identifier 348 identifying the index associated with the inverted index 318. It will be understood that each inverted index 318 can include less or more information than depicted. For example, in some cases, the inverted indexes 318 may omit a time range 346 and/or index identifier 348. In some such embodiments, the index associated with the inverted index 318 can be determined based on the location (e.g., directory 312) of the inverted index 318 and/or the time range of the inverted index 318 can be determined based on the name of the sub-directory 314.

Token entries, such as token entries 342 illustrated in inverted index 318B, can include a token 342A (e.g., "error," "itemID," etc.) and event references 342B indicative of events that include the token. For example, for the token "error," the corresponding token entry includes the token "error" and an event reference, or unique identifier, for each event stored in the corresponding time-series bucket that includes the token "error." In the illustrated embodiment of FIG. 3C, the error token entry includes the identifiers 3, 5, 6, 8, 11, and 12 corresponding to events located in the bucket "B2" of the index "_main."

In some cases, some token entries can be default entries, automatically determined entries, or user-specified entries.

In some embodiments, the indexing system 112 can identify each word or string in an event as a distinct token and generate a token entry for the identified word or string. In some cases, the indexing system 112 can identify the beginning and ending of tokens based on punctuation, spaces, etc. In certain cases, the indexing system 112 can rely on user input or a configuration file to identify tokens for token entries 342, etc. It will be understood that any combination of token entries can be included as a default, automatically determined, or included based on user-specified criteria.

Similarly, field-value pair entries, such as field-value pair entries 344 shown in inverted index 318B, can include a field-value pair 344A and event references 344B indicative of events that include a field value that corresponds to the field-value pair (or the field-value pair). For example, for a field-value pair sourcetype::sendmail, a field-value pair entry 344 can include the field-value pair "sourcetype::sendmail" and a unique identifier, or event reference, for each event stored in the corresponding time-series bucket that includes a sourcetype "sendmail."

In some cases, the field-value pair entries 344 can be default entries, automatically determined entries, or user-specified entries. As a non-limiting example, the field-value pair entries for the fields "host," "source," and "sourcetype" can be included in the inverted indexes 318 as a default. As such, all of the inverted indexes 318 can include field-value pair entries for the fields "host," "source," and "sourcetype." As yet another non-limiting example, the field-value pair entries for the field "IP_address" can be user-specified and may only appear in the inverted index 318B or the inverted indexes 318A and 318B of the index "_main" based on user-specified criteria. As another non-limiting example, as the indexing system 112 indexes the events, it can automatically identify field-value pairs and create field-value pair entries 344. For example, based on the indexing system's 212 review of events, it can identify IP_address as a field in each event and add the IP_address field-value pair entries to the inverted index 318B (e.g., based on punctuation, like two keywords separated by an '=' or ':' etc.). It will be understood that any combination of field-value pair entries can be included as a default, automatically determined, or included based on user-specified criteria.

With reference to the event reference array 340, each unique identifier 350, or event reference, can correspond to a unique event located in the time series bucket or machine data file 316B. The same event reference can be located in multiple entries of an inverted index 318. For example, if an event has a sourcetype "splunkd," host "www1" and token "warning," then the unique identifier for the event can appear in the field-value pair entries 344 "sourcetype::splunkd" and "host::www1," as well as the token entry "warning." With reference to the illustrated embodiment of FIG. 3C and the event that corresponds to the event reference 3, the event reference 3 is found in the field-value pair entries 344 "host::hostA," "source::sourceB," "sourcetype::sourcetypeA," and "IP_address::91.205.189.15" indicating that the event corresponding to the event references is from hostA, sourceB, of sourcetypeA, and includes "91.205.189.15" in the event data.

For some fields, the unique identifier is located in only one field-value pair entry for a particular field. For example, the inverted index 318 may include four sourcetype field-value pair entries 344 corresponding to four different sourcetypes of the events stored in a bucket (e.g., sourcetypes: sendmail, splunkd, web_access, and web_service). Within those four sourcetype field-value pair entries, an identifier for a particular event may appear in only one of the field-value pair entries. With continued reference to the example illustrated embodiment of FIG. 3C, since the event reference 7 appears in the field-value pair entry "sourcetype::sourcetypeA," then it does not appear in the other field-value pair entries for the sourcetype field, including "sourcetype::sourcetypeB," "sourcetype::sourcetypeC," and "sourcetype::sourcetypeD."

The event references 350 can be used to locate the events in the corresponding bucket or machine data file 316. For example, the inverted index 318B can include, or be associated with, an event reference array 340. The event reference array 340 can include an array entry 350 for each event reference in the inverted index 318B. Each array entry 350 can include location information 352 of the event corresponding to the unique identifier (non-limiting examples: seek address of the event, physical address, slice ID, etc.), a timestamp 354 associated with the event, or additional information regarding the event associated with the event reference, etc.

For each token entry 342 or field-value pair entry 344, the event reference 342B and 344B, respectively, or unique identifiers can be listed in chronological order, or the value of the event reference can be assigned based on chronological data, such as a timestamp associated with the event referenced by the event reference. For example, the event reference 1 in the illustrated embodiment of FIG. 3C can correspond to the first-in-time event for the bucket, and the event reference 12 can correspond to the last-in-time event for the bucket. However, the event references can be listed in any order, such as reverse chronological order, ascending order, descending order, or some other order (e.g., based on time received or added to the machine data file), etc. Further, the entries can be sorted. For example, the entries can be sorted alphabetically (collectively or within a particular group), by entry origin (e.g., default, automatically generated, user-specified, etc.), by entry type (e.g., field-value pair entry, token entry, etc.), or chronologically by when added to the inverted index, etc. In the illustrated embodiment of FIG. 3C, the entries are sorted first by entry type and then alphabetically.

In some cases, inverted indexes 318 can decrease the search time of a query. For example, for a statistical query, by using the inverted index, the system 102 can avoid the computational overhead of parsing individual events in a machine data file 316. Instead, the system 102 can use the inverted index 318 separate from the raw record data store to generate responses to the received queries.

3.0. Query Processing and Execution

Figure 4A:
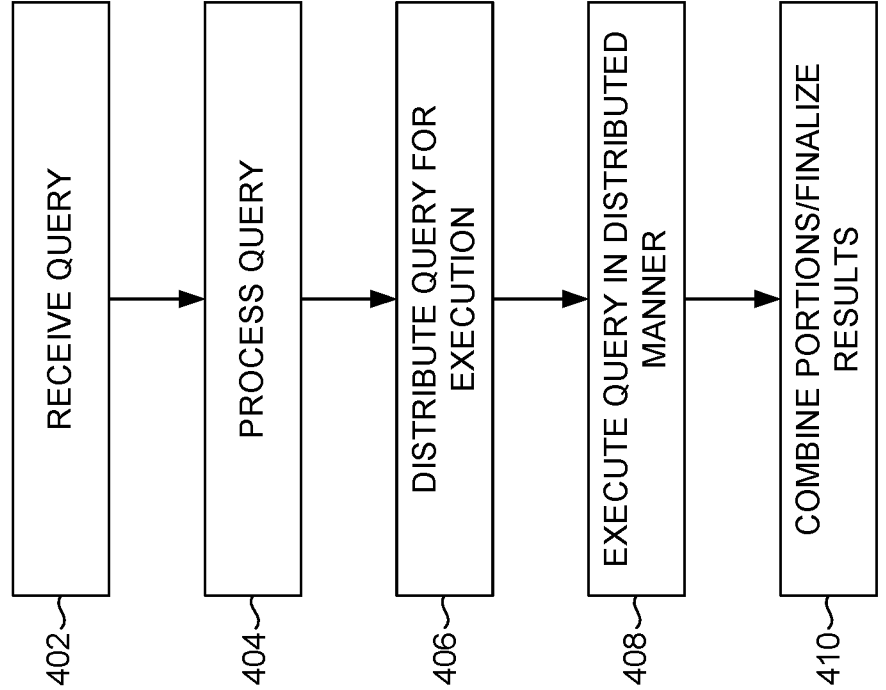
FIG. 4A is a flow diagram illustrating an embodiment of a routine implemented by the query system to execute a query.

FIG. 4A is a flow diagram illustrating an embodiment of a routine implemented by the query system 114 for executing a query. At block 402, the query system 114 receives a search query. As described herein, the query can be in the form of a pipelined command language or other query language and include filter criteria used to identify a set of data and processing criteria used to process the set of data.

At block 404, the query system 114 processes the query. As part of processing the query, the query system 114 can determine whether the query was submitted by an authenticated user and/or review the query to determine that it is in a proper format for the data intake and query system 102, has correct semantics and syntax, etc. In addition, the query system 114 can determine what, if any, configuration files or other configurations to use as part of the query.

In addition, as part of processing the query, the query system 114 can determine what portion(s) of the query to execute in a distributed manner (e.g., what to delegate to search nodes) and what portions of the query to execute in a non-distributed manner (e.g., what to execute on the search head). For the parts of the query that are to be executed in a distributed manner, the query system 114 can generate specific commands for the components that are to execute the query. This may include generating sub-queries, partial queries, or different phases of the queries for execution by different components of the query system 114. In some cases, the query system 114 can use map-reduce techniques to determine how to map the data for the search and then reduce the data. Based on the map-reduce phases, the query system 114 can generate query commands for different components of the query system 114.

As part of processing the query, the query system 114 can determine where to obtain the data. For example, in some cases, the data may reside on one or more indexing nodes or search nodes as part of the storage system 116, or may reside in a shared storage system or a system external to the system 102. In some cases, the query system 114 can determine what components to use to obtain and process the data. For example, the query system 114 can identify search nodes that are available for the query, etc.

At block 406, the query system 1206 distributes the determined portions or phases of the query to the appropriate components (e.g., search nodes). In some cases, the query system 1206 can use a catalog to determine which components to use to execute the query (e.g., which components include relevant data and/or are available, etc.).

At block 408, the components assigned to execute the query execute the query. As mentioned, different components may execute different portions of the query. In some cases, multiple components (e.g., multiple search nodes) may execute respective portions of the query concurrently and communicate results of their portion of the query to another component (e.g., search head). As part of identifying the set of data or applying the filter criteria, the components of the query system 114 can search for events that match the criteria specified in the query. These criteria can include matching keywords or specific values for certain fields. The searching operations at block 408 may use the late-binding schema to extract values for specified fields from events at the time the query is processed. In some embodiments, one or more rules for extracting field values may be specified as part of a sourcetype definition in a configuration file or in the query itself. In certain embodiments where search nodes are used to obtain the set of data, the search nodes can send the relevant events back to the search head, or use the events to determine a partial result, and send the partial result back to the search head.

At block 410, the query system 114 combines the partial results and/or events to produce a final result for the query. As mentioned, in some cases, combining the partial results and/or finalizing the results can include further processing the data according to the query. Such processing may entail joining different sets of data, transforming the data, and/or performing one or more mathematical operations on the data, preparing the results for display, etc.

In some examples, the results of the query are indicative of performance or security of the IT environment and may help improve the performance of components in the IT environment. This final result may comprise different types of data, depending on what the query requested. For example, the results can include a listing of matching events returned by the query, or some type of visualization of the data from the returned events. In another example, the final result can include one or more calculated values derived from the matching events.

The results generated by the query system 114 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as “search jobs,” and the client may retrieve the results by referring to the search jobs.

The query system 114 can also perform various operations to make the search more efficient. For example, before the query system 114 begins execution of a query, it can determine a time range for the query and a set of common keywords that all matching events include. The query system 114 may then use these parameters to obtain a superset of the eventual results. Then, during a filtering stage, the query system 114 can perform field-extraction operations on the superset to produce a reduced set of search results. This speeds up queries, which may be particularly helpful for queries that are performed on a periodic basis. In some cases, to make the search more efficient, the query system 114 can use information known about certain data sets that are part of the query to filter other data sets. For example, if an early part of the query includes instructions to obtain data with a particular field, but later commands of the query do not rely on the data with that particular field, the query system 114 can omit the superfluous part of the query from execution.

Various embodiments of the present disclosure can be implemented using, or in conjunction with, a pipelined command language. A pipelined command language is a language in which a set of inputs or data is operated on by a first command in a sequence of commands, and then subsequent commands in the order they are arranged in the sequence. Such commands can include any type of functionality for operating on data, such as retrieving, searching, filtering, aggregating, processing, transmitting, and the like. As described herein, a query can thus be formulated in a pipelined command language and include any number of ordered or unordered commands for operating on data.

Splunk Processing Language (SPL) is an example of a pipelined command language in which a set of inputs or data is operated on by any number of commands in a particular sequence. A sequence of commands, or command sequence, can be formulated such that the order in which the commands are arranged defines the order in which the commands are applied to a set of data or the results of an earlier executed command. For example, a first command in a command sequence can include filter criteria used to search or filter for specific data. The results of the first command can then be passed to another command listed later in the command sequence for further processing.

In various embodiments, a query can be formulated as a command sequence defined in a command line of a search UI. In some embodiments, a query can be formulated as a sequence of SPL commands. Some or all of the SPL commands in the sequence of SPL commands can be separated from one another by a pipe symbol “|.” In such embodiments, a set of data, such as a set of events, can be operated on by a first SPL command in the sequence, and then a subsequent SPL command following a pipe symbol "|" after the first SPL command operates on the results produced by the first SPL command or other set of data, and so on for any additional SPL commands in the sequence. As such, a query formulated using SPL comprises a series of consecutive commands that are delimited by pipe "|" characters. The pipe character indicates to the system that the output or result of one command (to the left of the pipe) should be used as the input for one of the subsequent commands (to the right of the pipe). This enables formulation of queries defined by a pipeline of sequenced commands that refines or enhances the data at each step along the pipeline until the desired results are attained. Accordingly, various embodiments described herein can be implemented with Splunk Processing Language (SPL) used in conjunction with the SPLUNK® ENTERPRISE system.

While a query can be formulated in many ways, a query can start with a search command and one or more corresponding search terms or filter criteria at the beginning of the pipeline. Such search terms or filter criteria can include any combination of keywords, phrases, times, dates, Boolean expressions, field name-field value pairs, etc., that specify which results should be obtained from different locations. The results can then be passed as inputs into subsequent commands in a sequence of commands by using, for example, a pipe character. The subsequent commands in a sequence can include directives for additional processing of the results once it has been obtained from one or more indexes. For example, commands may be used to filter unwanted information out of the results, extract more information, evaluate field values, calculate statistics, reorder the results, create an alert, create a summary of the results, or perform some type of aggregation function. In some embodiments, the summary can include a graph, chart, metric, or other visualization of the data. An aggregation function can include analysis or calculations to return an aggregate value, such as an average value, a sum, a maximum value, a root mean square, statistical values, and the like.

Due to its flexible nature, use of a pipelined command language in various embodiments is advantageous because it can perform "filtering" as well as "processing" functions. In other words, a single query can include a search command and search term expressions, as well as data-analysis expressions. For example, a command at the beginning of a query can perform a "filtering" step by retrieving a set of data based on a condition (e.g., records associated with server response times of less than 1 microsecond). The results of the filtering step can then be passed to a subsequent command in the pipeline that performs a "processing" step (e.g., calculation of an aggregate value related to the filtered events such as the average response time of servers with response times of less than 1 microsecond). Furthermore, the search command can allow events to be filtered by keyword as well as field criteria. For example, a search command can filter events based on the word "warning" or filter events based on a field value "10.0.1.2" associated with a field "clientip."

The results obtained or generated in response to a command in a query can be considered a set of results data. The set of results data can be passed from one command to another in any data format. In one embodiment, the set of results data can be in the form of a dynamically created table. Each command in a particular query can redefine the shape of the table. In some implementations, an event retrieved from an index in response to a query can be considered a row with a column for each field value. Columns can contain basic information about the data and/or data that has been dynamically extracted at search time.

Figure 4B:
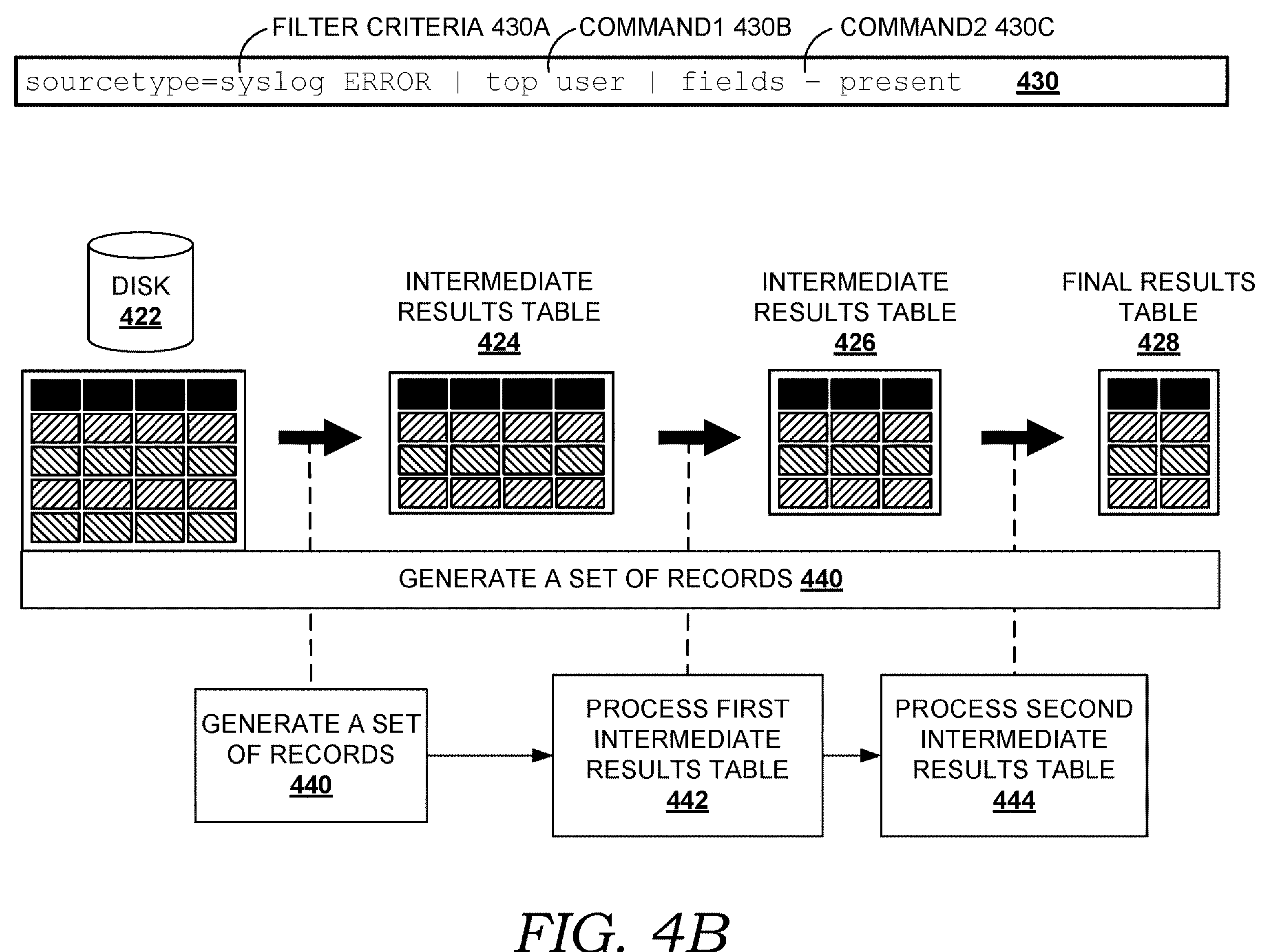
FIG. 4B provides a visual representation of the manner in which a pipelined command language or query can operate

FIG. 4B provides a visual representation of the manner in which a pipelined command language or query can operate in accordance with the disclosed embodiments. The query 430 can be input by the user and submitted to the query system 114. In the illustrated embodiment, the query 430 comprises filter criteria 430A, followed by two commands 430B and 430C (namely, Command 1 and Command 2). Disk 422 represents data as it is stored in a data store to be searched. For example, disk 422 can represent a portion of the storage system 116 or some other data store that can be searched by the query system 114. Individual rows can represent different events and columns can represent different fields for the different events. In some cases, these fields can include raw machine data, host, source, and sourcetype.

At block 440, the query system 114 uses the filter criteria 430A (e.g., "sourcetype=syslog ERROR") to filter events stored on the disk 422 to generate an intermediate results table 424. Given the semantics of the query 430 and order of the commands, the query system 114 can execute the filter criteria 430A portion of the query 430 before executing Command 1 or Command 2.

Rows in the table 424 may represent individual records, where each record corresponds to an event in the disk 422 that satisfies the filter criteria. Columns in the table 424 may correspond to different fields of an event or record, such as "user," "count," percentage," "timestamp," or the raw machine data of an event, etc. Notably, the fields in the intermediate results table 424 may differ from the fields of the events on the disk 422. In some cases, this may be due to the late binding schema described herein that can be used to extract field values at search time. Thus, some of the fields in table 424 may not have existed in the events on disk 422.

Illustratively, the intermediate results table 424 has fewer rows than what is shown in the disk 422 because only a subset of events retrieved from the disk 422 match the filter criteria 430A "sourcetype=syslog ERROR." In some embodiments, instead of searching individual events or raw machine data, the set of events in the intermediate results table 424 may be generated by a call to a pre-existing inverted index.

At block 442, the query system 114 processes the events of the first intermediate results table 424 to generate the second intermediate results table 426. With reference to the query 430, the query system 114 processes the events of the first intermediate results table 424 to identify the top users according to Command 1. This processing may include determining a field value for the field "user" for each record in the intermediate results table 424, counting the number of unique instances of each "user" field value (e.g., number of users with the name David, John, Julie, etc.) within the intermediate results table 424, ordering the results from largest to smallest based on the count, and then keeping only the top 10 results (e.g., keep an identification of the top 10 most common users). Accordingly, each row of table 426 can represent a record that includes a unique field value for the field "user," and each column can represent a field for that record, such as field "user," "count," and "percentage."

At block 444, the query system 114 processes the second intermediate results table 426 to generate the final results table 428. With reference to query 430, the query system 114 applies the command "fields-present" to the second intermediate results table 426 to generate the final results table 428. As shown, the command "fields-present" of the query 430 results in one less column, which may represent that a field was removed during processing. For example, the query system 114 may have determined that the field "percentage" was unnecessary for displaying the results based on the Command 2. In such a scenario, each record of the final results table 428 would include a field "user" and "count." Further, the records in the table 428 would be ordered from largest count to smallest count based on the query commands.

It will be understood that the final results table 428 can be a third intermediate results table, which can be pipelined to another stage where further filtering or processing of the data can be performed, e.g., preparing the data for display purposes, filtering the data based on a condition, performing a mathematical calculation with the data, etc. In different embodiments, other query languages, such as the Structured Query Language ("SQL"), can be used to create a query.

As described herein, extraction rules can be used to extract field-value pairs or field values from data. An extraction rule can comprise one or more regex rules that specify how to extract values for the field corresponding to the extraction rule. In addition to specifying how to extract field values, the extraction rules may also include instructions for deriving a field value by performing a function on a character string or value retrieved by the extraction rule. For example, an extraction rule may truncate a character string or convert the character string into a different data format. Extraction rules can be used to extract one or more values for a field from events by parsing the portions of machine data in the events and examining the data for one or more patterns of characters, numbers, delimiters, etc., that indicate where the field begins and, optionally, ends. In certain embodiments, extraction rules can be stored in one or more configuration files. In some cases, a query itself can specify one or more extraction rules.

In some cases, extraction rules can be applied at data ingest by the intake system 110 and/or indexing system 112. For example, the intake system 110 and indexing system 112 can apply extraction rules to ingested data and/or events generated from the ingested data and store results in an inverted index.

The system 102 advantageously allows for search time field extraction. In other words, fields can be extracted from the event data at search time using late-binding schema as opposed to at data-ingestion time, which was a major limitation of the prior art systems. Accordingly, extraction rules can be applied at search time by the query system 114. The query system can apply extraction rules to events retrieved from the storage system 116 or data received from sources external to the system 102. Extraction rules can be applied to all the events in the storage system 116 or to a subset of the events that have been filtered based on some filter criteria (e.g., event timestamp values, etc.).

Figure 4C:
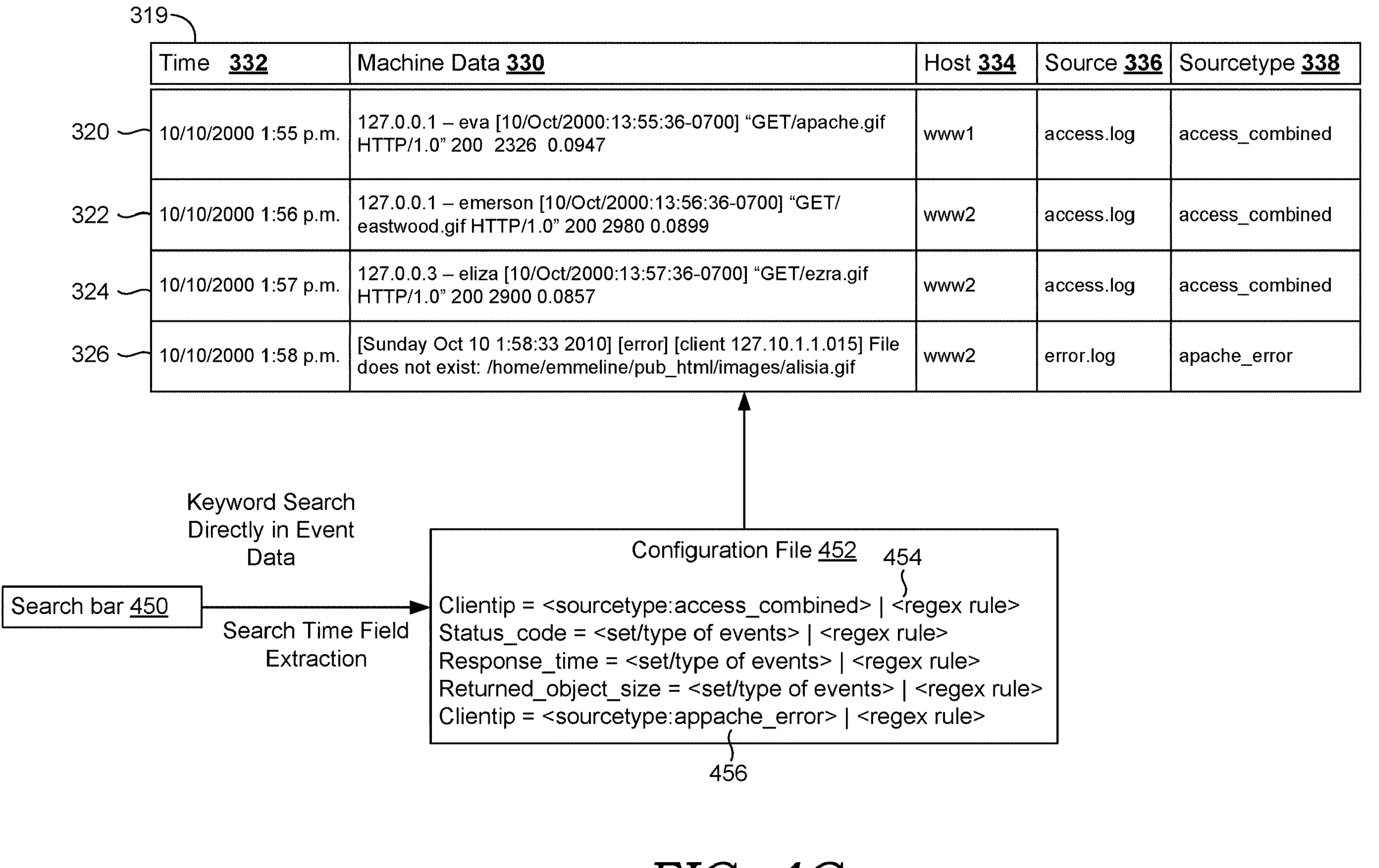
FIG. 4C is a block diagram illustrating an embodiment of a configuration file that includes various extraction rules that can be applied to events.

FIG. 4C is a block diagram illustrating an embodiment of the table 319 showing events 320-326, described previously with reference to FIG. 3B. As described herein, the table 319 is for illustrative purposes, and the events 320-326 may be stored in a variety of formats in an event data file 316 or raw record data store. Further, it will be understood that the event data file 316 or raw record data store can store millions of events. FIG. 4C also illustrates an embodiment of a search bar 450 for entering a query and a configuration file 452 that includes various extraction rules that can be applied to the events 320-326.

As a non-limiting example, if a user inputs a query into search bar 450 that includes only keywords (also known as "tokens"), e.g., the keyword "error" or "warning," the query system 114 can search for those keywords directly in the events 320-326 stored in the raw record data store.

As described herein, the indexing system 112 can optionally generate and use an inverted index with keyword entries to facilitate fast keyword searching for event data. If a user searches for a keyword that is not included in the inverted index, the query system 114 may nevertheless be able to retrieve the events by searching the event data for the keyword in the event data file 316 or raw record data store directly. For example, if a user searches for the keyword "eva," and the name "eva" has not been indexed at search time, the query system 114 can search the events 320-326 directly and return the first event 320. In the case where the keyword has been indexed, the inverted index can include a reference pointer that will allow for a more efficient retrieval of the event data from the data store. If the keyword has not been indexed, the query system 114 can search through the events in the event data file to service the search.

In many cases, a query includes fields. The term "field" refers to a location in the event data containing one or more values for a specific data item. Often, a field is a value with a fixed, delimited position on a line, or a name and value pair, where there is a single value to each field name. A field can also be multivalued—that is, it can appear more than once in an event and have a different value for each appearance, e.g., email address fields. Fields are searchable by the field name or field name-value pairs. Some examples of fields are "clientip" for IP addresses accessing a web server, or the "From" and "To" fields in email addresses.

By way of further example, consider the query, "status=404." This search query finds events with "status" fields that have a value of "404." When the search is run, the query system 114 does not look for events with any other "status" value. It also does not look for events containing other fields that share "404" as a value. As a result, the search returns a set of results that are more focused than if "404" had been used in the search string as part of a keyword search. Note also that fields can appear in events as "key=value" pairs, such as "user_name=Bob." But in most cases, field values appear in fixed, delimited positions without identifying keys. For example, the data store may contain events where the "user_name" value always appears by itself after the timestamp, as illustrated by the following string: "Nov 15 09:33:22 evaemerson."

FIG. 4C illustrates the manner in which configuration files may be used to configure custom fields at search time in accordance with the disclosed embodiments. In response to receiving a query, the query system 114 determines if the query references a "field." For example, a query may request a list of events where the "clientip" field equals "127.0.0.1." If the query itself does not specify an extraction rule and if the field is not an indexed metadata field, e.g., time, host, source, sourcetype, etc., then in order to determine an extraction rule, the query system 114 may, in one or more embodiments, locate configuration file 452 during the execution of the query.

Configuration file 452 may contain extraction rules for various fields, e.g., the "clientip" field. The extraction rules may be inserted into the configuration file 452 in a variety of ways. In some embodiments, the extraction rules can comprise regular expression rules that are manually entered in by the user.

In one or more embodiments, as noted above, a field extractor may be configured to automatically generate extraction rules for certain field values in the events when the events are being created, indexed, or stored, or possibly at a later time. In one embodiment, a user may be able to dynamically create custom fields by highlighting portions of a sample event that should be extracted as fields using a graphical user interface. The system can then generate a regular expression that extracts those fields from similar events and store the regular expression as an extraction rule for the associated field in the configuration file 452.

In some embodiments, the indexing system 112 can automatically discover certain custom fields at index time, and the regular expressions for those fields will be automatically generated at index time and stored as part of the extraction rules in configuration file 452. For example, fields that appear in the event data as "key=value" pairs may be automatically extracted as part of an automatic field discovery process. Note that there may be several other ways of adding field definitions to configuration files in addition to the methods discussed herein.

Events from heterogeneous sources that are stored in the storage system 116 may contain the same fields in different locations due to discrepancies in the format of the data generated by the various sources. For example, event 326 also contains a "clientip" field, however, the "clientip" field is in a different format from events 320, 322, and 324. Furthermore, certain events may not contain a particular field at all. To address the discrepancies in the format and content of the different types of events, the configuration file 452 can specify the set of events to which an extraction rule applies. For example, extraction rule 454 specifies that it is to be used with events having a sourcetype "access_combined," and extraction rule 456 specifies that it is to be used with events having a sourcetype "apache_error." Other extraction rules shown in configuration file 452 specify a set or type of events to which they apply. In addition, the extraction rules shown in configuration file 452 include a regular expression for parsing the identified set of events to determine the corresponding field value. Accordingly, each extraction rule may pertain to only a particular type of event. Accordingly, if a particular field, e.g., "clientip" occurs in multiple types of events, each of those types of events can have its own corresponding extraction rule in the configuration file 452, and each of the extraction rules would comprise a different regular expression to parse out the associated field value. In some cases, the sets of events are grouped by sourcetype because events generated by a particular source can have the same format.

The field extraction rules stored in configuration file 452 can be used to perform search-time field extractions. For example, for a query that requests a list of events with sourcetype "access_combined" where the "clientip" field equals "127.0.0.1," the query system 114 can locate the configuration file 452 to retrieve extraction rule 454 that allows it to extract values associated with the "clientip" field from the events where the sourcetype is "access_combined" (e.g., events 320-324). After the "clientip" field has been extracted from the events 320, 322, and 324, the query system 114 can then apply the field criteria by performing a compare operation to filter out events where the "clientip" field does not equal "127.0.0.1." In the example shown in FIG. 4C, the events 320 and 322 would be returned in response to the user query. In this manner, the query system 114 can service queries with filter criteria containing field criteria and/or keyword criteria.

It should also be noted that any events filtered by performing a search-time field extraction using a configuration file 452 can be further processed by directing the results of the filtering step to a processing step using a pipelined search language. Using the prior example, a user can pipeline the results of the compare step to an aggregate function by asking the query system 114 to count the number of events where the "clientip" field equals "127.0.0.1."

By providing the field definitions for the queried fields at search time, the configuration file 452 allows the event data file or raw record data store to be field-searchable. In other words, the raw record data store can be searched using keywords as well as fields, wherein the fields are searchable name-value pairings that can distinguish one event from another event and can be defined in configuration file 452 using extraction rules. In comparison to a search containing field names, a keyword search may result in a search of the event data directly without the use of a configuration file.

Further, the ability to add schema to the configuration file 452 at search time results in increased efficiency and flexibility. A user can create new fields at search time and simply add field definitions to the configuration file 452. As a user learns more about the data in the events, the user can continue to refine the late-binding schema by adding new fields, deleting fields, or modifying the field extraction rules in the configuration file for use the next time the schema is used by the system 102. Because the system 102 maintains the underlying raw data and uses late-binding schema for searching the raw data, it enables a user to continue investigating and learn valuable insights about the raw data long after data-ingestion time. Similarly, multiple field definitions can be added to the configuration file to capture the same field across events generated by different sources or sourcetypes. This allows the system 102 to search and correlate data across heterogeneous sources flexibly and efficiently.

The system 102 can use one or more data models to search and/or better understand data. A data model is a hierarchically structured search-time mapping of semantic knowledge about one or more datasets. It encodes the domain knowledge used to build a variety of specialized searches of those datasets. Those searches, in turn, can be used to generate reports.

The above-described system provides significant flexibility by enabling a user to analyze massive quantities of minimally processed data "on the fly" at search time using a late-binding schema, instead of storing pre-specified portions of the data in a database at ingestion time. This flexibility enables a user to see valuable insights, correlate data, and perform subsequent queries to examine interesting aspects of the data that may not have been apparent at ingestion time.

Performing extraction and analysis operations at search time can involve a large amount of data and require a large number of computational operations, which can cause delays in processing the queries. In some embodiments, the system 102 can employ a number of unique acceleration techniques to speed up analysis operations performed at search time. These techniques include: performing search operations in parallel using multiple components of the query system 114, using an inverted index 118, and accelerating the process of generating reports.

To facilitate faster query processing, a query can be structured such that multiple components of the query system 114 (e.g., search nodes) perform the query in parallel, while aggregation of search results from the multiple components is performed at a particular component (e.g., search head). For example, consider a scenario in which a user enters the query "Search "error" | stats count BY host." The query system 114 can identify two phases for the query, including: (1) subtasks (e.g., data retrieval or simple filtering) that may be performed in parallel by multiple components, such as search nodes, and (2) a search results aggregation operation to be executed by one component, such as the search head, when the results are ultimately collected from the search nodes.

Based on this determination, the query system 114 can generate commands to be executed in parallel by the search nodes, with each search node applying the generated commands to a subset of the data to be searched. In this example, the query system 114 generates and then distributes the following commands to the individual search nodes: "Search "error" | prestats count BY host." In this example, the "prestats" command can indicate that individual search nodes are processing a subset of the data and are responsible for producing partial results and sending them to the search head. After the search nodes return the results to the search head, the search head aggregates the received results to form a single search result set. By executing the query in this manner, the system effectively distributes the computational operations across the search nodes while reducing data transfers. It will be understood that the query system 114 can employ a variety of techniques to use distributed components to execute a query. In some embodiments, the query system 114 can use distributed components for only mapping functions of a query (e.g., gather data, applying filter criteria, etc.). In certain embodiments, the query system 114 can use distributed components for mapping and reducing functions (e.g., joining data, combining data, reducing data, etc.) of a query.

4.0. Example Use Cases

The system 102 provides various schemas, dashboards, and visualizations that simplify developers' tasks to create applications with additional capabilities, including but not limited to security, data center monitoring, IT service monitoring, and client/customer insights.

An embodiment of an enterprise security application is as SPLUNK® ENTERPRISE SECURITY, which performs monitoring and alerting operations and includes analytics to facilitate identifying both known and unknown security threats based on large volumes of data stored by the system 102. The enterprise security application provides the security practitioner with visibility into security-relevant threats found in the enterprise infrastructure by capturing, monitoring, and reporting on data from enterprise security devices, systems, and applications. Through the use of the system's 102 searching and reporting capabilities, the enterprise security application provides a top-down and bottom-up view of an organization's security posture.

An embodiment of an IT monitoring application is SPLUNK® IT SERVICE INTELLIGENCE™, which performs monitoring and alerting operations. The IT monitoring application also includes analytics to help an analyst diagnose the root cause of performance problems based on large volumes of data stored by the system 102, as correlated to the various services an IT organization provides (a service-centric view). This differs significantly from conventional IT monitoring systems that lack the infrastructure to effectively store and analyze large volumes of service-related events. Traditional service monitoring systems typically use fixed schemas to extract data from pre-defined fields at data-ingestion time, wherein the extracted data is typically stored in a relational database. This data extraction process and associated reduction in data content that occurs at data-ingestion time inevitably hampers future investigations, when all of the original data may be needed to determine the root cause of or contributing factors to a service issue.

In contrast, an IT monitoring application system stores large volumes of minimally-processed service-related data at ingestion time for later retrieval and analysis at search time, to perform regular monitoring, or to investigate a service issue. To facilitate this data retrieval process, the IT monitoring application enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the events that pertain to the entity, whether produced by the entity itself or by another machine, and considering the many various ways the entity may be identified in machine data (such as by a URL, an IP address, or machine name). The service and entity definitions can organize events around a service so that all of the events pertaining to that service can be easily identified. This capability provides a foundation for the implementation of Key Performance Indicators.

As described herein, the system 102 can receive heterogeneous data from disparate systems. In some cases, the data from the disparate systems may be related, and correlating the data can result in insights into client or customer interactions with various systems of a vendor. To aid in the correlation of data across different systems, multiple field definitions can be added to one or more configuration files to capture the same field or data across events generated by different sources or sourcetypes. This can enable the system 102 to search and correlate data across heterogeneous sources flexibly and efficiently.

Figure 4D:
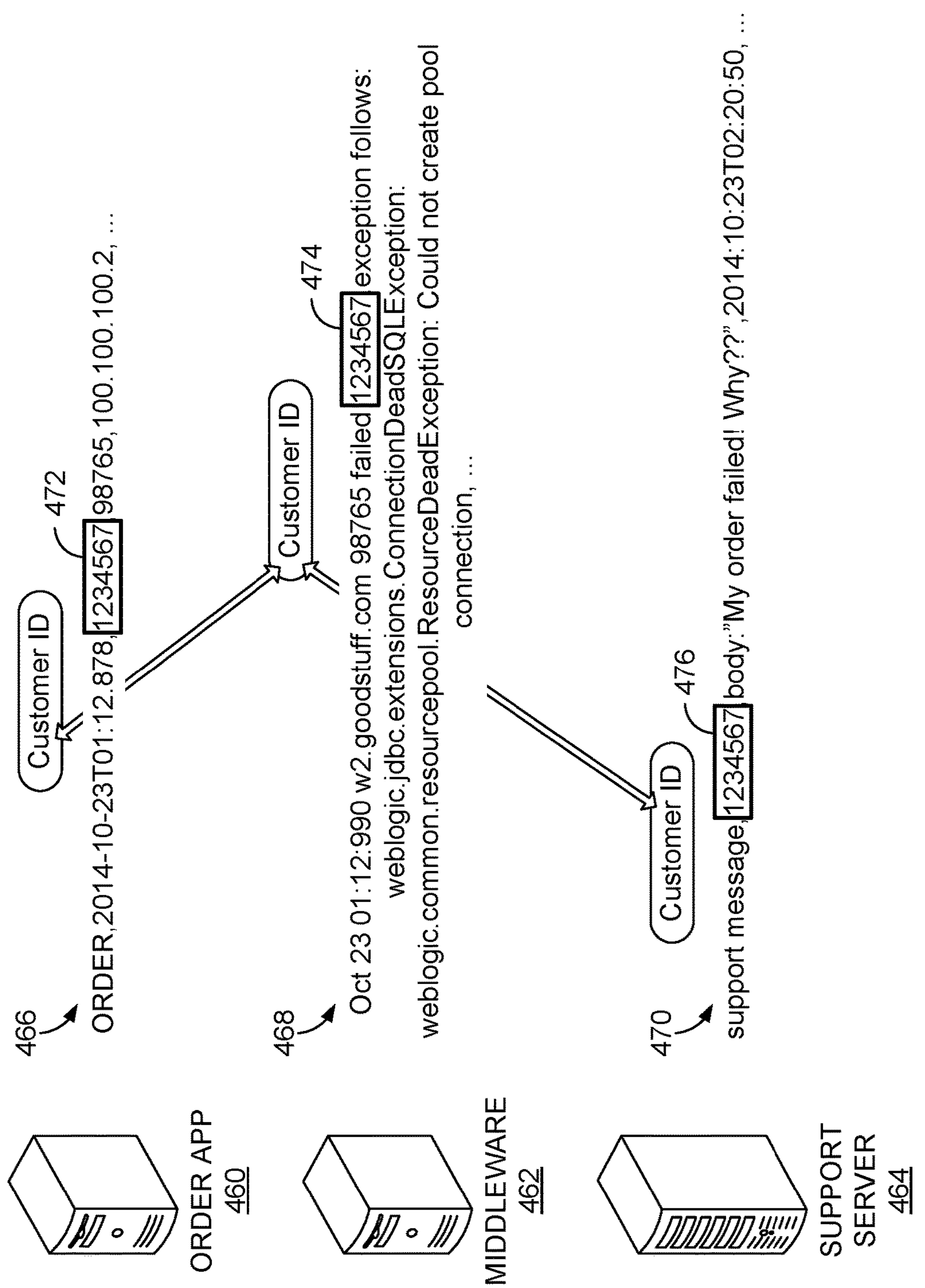
FIG. 4D is a block diagram illustrating an example scenario where a common customer identifier is found among log data received from disparate data sources.

As a non-limiting example and with reference to FIG. 4D, consider a scenario in which a common customer identifier is found among log data received from three disparate data sources. In this example, a user submits an order for merchandise using a vendor's shopping application program 460 running on the user's system. In this example, the order was not delivered to the vendor's server due to a resource exception at the destination server that is detected by the middleware code 462. The user then sends a message to the customer support server 464 to complain about the order failing to complete. The three systems 460, 462, and 464 are disparate systems that do not have a common logging format. The shopping application program 460 sends log data 466 to the system 102 in one format, the middleware code 462 sends error log data 468 in a second format, and the support server 464 sends log data 470 in a third format.

Using the log data received at the system 102 from the three systems 460, 462, and 464, the vendor can uniquely obtain an insight into user activity, user experience, and system behavior. The system 102 allows the vendor's administrator to search the log data from the three systems 460, 462, and 464, thereby obtaining correlated information, such as the order number and corresponding customer ID number of the person placing the order. The system 102 also allows the administrator to see a visualization of related events via a user interface. The administrator can query the system 102 for customer ID field value matches across the log data from the three systems 460, 462, and 464 that are stored in the storage system 116. While the customer ID field value exists in the data gathered from the three systems 460, 462, and 464, it may be located in different areas of the data given differences in the architecture of the systems. The query system 114 obtains events from the storage system 116 related to the three systems 460, 462, and 464. The query system 114 then applies extraction rules to the events in order to extract field values for the field "customer ID" that it can correlate. As described herein, the query system 114 may apply a different extraction rule to each set of events from each system when the event format differs among systems. In this example, a user interface can display to the administrator the events corresponding to the common customer ID field values 472, 474, and 476, thereby providing the administrator with insight into a customer's experience. The system 102 can provide additional user interfaces and reports to aid a user in analyzing the data associated with the customer.

5.0. Facilitating Efficient Management of Analytics in Analytics Management Service Software tools exist to enable or facilitate the storage, indexing, and searching of massive quantities of data. Analytics, such as cybersecurity analytics (e.g., including but not limited to computer network security), is one of many applications of such tools. For example, a software tool in the form of a data intake and query system (DIQS) may ingest, index, and store machine-generated data from various sources on a computer network. Such a system may be used in conjunction with an analytics service that applies various rules and/or algorithms to identify actual or potential security-related anomalies and threats from network data ingested by the DIQS. The analytics service, or component associated therewith, may provide a graphical user interface (GUI) that enables an analyst, such as a cybersecurity analyst, to monitor the status of the analyses (e.g., security-related analyses) to define and view results, for example, associated with cybersecurity-related searches of the ingested data.

An analytics service may include analytic algorithms (hereinafter simply "analytics") to analyze data. Analytics can be used to perform various types of analysis. For example, analytics may be used to perform cybersecurity-related analysis on data. In this way, data may be analyzed via analytic algorithms to detect anomalies and/or threats. In some cases, an extensive number of analytics may exist to perform different types of analysis. For instance, a set of 50 analytics may exist, with each analytic detecting different types of anomalies and/or threats. Storage and execution of such analytics is exacerbated when analytics are different for different tenants. By way of example only, assume a set of 50 analytics are made available for use by various tenants. Now assume a first tenant desires to use a first set of 48 analytics, and a second tenant desires to use a second set of 45 analytics. In such a case, the first set of analytics and the second set of analytics may be stored and executed separately on a per tenant basis, thereby increase computing resource utilization.

In some cases, analytics execution may be performed in a container-managed environment in a manner that enables a scalable and secure execution of analytics. A container-managed environment, or containerized-orchestration platform, generally refers to an environment, platform, or tool used to deploy, manage, and/or network container-based applications, systems, or workloads. In this way, a container-managed environment can maximize use of hardware resources, such as memory, storage I/O, and network bandwidth. One example of a container-management system or environment is Kubernetes. Kubernetes, as well as other container managers, can provide high-level abstractions for managing groups of containers.

At a high level, a container-orchestration environment (e.g., Kubernetes) can operate in association with a set of nodes or machines, such as physical machines and/or virtual machines. In operation, a container-managed environment may use a pod(s) to execute a process or task. A pod generally refers to a separately deployable unit of compute resources. In some contexts, a pod may be managed by an orchestration platform. A pod may include any number of containers.

In some contexts, a pod represents a single instance of an application or service (e.g., analytics management service) running in an orchestration platform. A pod can represent an instance of a task, process, application, or service. In this regard, a pod can perform (e.g., via a container[s]), the operation or execution of a task, process, application, service, or workload. Pods can be created and/or terminated on nodes as needed to conform to a desired state (e.g., specified by a user). Generally a pod may include one or more threads. A thread may refer to a set of instructions, for instance, that may run via a single CPU. In some embodiments, a thread may be a single execution unit that runs within a pod and/or a container of a pod. A container generally refers to a logical collection of one or more containers that can operate together. A container may refer to an application that includes all of its own dependencies. In this regard, a container may be a self-contained separate deployable unit of compute resources.

In operation, in a pod of a container-orchestration system, one or more threads may be deployed to execute a sequence of analytics, such as security-related analytics. Incoming data to be processed by one or more analytics in a thread may correspond with any number of tenants. For example, in some implementations, analytics may reside and execute in a cloud-based system utilized by various tenants. For instance, many business enterprises may wish to have their respective data analyzed by at least one of the same cybersecurity analytics from a particular cybersecurity software provider. In this way, a cloud-based system may ingest large volumes of data from each business enterprise's DIQS (e.g., on-premises DIQS or cloud-based DIQS), run the cybersecurity analytics on that data in the cloud to detect anomalies and/or threats, and send results of the analytics to the enterprises' respective systems or data stores (e.g., DIQS or cybersecurity applications).

As incoming data to be processed by one or more analytics in a thread may correspond with any number of tenants, in conventional implementations, a thread includes data specific to each tenant. For instance, for each tenant, the thread includes a sequence of analytics applicable to data associated with the tenant. By way of example only, assume three tenants are being serviced, having 50 analytics available to analyze data. Further assume a first tenant desires to use a set of 50 analytics to analyze data, the second tenant desires to use a set of 45 particular analytics to analyze data, and the third tenant desires to use a set of 40 particular analytics to analyze data. In such a case, as the data obtained for processing by the thread may be associated with any of the three different tenants, the thread includes a first sequence of the 50 analytics for the first tenant, a second sequence of the 45 analytics for the second tenant, and a third sequence of the 40 analytics for the third tenant, even though many of the analytics are the same for each tenant. As such, computing resources are unnecessarily utilized in association with a thread to manage the redundant analytics separately implemented for various tenants. Further, the computing resource utilization is exacerbated as the number of threads used in a pod increases. For instance, and continuing with this example, assume three threads are deployed in a pod. In such a case, each thread includes the three separate sets of analytics corresponding with the three different tenants, such that the appropriate sets of analytics can be applied to the incoming data. As such, with three tenants and three threads in a pod, nine different sets of analytics may exist and, in many cases, an extensive number of the analytics may be redundant in each set of analytics.

Accordingly, embodiments described herein are directed to facilitating efficient management of analytics in an analytics management service. In particular, embodiments discussed herein operate in a manner that reduces redundancy of analytics, thereby reducing utilization of computing resources used to implement analytics for different tenants. For example, as described herein, an analytics pool includes a set of analytics available for use by multiple tenants. To account for customization or preferences for various tenants, an analytics pipeline is generated and used for each tenant that indicates the particular analytics to use for the particular tenant. For instance, a first analytics pipeline indicates a first set of analytics from the analytics pool to use for data associated with a first tenant, and a second analytics pipeline indicates a second set of analytics from the analytics pool to use for data associated with the second tenant. As the analytics pool includes the various available analytics and is utilized in association with multiple tenants to analyze data, computing resource utilization is reduced. For instance, consider the example above in which three tenants are using an analytics management service to analyze data, and three threads are deployed in a pod, any of which may be used to process or analyze data associated with any of the three tenants. In such a case, in accordance with embodiments described herein, an analytics pool, including each of the analytics, may exist in association with each thread. As such, only one set of analytics exists for each thread, for a total of three sets of analytics, as opposed to the nine sets of analytics described above in connection to conventional implementations.

In operation, to effectively manage analytics in an efficient manner, an analytics pool is generated. The analytics pool may include any number of analytics that may be used by any of a number of tenants. In a container-orchestration system, an analytics pool may be created for each thread within a pod. For example, for a pod having three threads, three different analytics pools may be created. As can be appreciated, in some cases, the three different analytics pools include the same set of analytics (e.g., each analytic that may be available to any of a number of tenants). In addition, an analytics pipeline may be generated for each tenant to indicate the particular analytics to apply for a particular tenant. For example, for a tenant, an analytics pipeline that indicates analytics enabled for the tenant is generated. The analytics pipeline may include references or pointers to the analytics in the analytics pool, such that appropriate analytics are executed in a particular sequence to analyze data. In a container-orchestration system, an analytics pipeline may be created for each tenant in each thread within a pod. For example, for a pod having three threads, an analytics pipeline may be generated for each tenant in association with a first thread, for each tenant in association with a second thread, and for each tenant in association with a third thread.

In accordance with incoming data (e.g., event data associated with an event), the appropriate analytics pipeline may be referenced (e.g., based on a tenant associated with the incoming data) and used to execute the designated analytics in the analytics pool. By way of example only, assume incoming data associated with a first tenant is obtained. In such a case, the analytics pipeline generated for the first tenant is identified and used to execute the appropriate or enabled analytics for the first tenant in the analytics pool. In this way, the analytics specific to the first tenant are executed and used to analyze data as desired by the first tenant. When incoming data is obtained in association with a second tenant, the analytics pipeline generated for the second tenant is identified and used to execute the appropriate or enabled analytics for the second tenant in the analytics pool. As such, the analytics specific to the second tenant are executed and used to analyze data as desired by the second tenant. Advantageously, the appropriate analytics are executed in a manner designated by the tenants, but only a single set of the analytics (e.g., in the analytics pool) exists (e.g., in association with a thread) for execution of the desired analytics. As can be appreciated, such an efficient management of analytics reduces computing resource utilization.

Further, in embodiments, analytics pipelines and/or analytics in analytics pools can be updated in an efficient manner such that desired analytics are applied on data. For example, updates to analytics (e.g., analytic modification or generation of new analytics) may be desired such that the updates may be used to perform data analysis. As another example, in accordance with modifying an analytic setting (e.g., indicating to enable or disable an analytic), the modified analytics setting may be used to update the analytics pipeline such that a desired sequence of analytics is executed. In embodiments, analytics data, such as analytics pipelines and/or analytics in the analytics pool, may be updated based on the modified data. In this regard, as a modification is applied to analytics settings or analytics sources, the modified data may be provided to the analytics management service for updating the analytics pipeline and/or analytics pool. As can be appreciated, providing only the updated analytics data and/or updating the analytics pipeline or analytics pool based on only the updated analytics results in a more efficient process than communicating all the analytics data after expiration of a time duration, as implemented in conventional implementations.

Figure 5:
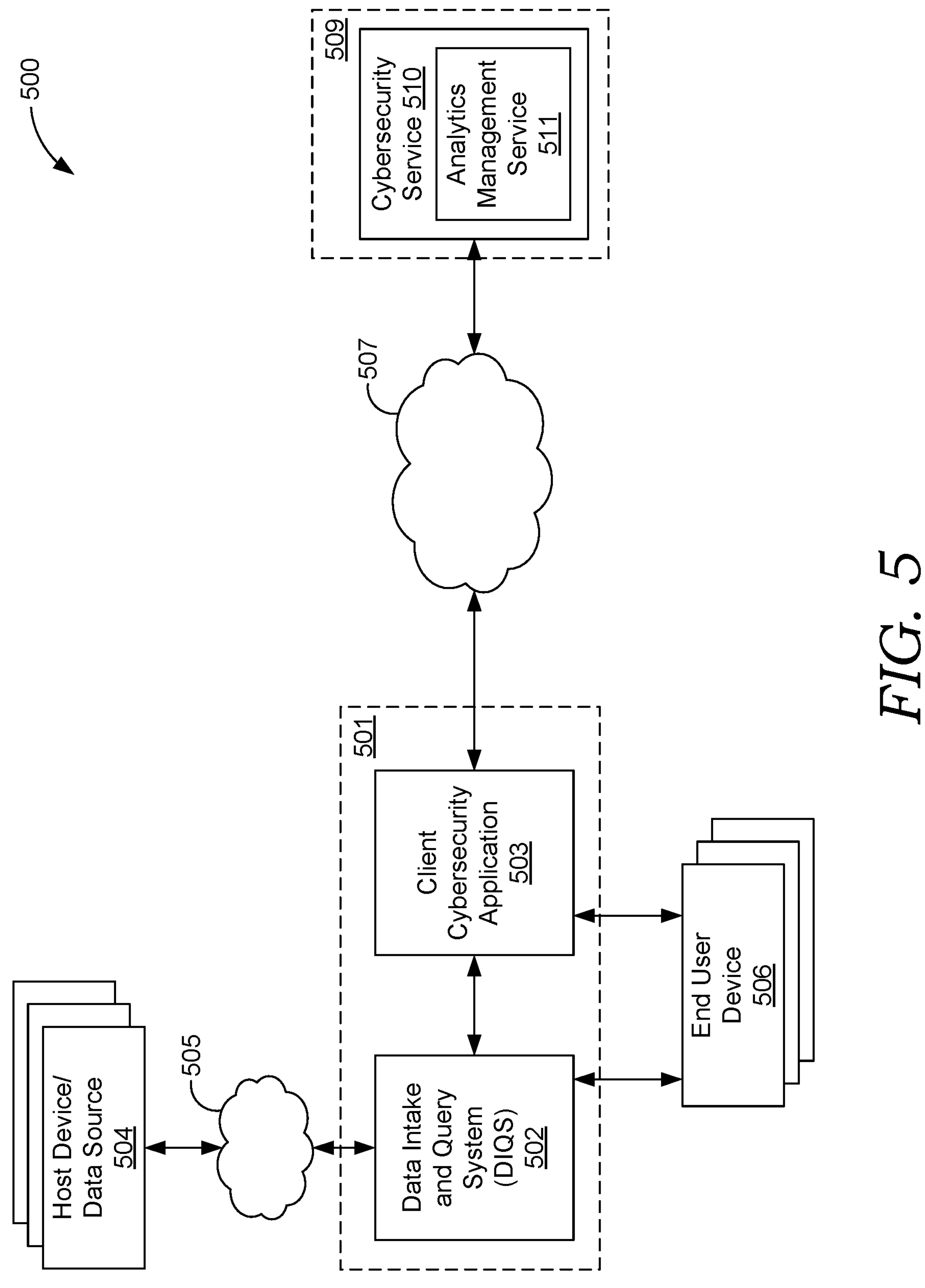
FIG. 5 illustrates an example data-processing environment including an analytics management service operating to perform cybersecurity data analysis, in accordance with various embodiments of the present disclosure.

5.1 Overview of Efficient Management of Analytics in an Analytics Management Service in a Data-Processing Environment As described, embodiments described herein are directed to facilitating efficient management of analytics in an analytics management service. In particular, embodiments discussed herein operate in a manner that reduces redundancy of analytics, thereby reducing utilization of computing resources used to implement analytics for different tenants. Generally, an analytics management service manages analytics that analyze data. One example environment in which an analytics management service is deployed is a data-processing environment that includes cybersecurity data analysis. FIG. 5 provides an example data-processing environment, including an analytics management service operating to perform cybersecurity data analysis.

In particular, FIG. 5 shows an example of a data-processing environment 500, in which the technique introduced here can be implemented. In the illustrated embodiment, the environment 500 includes an end-user computer system 501, one or more host devices 504, and one or more end-user devices (also called "client devices" or simply "clients") 506, all coupled to each other by a network 505. The end-user computer system 501 includes a DIQS 502 and a client-side cybersecurity application 503.

The DIQS 502 can ingest, index, and/or store data from heterogeneous data sources and/or host devices 504. For example, the DIQS 502 can ingest, index, and/or store any type of machine data, regardless of the form of the machine data or whether the machine data matches or is similar to other machine data ingested, indexed, and/or stored by the DIQS 502. In some cases, the DIQS 502 can parse the received data into events, group the events, and store the events in buckets. An "event" in this context is a portion of machine data associated with a specific point in time (e.g., by a timestamp). The DIQS 502 can also search heterogeneous data that it has stored or search data stored by other systems (e.g., other DIQS systems or other non-DIQS systems). For example, in response to received queries, the DIQS 502 can assign one or more components to search events stored in the storage system or search data stored elsewhere. An example of a commercially available data intake and query system that can be used to implement the DIQS 502 is SPLUNK® ENTERPRISE, developed by Splunk Inc. of San Francisco, California.

As described in greater detail below, the DIQS 502 can include one or more components (not shown in FIG. 5) to ingest, index, store, and/or search data. In some embodiments, the DIQS 502 is implemented as a distributed system that uses multiple components to perform its various functions. For example, the DIQS 502 can include any one or any combination of an intake system (including one or more components) to ingest data, an indexing system (including one or more components) to index the data, a storage system (including one or more components) to store the data, and/or a query system (including one or more components) to search the data, etc.

Although DIQS 502 is illustrated in an on-premises environment, as can be appreciated DIQS 502 may alternatively be implemented in a cloud environment. For example, some users may prefer a cloud service environment in which the user is not directly responsible for providing and managing the computing devices upon which various components of a DIQS may operate, while other users may prefer an on-premises solution such that data intake and the query system is operated on the user's own computing infrastructure (e.g., to provide a greater level of control over the configuration of certain aspects of the service).

The client-side cybersecurity application 503 can be a software application that runs logically "on top of" or in cooperation with the DIQS 502. An example of such a network cybersecurity application is SPLUNK® ENTERPRISE SECURITY, also developed by Splunk Inc. In at least some embodiments, the client-side cybersecurity application 503 may include a user interface generator to generate a graphical user interface (GUI), a risk-scoring engine to generate risk scores for entities and/or events, and/or a search engine to enable an end user to search data acquired and indexed by the DIQS 502. In at least some embodiments, client devices 506 of the DIQS 502 also are clients of (and therefore have access to) the client-side cybersecurity application 503.

The environment 500 also includes a cloud-based (server-side) computer system 509, which includes a cybersecurity service 510. In some embodiments, the client-side cybersecurity application 503 and the cybersecurity service 510 are components of the same distributed application. In other embodiments, the client-side cybersecurity application 503 and the cybersecurity service 510 are separate applications. Although the cybersecurity service 510 is illustrated herein as being deployed in a cloud-based environment, in some embodiments, the cybersecurity service 510 may be deployed in an on-premises environment.

The cybersecurity service 510 may receive event data from the end-user computer system 501 via the network 507. Such data may be provided directly by the DIQS 502, or it may be provided from the DIQS 502 to the cybersecurity service 510 via the client-side cybersecurity application 503 or another component, which may preprocess some of the data. Although illustrated as event data being communicated via end-user computer system 501, other implementations may be employed. For example, as described, the DIQS may operate in a cloud environment and provide event data to the cloud-based cybersecurity service 510. As another example, event data may be provided via data source 504 or end-user device 506, among other components.

The cybersecurity service 510 may perform various security-related tasks. As one example, cybersecurity service 510 may detect anomalies and/or threats in data. In this regard, the cybersecurity service 510 includes an analytics management service 511 used to analyze data and identify such anomalies and threats. In this way, the analytics management service 511 may include various analytics, which it applies to the event data received (e.g., from the end-user computer system 501), to evaluate risk levels associated with the event data received.

In embodiments, cloud-based computer system 509, cybersecurity service 510, and/or analytics management service 511 may receive event data from multiple end-user computer systems like end-user computer system 501. For example, end-user computer systems may exist in association with different tenants. In embodiments, a tenant may refer to a subscriber entity of cloud resources provided by a provider entity (e.g., that allows a subscriber entity to pay for a subscription that enables users associated with the subscriber entity to access a certain amount of the provider entity's cloud resources). As described, the cloud-based computer system 509, cybersecurity service 510, and/or analytics management service 511 may receive event data from multiple tenants. Accordingly, the analytics management service 511 is equipped with features to manage analytics for various tenants in an efficient and effective manner, according to the technique introduced here, as described above and as now further described in reference to FIG. 6.

Figure 6:
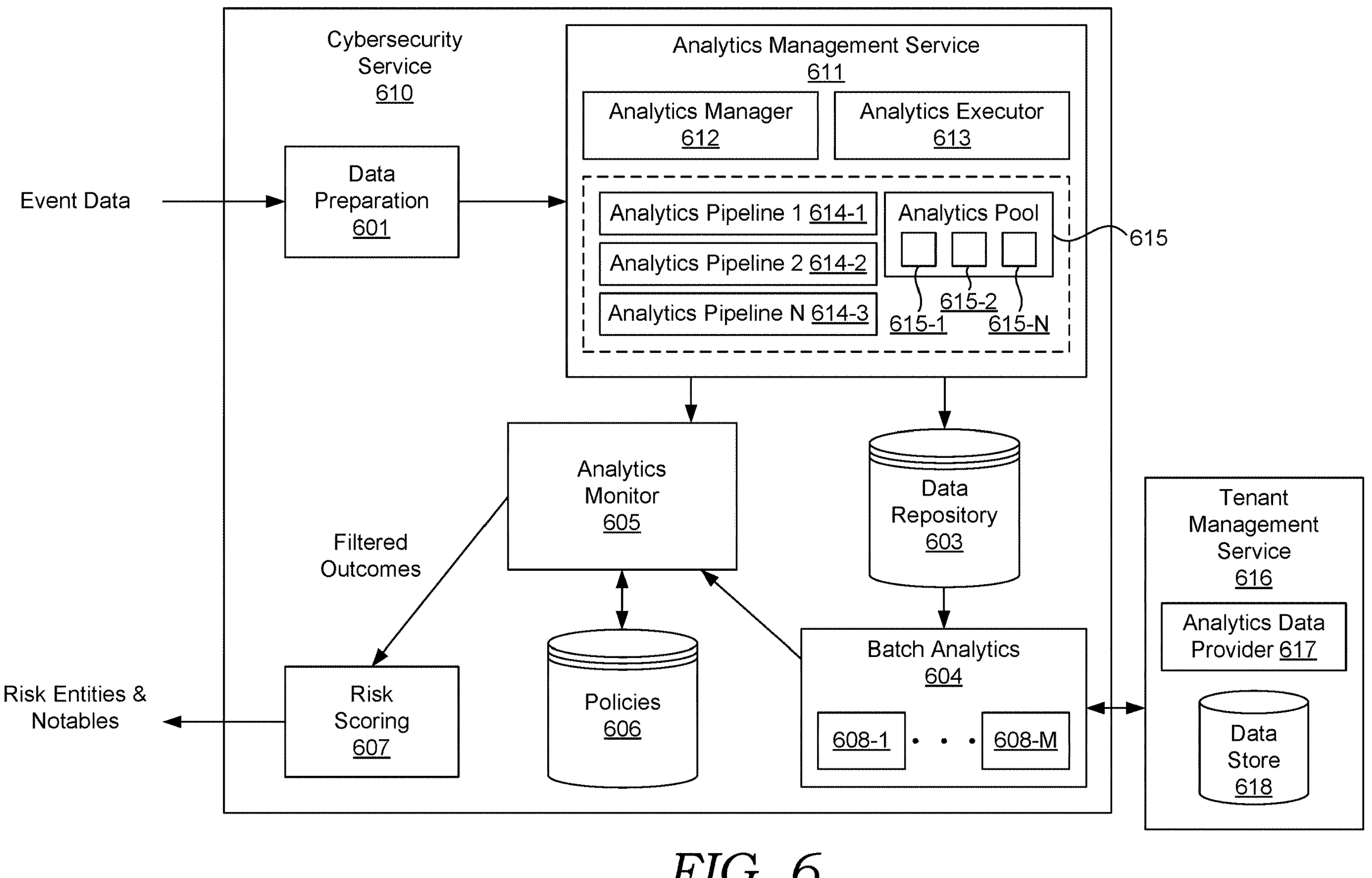
FIG. 6 provides an example of an analytics management service in a cybersecurity service, in accordance with various embodiments of the present disclosure.

FIG. 6 illustrates an example of an analytics management service 611 in a cybersecurity service 610, according to at least one embodiment. As described, the cybersecurity service 610, including the analytics management service 611, may be deployed in an on-premises environment or a cloud-based environment. Further, although the analytics management service 611 is described herein in a cybersecurity service, an analytics management service 611 may be employed in any other service that performs data analytics and is not intended to be limited herein to a cybersecurity service or environment.

As shown, the cybersecurity service 610 includes a data preparation module 601, the analytics management service 611, a data repository 603, a batch analytics module 604, an analytics monitor 605, a policies database 606, and a risk-scoring module 607. The data preparation module 601 receives event data associated with multiple tenants and applies various types of preprocessing to the data to facilitate risk analysis and scoring. For example, the data preparation module 601 may obtain event data from multiple end-user computer systems, such as end-user computer system 501 in FIG. 5 (e.g., via an end-user cybersecurity application of a DIQS). As another example, the data preparation module 601 may obtain event data from a cloud-based DIQS or other cloud-based service. The data preparation module 601 may perform any number of data preprocessing, such as but not limited to deduplication, data cleaning, transformation of the received data into a common model/schema, etc.

The analytics management service 611 is generally configured to execute analytics to detect security-related data, such as anomalies and/or threats. In embodiments, the analytics management service 611 includes an analytics manager 612 and an analytics executor 613. At a high level, the analytics manager 612 is configured to initiate and manage analytics pipelines 614 and/or analytics pool 615. As described herein, the analytics pool 615 includes a number (N) of (e.g., one or more) analytics 615-1 through 615-N (hereinafter collectively called "analytics 615") for detecting cybersecurity anomalies and threats in a real-time (online) mode. At least some of these analytics 615 may be implemented in the form of one or more machine learning algorithms and associated models.

The analytics manager 612 is generally configured to manage initiation and updates of analytics to be executed. As described, analytics generally execute on data, such as event data, to detect anomalies and/or threats. Analytics management service 611 may implement any number of analytics 615 that each function to perform different anomaly or threat detections. For example, one analytic may operate to identify a first type of anomaly associated with an event, while another analytic may operate to identify a second type of anomaly associated with the event.

At a high level, in accordance with embodiments described herein, to manage analytics to be executed, the analytics manager 612 initiates and updates analytics 615 as well as analytics pipelines 614. As described, an analytics pipeline 614 provides a sequence or set of particular analytics from the analytics pool 615 for executing in association with a particular tenant. Accordingly, to execute a particular set of analytics for a particular tenant, the analytics manager 612 also initiates and maintains the analytics pipelines for corresponding tenants.

To initiate or deploy various analytics and analytics pipelines at the analytics management service 611, the analytics manager 612 may obtain analytics data. Analytics data, as used herein, refers to any data used to initiate analytics and/or analytics pipelines for subsequent execution. In some embodiments, analytics data includes analytic settings and analytic sources. An analytic setting refers to a setting indicating whether an analytic is to be applied or enabled in association with a particular tenant(s). An analytic source refers to text that may be used as a source for generating executable code to execute a corresponding analytic. In embodiments, an analytic source refers to source code or a custom query language (e.g., SPL2) that can be used to generate executable code.

Analytics data may be obtained in any number of ways. In some cases, analytics data may be obtained from a data store accessible by the analytics manager 612. In other cases, analytics data may be obtained via communication with a tenant management service 616. Tenant management service 616 is generally configured to manage tenants, including analytics data (e.g., analytic settings and analytic sources) associated therewith. In embodiments, tenant management service 616 manages configurations of multiple tenants, for instance, on an instance (e.g., a single running installation of Splunk Enterprise).

In one embodiment, the tenant management service 616 includes analytics data provider 617 and a data store 618. Generally, and at a high level, the data store 618 can store analytics data, and the analytics data provider 617 provides analytics data to the analytics manager 612. In particular, analytics settings and/or analytics sources may be stored at data store 618. In this regard, as analytic settings or analytic sources are developed or modified, the updates may be stored in the data store 618. For example, assume a new analytic source is developed to implement a new analytic. In such a case, the new analytic source may be added to data store 618. As another example, assume an analytic setting for a tenant is modified (e.g., a tenant enables or disables a particular analytic). In such a case, the analytic setting for the tenant may be updated or modified in the data store 618.

The analytic data may be stored, for example, at data store 618, in any of a number of ways. As described, analytic settings indicate which analytics to implement or execute for a particular tenant. Stated differently, the analytic settings indicate which analytics are enabled for a tenant. In some cases, for a tenant, a set of analytic identifiers and corresponding settings indicating whether the analytic is enabled or disabled may be provided. In this regard, a binary value may be used to indicate whether a particular analytic is enabled or disabled for a tenant. For example, for a tenant, a list of analytic identifiers may be provided with a corresponding value of 0 for each analytic that is disabled or a corresponding value of 1 for each analytic that is enabled. Any other indications of enabled/disabled analytics may be provided, such as text, etc. In other cases, a list of enabled analytics may be provided in association with a tenant.

Analytic settings for a tenant may be established in a number of ways. As one example, a tenant, or entity associated therewith, may input analytic settings via a graphical user interface. For example, a tenant may input or select one or more analytic settings via an end-user device (e.g., via a menu), which is in communication with the tenant management service 616.

Data store 618 may additionally or alternatively store analytic sources. Analytic sources may include text, such as a query language, that can be used to generate executable code. In embodiments, an analytic source includes one or more commands that, when executed, function to detect an anomaly or threat associated with an event. An analytic source may also include, or be associated with, an analytic identifier to identify the analytic. Any number of analytic sources may be stored. In some cases, each analytic source stored corresponds with a different analytic (e.g., 72 analytic sources corresponding with 72 different analytics). For example, one analytic source may be used to identify or detect one type of security issue, while another analytic source may be used to identify or detect another type of security issue.

Analytic sources may be established or generated in any number of ways. For example, a content team or content provider may generate or modify analytic sources and provide the analytic sources via a graphical user interface. As another example, a content team may delete or remove an analytic source to remove an analytic from the analytics pool 615. Such analytic sources may be input or modified via a user interface, for example, associated with an individual or entity that generates analytic content.

As described, the analytics data provider 617 provides analytics data (e.g., stored in data store 618) to the analytics manager 612. In some cases, the analytics data provider 617 automatically provides analytics data to analytics manager 612. In this regard, the analytics manager 612 automatically receives analytics data (e.g., via the tenant management service 616). In other cases, the analytics data provider 617 may provide analytics data in response to a request from the analytics manager 612. In this regard, the analytics manager 612 requests or retrieves analytics data from the tenant management service 616 (e.g., upon startup of a pod or at regularly scheduled intervals).

In some cases, the analytics manager 612 obtains analytics data in accordance with an occurrence of an event. For example, in accordance with initializing or deploying a pod or a thread for use in executing analytics, the analytics manager 612 may request and obtain analytics data, such as analytic settings and/or analytic sources.

In other cases, the analytics manager 612 obtains analytics data in accordance with the expiration of a time interval or time duration. For instance, the analytics manager 612 may obtain analytics data at a regular interval, such as upon the expiration of a time duration (e.g., 2 minutes). As one example, upon an expiration of the time duration, analytics data (e.g., all analytics sources and/or analytics settings) may be provided to the analytics manager 612 by the tenant management service 616 (e.g., provided in response to a request from the analytics manager 612 based on the expiration of the time duration).

In some cases, the analytics manager 612 may obtain all analytic settings and/or analytic sources. For example, the analytics manager 612 may request each available analytic setting and analytic source upon expiration of a time duration. Based on the request, the analytics data provider 617 may provide each analytic setting and analytic source to the analytics manager 612. As another example, the analytics manager 612 may initially obtain all analytic settings and/or analytic sources in accordance with an initialization process. For instance, assume a pod or a thread is initialized to execute analytics. In such a case, in accordance with initializing a pod or a thread, the analytics manager 612 may request analytic settings and/or analytic sources associated with various tenants.

In other cases, the analytics manager 612 may obtain a portion of the analytic settings and analytic sources from the tenant management service 616. For example, the analytics manager 612 may request a portion of analytic settings and/or a portion of analytic sources. By way of example only, upon an expiration of a time duration, a portion of analytics data may be provided by the tenant management service 616. In some implementations, the portion of analytic data may be randomly or sequentially selected. For instance, upon expiration of a first time duration, a first half of analytic settings and/or analytic sources may be provided, and upon expiration of a second time duration, a second half of analytic settings and/or analytic sources may be provided.

In other implementations, the portion of analytics data provided to the analytics manager 617 may be analytics data updated since the prior analytics data was obtained. In this way, although analytics data may be requested or obtained upon expiration of a time period (e.g., every two minutes), only a portion of the analytics data that has been updated is provided (e.g., in the payload in response to the request), thereby conserving computing and network resources. By way of example only, assume a set of analytic settings and analytic sources are provided to analytics service manager 611 at time 0. Now assume a tenant disables a particular analytic of a set of analytics. In such a case, at a next time interval (e.g., two minutes), the tenant service manager 616 may provide only the updated tenant setting for the particular analytic or a set of updated tenant settings associated with the particular tenant for the set of analytics. For instance, a timestamp sent from the analytics manager indicating when the analytics manager was last updated can dictate or influence what data is returned from the analytics data provider 617. Minimizing data provided in association with the updated data increases the efficiency of communicating the payload, as the payload only includes updated data and not the entire set of analytic settings for each tenant and/or the entire set of analytic sources. In this regard, providing only updated data results in a lighter payload that takes less time to generate and communicate.

In operation, to provide updated data, the analytics data provider 617 may be configured to identify such updated data, that is, analytic settings and/or analytic sources associated with updates since the previous data communication. In some cases, the analytics data provider 617 may analyze timestamps to identify such updated data. For example, the analytics data provider 617 may analyze whether any tenant settings have been modified or updated since a timestamp associated with a previous data communication. In this way, the analytics manager 612 may include a timestamp in the request to obtain updated data between the last updated time and the current time. Timestamps may be used to indicate the last updated time and/or the current time. As such, the analytics manager 612 may track the timestamps such that the most recent timestamp previously used for updating data may be included in the request (e.g., to obtain data updated between the last updated time and a current time). In other implementations, the tenant management service 616 may track prior data provisions to identify data updated since a previous data communication.

In some cases, both analytic settings and analytic sources may be provided as updates occur such that the amount of data provided for both analytic settings and analytic sources is reduced. In other cases, one data type may be provided in a partial manner, while the other data type is provided in a non-partial manner. For example, upon an expiration of a time duration, only analytic settings associated with updates may be obtained by the analytics manager 612, while analytic sources associated with each analytic may be obtained by the analytics manager 612, or vice versa.

In accordance with obtaining analytics data, the analytics manager 612 generates or updates an analytics pipeline(s) 614 and/or an analytics pool(s) 615. An analytics pipeline refers to a sequence of analytics indicators to indicate an order in which to execute particular analytics. An analytics indicator generally refers to any indicator or identifier of an analytics. For example, each analytic may be identified by a unique value or name indicating the particular analytic. In this way, a series or sequence of analytic indicators associated with enabled analytics may be included in an analytics pipeline to indicate the set of analytics to apply and the order in which to apply the analytics. The analytics pipelines 614 may be stored, for example, in RAM.

In some cases, an analytics pipeline includes each analytics indicator and an indication of whether the corresponding analytic is enabled or disabled. For example, assume an analytics pool includes ten analytics. In such a case, the analytics pipeline may indicate each of the ten analytics and an indication of whether each analytic is enabled or disabled. In other cases, an analytics pipeline may include only the enabled analytics. For example, assume only five out of ten analytics are desired to be executed for a particular tenant. In such a case, the analytics pipeline may only indicate the five analytics to execute. The analytics indicator may be, include, or be associated with a reference or pointer to the corresponding analytics. In this way, the analytics indicator may specify or point to the corresponding analytic (e.g., in an analytics pool).

In embodiments, an analytics pipeline is generated using analytic settings, for example, obtained by tenant management service 616. By way of example only, assume analytic settings for a tenant indicate that a first analytic, a second analytic, and a third analytic are enabled for a tenant. In such a case, the analytics pipeline can indicate the first analytic, the second analytic, and the third analytic, in that order, for executing analytics.

In cases in which analytic settings are updated, the analytics pipeline can be updated in accordance therewith. For instance, assume an analytics pipeline includes an indication of a first analytic, a second analytic, and a third analytic. Further assume that the second analytic is disabled per updated analytic settings. In such a case, the analytics pipeline is modified to indicate the first analytic and the third analytic. Alternatively, the analytics pipeline may be modified to reflect the second analytic as disabled.

The analytics manager 612 may generate an analytics pipeline for various tenants. In this regard, for each tenant, a corresponding analytics pipeline may be generated. For example, assume three tenants exist (e.g., for a particular instance). In such a case, a first analytics pipeline may be generated in association with a first tenant based on analytic settings associated with the first tenant, a second analytics pipeline may be generated in association with a second tenant based on analytic settings associated with the second tenant, and a third analytics pipeline may be generated in association with a third tenant based on analytic settings associated with the third tenant.

As described herein, in some embodiments, multiple threads may be initiated for executing analytics. For example, in a container-orchestration environment, one or more threads may be initiated or deployed to execute analytics. In this regard, the analytics manager 612 may generate an analytics pipeline for each tenant in each thread. For instance, a first thread may include analytics pipelines for tenants A, B, and C; a second thread may include analytics pipelines for tenants A, B, and C; and a third thread may include analytics pipelines for tenants A, B, and C. In other cases, each thread may include an analytics manager 612 to initiate analytics for the corresponding thread.

As described, in accordance with obtaining analytics data, the analytics manager 612 may also generate or update an analytics pool(s) 615. An analytics pool generally refers to a collection of analytics. The analytics are generally executable code that perform detection of anomalies and/or threats. In this regard, the analytics manager 612 generates or updates various analytics to include in a pool, such as analytics pool 615. The analytics of the analytics pool 615 may be stored, for example, in RAM.

In some embodiments, an analytic is generated using a corresponding analytic source, for example, obtained by tenant management service 616. As described herein, an analytic source generally refers to source code, that is, high-level code or assembly code generated by a human (e.g., a programmer). Source code is human-readable and, as such, generally easy to read and modify. To generate an analytic, the analytic source is converted to machine-understandable code, also referred to as executable code or machine code. For example, an analytic may be generated from an analytic source after going through a compiler or other translator to interpret or compile the commands such that a function (e.g., java function) can be performed.

In embodiments, a set of analytic sources are obtained (e.g., upon expiration of time duration) and, as such, the analytics manager 612 may compile, or initiate compiling, of each analytic source to generate a corresponding analytic. By way of example only, assume first analytic source, a second analytic source, and a third analytic source are obtained (e.g., at initialization or upon a lapse of a time duration). In such a case, a first analytic corresponding with the first analytic source, a second analytic corresponding with the second analytic source, and a third analytic corresponding with the third analytic source may be generated (e.g., via a compiler).

As described, in some cases, analytic sources may be updated relative to a previous analytic source used to generate an analytic in the analytics pool. For instance, as described, an analytics content developer or programmer may modify an analytic source (e.g., source code). In such cases, a modified portion of the analytic source may be compiled to update the corresponding analytic. Alternatively, the particular analytic (e.g., in the analytics pool) that corresponds with the update may be updated by compiling the updated analytic source. In this way, the entire analytic source is compiled to create a new analytic source to include in the analytics pool (e.g., to replace the existing analytics).

In embodiments, the analytics manager 612 may generate an analytics pool 615 having various analytics for use by a set of tenants. In this regard, for various tenants, an analytics pool of analytics may be generated such that event data to process for each tenant can be analyzed using the same collection or set of analytics. In this way, the analytics pool generally includes each analytic such that different analytic combinations can be executed in accordance with the tenant settings for a particular tenant. For example, assume 72 analytic sources exist and are communicated to the analytics manager 612. The analytics manager 612 may generate an analytics pool 615 that includes analytics corresponding with the 72 analytics sources (e.g., analytic 615-1 through 615-72). In this way, a first set of analytics can be executed for a first tenant that enabled a first portion of the 72 analytics, and second set of analytics can be executed for a second tenant that enabled a second portion of the 72 analytics.

As described herein, in some embodiments, multiple threads may be initiated for executing analytics. For example, in a container-orchestration environment, one or more threads may be initiated or deployed to execute analytics. In some cases, the analytics manager 612 may generate an analytics pool 615 in association with each thread. For instance, a first thread may include a first analytics pool, a second thread may include a second analytics pool, and a third thread may include a third analytics pool. Each analytics pool may include the same set of analytics (e.g., analytics 1-72). As another example, an analytics pool may be generated that is accessible to each thread such that the various threads share the same analytics pool. In other cases, each thread may include an analytics manager 612 to initiate analytics for the corresponding thread.

In accordance with initiating or updating an analytics pipeline(s) and an analytics pool(s) (e.g., in association with a thread), the analytics pipeline(s) and analytics pool(s) may be used to execute analytics to identify anomalies or threats for various events. As described herein, such analytics may be executed in real-time as events are obtained to determine anomalies or threats in real-time.

The analytics executor 613 is generally configured to execute the analytics in association with data. In this way, as data, such as event data, is obtained, the analytics executor 613 executes analytics in association with the obtained data. As described, data analyzed for analysis (e.g., security-related analysis) may include event data. Event data includes any data representing an event(s). An event generally refers to machine data generated by entities that are part of or that interact with computer networks associated with an end-user computer system.

Event data may be obtained from any number of components. As illustrated, in some cases, event data may be obtained from data preparation 601. In other cases, event data may be obtained from another component or system.

For example, event data may be obtained from an end-user device, an end-user cybersecurity application, a data intake query system (e.g., on-premises or cloud environment), or other data source.

In some cases, event data is obtained in a batch manner. In other cases, event data is obtained in a data streaming manner. In this regard, in some cases, event data may be obtained in real-time as events are being processed. In some cases, event data may be obtained via a pulsar topic in the form of a message. For example, a message may include an event for performing data analysis. A pulsar topic generally refers to a unit of storage that organizes messages into a stream. As such, the analytics executor 613 may receive or obtain event data and execute the analytics in real-time, on an ongoing basis, as the data is received.

As described herein, in some embodiments, an analytics management service 611 may be implemented in a container-orchestration environment. A container-managed environment (e.g., Kubernetes) can operate in association with a set of nodes or machines, such as physical machines and/or virtual machines. In operation, a container-managed environment may use a pod(s) to execute a process or task. Pods can be created and/or terminated on nodes as needed to conform to a desired state (e.g., specified by a user). Generally, a pod may include one or more threads. In some embodiments, a thread may be a single execution unit that runs within a pod and/or a container of a pod.

In operation, in a pod of a container-orchestration system, one or more threads may be deployed to execute a sequence of analytics, such as security-related analytics. Incoming event data to be processed by one or more analytics in a thread may correspond with any number of tenants. For example, in some implementations, analytics may reside and execute in a cloud-based system utilized by various tenants. For instance, many business enterprises may wish to have their respective data analyzed by at least one of the same cybersecurity analytics from a particular cybersecurity software provider. In this way, a cloud-based system may ingest large volumes of data from each business enterprise's DIQS (e.g., on-premises DIQS or cloud-based DIQS), run the cybersecurity analytics on that data in the cloud to detect anomalies and/or threats, and send results of the analytics to the enterprises' respective systems or data stores (e.g., DIQS or cybersecurity applications).

In this way, event data may be obtained in association with a thread deployed in a pod of a container-orchestration environment. For example, a container-orchestration environment may include any number of pods to perform the desired amount of functionality. Each pod may execute functionality via a set of threads. Any number of threads may exist in a pod. As one example, a pod may include three threads. Each thread may be configured to perform a desired functionality, such as executing analytics in association with an event. In this regard, event data may be obtained at a particular thread to execute analytics via the thread. A thread may obtain an event in any number of ways. In some cases, event data may be randomly assigned to a particular thread. In other cases, event data may be assigned to threads in a sequence or other order (e.g., first thread, second thread, third thread, and repeat). In yet other cases, event data may be assigned to a thread based on performance, availability, etc. For example, load balancing may be taken into account to assign events to different threads.

In accordance with obtaining an event (e.g., in association with a thread), the analytics executor 613 is generally configured to execute the analytics in association with the event. In particular, the analytics executor 613 executes analytics specific to the obtained event. As described, an analytics pool may include any number of analytics. The particular analytics to apply to an event may vary, however, based on an attribute (e.g., tenant) associated with the event data. For example, for an analytics pool 615 including analytics 615-1 through 615-N, a first portion of analytics may be applicable to a first event associated with a first tenant, while a second portion of analytics may be applicable to a second event associated with a second tenant.

As such, and as described herein, an analytics pipeline indicates which analytics of an analytics pool to execute in association with a tenant. As described, the analytics pipeline indicates which analytics are enabled for a particular tenant such that the specified analytics can be executed for events associated with the tenant. Accordingly, as event data is obtained, an analytics pipeline associated with the event data is identified. In some cases, each analytics pipeline corresponds with a tenant. For example, a first analytics pipeline may indicate analytics to apply for events associated with a first tenant, and a second analytics pipeline may indicate analytics to apply for events associated with a second tenant. In cases in which analytics pipelines correspond with tenants, to identify a particular analytics pipeline for an event, a tenant associated with the event is identified. In some cases, the event data may include an indication of the tenant. In other cases, the analytics executor 613 may identify a tenant associated with incoming event data. Based on a tenant associated with event data, the identified tenant is used to determine which analytics pipeline is applicable to the event. For example, a first event associated with a first tenant may result in identifying and/or referencing a first analytics pipeline corresponding to the first tenant, and a second event associated with a second tenant may result in identifying and/or referencing a second analytics pipeline corresponding to the second tenant.

In accordance with identifying an appropriate analytics pipeline associated with obtained event data, the analytics executor 613 may reference the analytics pipeline and use the analytics pipeline to execute the appropriate analytics in the analytics pool. As described, each analytic includes logic to execute a particular functionality, for example, related to security. In this way, an analytic may be configured to identify anomalies or threats related to security. While the analytics pool may include a particular set of analytics, each analytic may not be desired to be executed for a particular tenant. As such, the analytics pipeline indicates a sequence of analytics to execute in accordance with a particular tenant. In particular, based on each analytic indicated as enabled via an analytics pipeline identified for an obtained event, the analytics executor 613 executes, or initiates execution, of the corresponding analytics in the analytics pool. For example, assume event data is associated with a tenant having a desired analytics sequence of A1, A2, and A4 (e.g., as specified in the analytics pipeline for the tenant). In such a case, the analytics executor 613 may execute, or initiate execution of, analytics A1, A2, and A4 in the analytics pool in sequential order. In this way, analytic A1 may be executed to identify whether a particular anomaly or threat is associated with an event. Upon execution of analytic A1, the analytics executor 613 may execute, or initiate execution of analytic A2, to identify whether a different anomaly or threat is associated with the event, followed by execution of analytic A4. In some embodiments, the analytics pipeline includes a reference or pointer to the specific analytics in the pool. In this regard, upon initiating and/or completing execution of one analytic, the analytics executor 613 may identify a next analytic included in a sequence in the analytics pipeline and use the reference or pointer to access the corresponding analytic in the pool and initiate execution thereof.

As described herein, in some embodiments, multiple threads may be initiated for executing analytics. For example, in a container-orchestration environment, one or more threads may be initiated or deployed to execute analytics. In some cases, the analytics executor 613 may manage execution of analytics for each thread. For example, the analytics executor 613 may manage execution of analytics for a first thread, a second thread, and a third thread. In other cases, each thread may include an analytics executor 613 to initiate and execute analytics for the corresponding thread.

As described herein, in some embodiments, one or more analytics management service components (e.g., analytics manager and/or analytics executor) operate in a thread of a pod. For example, upon initiating a thread in a pod, an analytics manager and/or analytics executor may be deployed in association therewith to perform the corresponding functionalities described herein.

The analytics may analyze event data to detect any type of data. In embodiments, analytics 615 may perform security-related analysis of data, such as anomalies and/or threats. For example, an analytic may detect suspicious log-in activity, suspicious VPN activity, etc. In cases in which an anomaly and/or a threat is detected, the analytics management service 611 can output or provide the anomaly and/or threat. In some cases, positive anomaly and/or threat detections ("firings") output by the analytics management service 611 are provided in real-time to the analytics monitor 605, and may also be stored in the data repository 603, which may also store the preprocessed event data from the data preparation module 601. The data repository 603 can be any form of persistent data store suitable for storing large volumes of data.

The batch analytics module 604 may also include a number (M) of (i.e., one or more) cybersecurity analytics 608-1 through 608-M (hereinafter collectively called "analytics 608") for detecting cybersecurity anomalies and threats in a batch (offline) mode. At least some of these analytics 608 may be implemented in the form of one or more machine learning algorithms and associated models. The batch analytics module 604 executes its analytics 608 on preprocessed event data stored in the data repository 603. By doing so, the batch analytics module 604 may detect anomalies and threats based on a larger set of data than that upon which the analytics management service 611 operates. At least some of the batch analytics 608 may be the same as some of the analytics 615, although the batch analytics 608 may also include other analytics that are not included among the analytics 615, e.g., analytics 608 that are more suitable for operating on batch data. Similarly, the analytics 615 may contain certain analytics that are not included among the batch analytics 608, which may be more suitable for operation on real-time data.

Anomaly or threat detections by the analytics management service 611 and/or batch analytics 604 may be analyzed by the analytics monitor 605 to identify whether the detected anomalies and/or threats are deemed reliable. In embodiments, positive anomaly and threat detections (also called "results" or "outputs") generated by the analytics in the analytics management service 611 and/or the batch analytics module 604 are provided to or accessed by the analytics monitor 605, according to a specified timing interval or schedule. The analytics monitor 605 may incorporate techniques for reducing false positives and noise in those outputs. The analytics monitor 605 acts (figuratively) as a circuit breaker, or filter, on the positive anomaly and threat detections by the analytics 615 and 608. In some cases, the analytics monitor 605 may evaluate detections using policies stored in the policies database 606. Such policies may include, for example, criteria for evaluating the outputs of analytics, such as over-firing thresholds, under-firing thresholds, etc. Some evaluation criteria may be customized for particular analytics, while other evaluation criteria may be generally applied to some or all of the analytics. Additionally, policies stored in the policies database 606 may be created and/or edited by the analytics monitor 605 based on results of its evaluation of the performance of the various analytics. The analytics monitor 605 may contain one or more machine learning algorithms and associated models for evaluating the performance of analytics 615 and 608 and/or for taking corrective action based on evaluation of analytics' performance, and/or for creating or editing policies for evaluation of analytics 615 and 608.

Detections deemed reliable by the analytics monitor 605 may be provided as output. In some cases, detections that are deemed reliable (or that are not deemed unreliable) by the analytics monitor 605 may be passed through to the risk scoring module 607. The risk scoring module 607 identifies risk notables (incidents) from anomaly and threat detections that it receives from the analytics monitor 605, associates them with corresponding events and network entities, and assigns risk scores to the risk notables and the associated entities. The risk scoring module 607 may then pass the associated events, notables, entities, and risk scores back to the appropriate end-user computer system, where the client-side cybersecurity application, or other component, can make them available to an end user for search and/or further analysis. The risk scoring module 607 may identify risk notables and assigns risk scores by using any of various techniques, such as, for example, rules, machine learning, or a combination thereof. The risk scoring module 607 can operate in both real-time mode (i.e., based on outputs of the analytics management service 611) and in batch mode (i.e., based on outputs of the batch analytics module 604). The network entities identified by the risk scoring module 607 can include, for example, computer users, devices (e.g., clients, servers, routers, virtual machines, etc.), applications, or a combination thereof. As can be appreciated, these components are provided for illustration and various components are not needed for performing various implementations of the technologies described herein. For example, in some embodiments, analytics monitor 605, policies 606, and/or risk scoring 607 may not be implemented.

Figure 7:
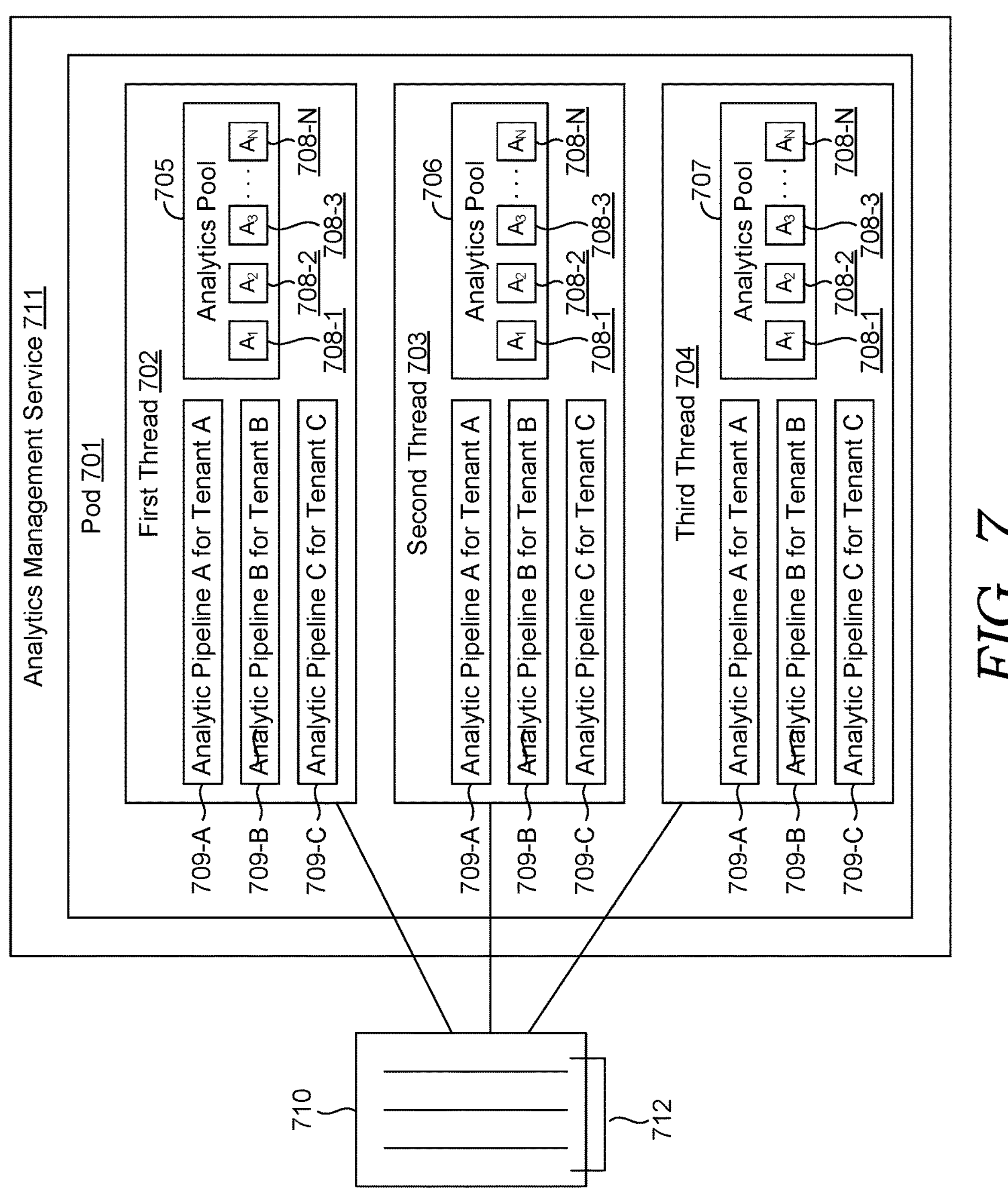
FIG. 7 provides an example implementation of a structure that may be employed, in accordance with various embodiments of the present technology FIG. 8 provides an example of a process that may be performed to facilitate efficient management of analytics in an analytics management service, in accordance with embodiments described herein FIG. 9 provides another example of a process that may be performed to facilitate efficient management of analytics in an analytics management service, in accordance with embodiments described herein.

Turning to FIG. 7, FIG. 7 provides an example implementation of a structure that may be employed, in accordance with various embodiments of the present technology. In this example, the analytics management service 711 is implemented in a container-orchestration environment. In this regard, a pod 701 is initiated or deployed to execute various analytics, such as security-related analytics, in association with event data. Although only one pod is illustrated, as can be appreciated, in a container-orchestration environment, any number of pods may be initiated that is suitable to handle processing. Further, any number of threads may be initiated or deployed in connection with each pod. In this example, a first thread 702, a second thread 703, and a third thread 704 are initiated in association with pod 701.

In connection with initiating pod 701 and/or threads 702-704, as described herein, an analytics pool and a set of analytics pipelines may be generated in association with each thread. In this regard, analytics pool 705 may be generated for first thread 702, analytics pool 706 may be generated for second thread 703, and analytics pool 706 may be generated for third thread 704. To generate the analytics pool, the analytics management service 711 may obtain analytic sources (e.g., from a tenant management service) and compile the analytic sources to create corresponding analytics for each analytics pool. The analytics pools 705-707 may include any number of analytics that may be executed to perform data analysis. For example, analytics pools 705-707 include analytic $A_1$ 708-1, analytic $A_2$ 708-2, and analytic $A_3$ 708-3 through analytic $A_N$ 708-N. In embodiments, each of the analytics pools include a same set of analytics available for use in analyzing data.

Further, for each thread 702-704, a set of analytics pipelines may be generated. Generally, each analytics pipeline corresponds with a tenant and indicates a sequence of analytics from the corresponding analytics pool that is enabled or desired for use in performing data analysis. As shown with respect to the first thread 702, the set of analytics pipelines 709 includes analytics pipeline A for tenant A, as indicated by 709-A, analytics pipeline B for tenant B, as indicated by 709-B, and analytics pipeline C for tenant C, as indicated by 709-C. As described herein, any number of analytics pipelines may be implemented. Each analytics pipeline may include any variation or combination of analytics from the analytics pool 705. For example, analytics pipeline 709-A may indicate utilization of $A_1$ and $A_3$, while analytics pipeline 709-B may indicate utilization of $A_1$ and $A_2$. Each of the analytic indications in the analytics pipeline may include a reference or pointer to the corresponding analytic in the analytics pool.

To generate the set of analytics pipelines for a thread, the analytics management service 711 may obtain analytic settings (e.g., from a tenant management service) and use the analytic settings to create corresponding analytics pipelines. For example, assume analytics pipeline 709-A is associated with tenant A. Further assume tenant A includes a preference in analytic settings to enable analytic $A_1$ and disable analytic $A_2$. In such a case, the analytics pipeline 709A includes an indication that analytic $A_1$ is enabled and analytic $A_2$ is disabled. The analytics pools 705-707 may include any number of analytics that may be executed to perform data analysis. In embodiments, each of the sets of analytics pipelines for the various threads includes a same set of analytics pipelines. Including each analytics pipeline in association with each thread ensures that event data associated with any tenant and to be processed via the thread is processed in a manner desired or specified by the tenant. For instance, event data associated with tenant A may be analyzed via desired analytics via any of threads 702-704.

In accordance with initiating the appropriate analytics pools and analytics pipelines for each thread, incoming event data can be processed via the threads 702-704. In one embodiment, the event data is obtained at a thread, such as thread 702, in real-time for processing via a Pulsar topic 710. A Pulsar topic generally refers to a unit of storage that organizes messages into a stream. In this regard, a set or queue of messages 712 may be provided to a thread in a streaming manner. To this end, event data to be analyzed may be in the form of a message or included in a message. In some cases, the threads may pull or retrieve the messages from the Pulsar topic 710 (e.g., based on processing availability). In other cases, the threads may receive messages, including event data, from the Pulsar topic 710. The messages may be pushed from the Pulsar topic 710 in any number of ways, such as randomly, based on capacity, etc.

Upon a thread, such as thread 702, obtaining a message, an analytics pipeline associated with a tenant is selected based on a tenant associated with the message. For example, assume a message associated with tenant A is obtained at first thread 702. In such a case, analytics pipeline 709-A is identified based on the analytics pipeline being associated with tenant A. The selected analytics pipeline is then used to determine which analytics in the analytics pool 705 to use to execute for data analysis. For example, assume analytics pipeline 709-A is selected for use and that analytics pipeline 709-A indicates analytics $A_1$, $A_2$, and $A_N$ for performing data analytics. In such a case, the analytic $A_1$ is executed to analyze the event data associated with the message. After executing analytic $A_1$, the analytic $A_2$ is executed to analyze the event data associated with the message, followed by execution of analytic $A_N$. In embodiments, as any of the applied analytics identify anomalies or threats, or other triggering data, such data can be provided or output, for example, from the analytics management service for further processing or for display.

Figure 8:
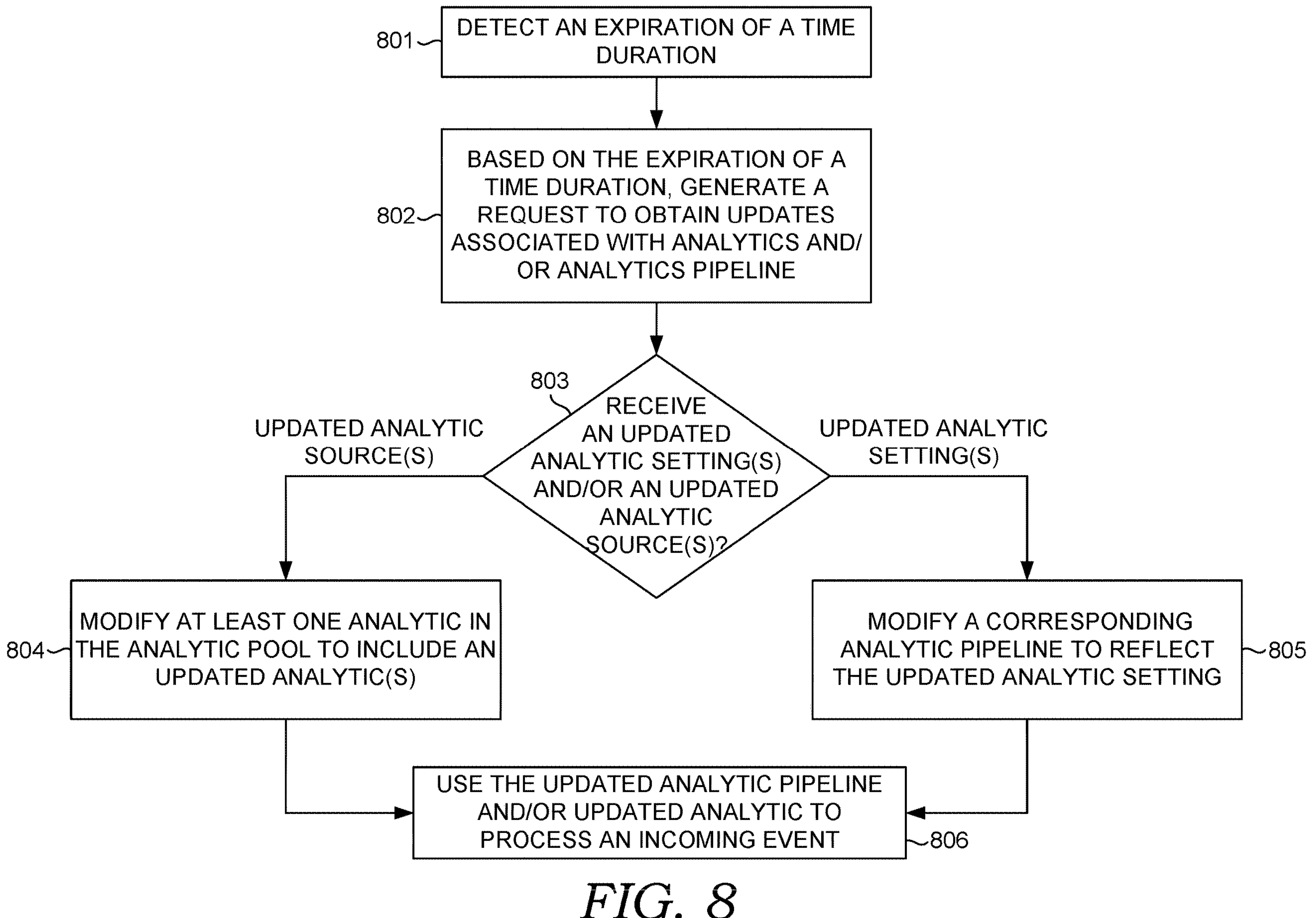
Figure 9:
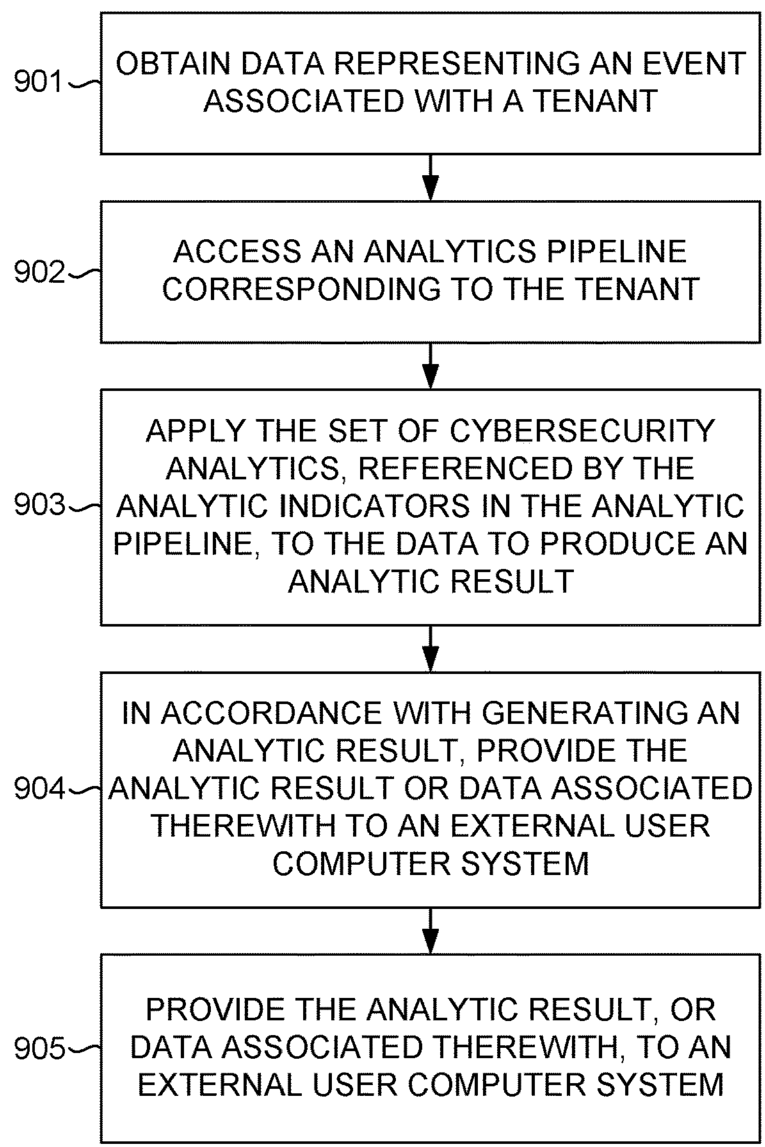

5.2 Methods for Efficient Management of Analytics in an Analytics Management Service Various methods or implementations may be employed to efficiently and effectively manage analytics, in accordance with embodiments provided herein. FIGS. 8-10 provide some examples, but are not intended to be limited herein. The method and ordering of steps or blocks are not intended to be limiting.

With reference to FIG. 8, FIG. 8 illustrates an example of a process that may be performed to facilitate efficient management of analytics in an analytics management service, in accordance with embodiments described herein. In particular, FIG. 8 includes updating analytics and/or analytics pipelines in an efficient manner. In some embodiments, aspects of FIG. 8 may be performed by an analytics management service, such as analytics management service 611 of FIG. 6.

Initially, at block 801, an expiration of a time duration is detected. For example, upon initiating an analytics pool and/or an analytics pipeline, a lapse of a time duration (e.g., two minutes) may be monitored to identify when to initiate data updates.

At block 802, based on the expiration of a time duration, a request to obtain updates associated with analytics and/or analytics pipeline is generated. In one embodiment, the request includes a timestamp associated with a previous request for data updates. In some cases, the request may include an instruction to provide analytic setting updates and/or analytic source updates that have occurred since the previous request (e.g., as identified via a timestamp).

In response to the request, at block 803, an updated analytic setting(s) and/or an updated analytic source(s) is received. In embodiments, updated analytic settings and/or analytic sources may be provided by a tenant management service that manages various analytic settings and analytic sources.

In cases in which an updated analytic source(s) is received, at block 804, at least one analytic in the analytics pool is modified to include an updated analytic(s). In this regard, the updated analytic source(s) may be compiled to generate a new or replacement analytic(s) for the analytics pool. In some cases, such a modification may include adding a new analytic, deleting an analytic, modifying an analytic, or replacing an analytic. In a container-orchestration environment, analytics pools in different threads may be updated accordingly to account for the updated analytic.

In cases in which an updated analytic setting is received, at block 805, a corresponding analytics pipeline is modified to reflect the updated analytic setting. For example, assume a new analytic setting is received associated with a particular tenant (e.g., to enable or disable a particular analytic for the tenant). Based on the new analytic setting, the analytics pipeline associated with the tenant may be modified to reflect the new analytic setting (e.g., adding a new analytic indicator status, modifying an analytic indicator status, etc.).

At block 806, the updated analytics pipeline and/or updated analytic is used to process an incoming event. In this way, as new event data is received, the updated analytics pipeline is used to identify particular analytics to apply to the event data for the tenant and/or an updated analytic is applied to the event data. The result of the analysis may be provided for presentation to a user, used to generate an alert for a user, used to perform further data analysis, etc.

FIG. 9 illustrates an example of a process that may be performed to facilitate efficient management of analytics in an analytics management service, in accordance with embodiments described herein. In particular, FIG. 9 includes executing analytics in an efficient manner. In some embodiments, aspects of FIG. 9 may be performed by an analytics management service, such as analytics management service 611 of FIG. 6.

Initially, at block 901, data representing an event associated with a tenant is obtained. In some cases, such data is obtained in the form of a message from a Pulsar topic.

At block 902, an analytics pipeline corresponding to the tenant is accessed. In embodiments, the analytics pipeline includes a sequence of analytic indicators referencing a set of cybersecurity analytics from among cybersecurity analytics in an analytics pool desired for use in analyzing the data representing the event. For example, various analytics pipelines may correspond with different tenants. Based on the tenant associated with the data, the appropriate analytics pipeline is accessed. The analytics pipeline indicates which analytics (e.g., a first analytic, a second analytic, and a fourth analytic) to use to analyze subsequently received events. In some embodiments, the analytic indicators in the analytics pipeline includes references or points to the corresponding analytics in the analytics pool. In this way, the analytics in the analytics pool are separate from the analytics pipeline that includes indicators or points to analytics in the analytics pool.

At block 903, the set of cybersecurity analytics, referenced by the analytic indicators in the analytics pipeline, are applied to the data to produce an analytic result. As described, in embodiments, each cybersecurity analytic in the analytics pool is configured to detect a different cybersecurity-related anomaly or threat. Each cybersecurity analytic applied to the data is based on the analytic indicators in the analytics pipeline indicating the particular analytics to apply and an order in which to apply them.

At block 904, in accordance with generating an analytic result, the analytic result or data associated therewith is provided to an external user computer system. The analytic result may include any number of indications of anomalies or threats. For example, in some cases, the analytic result may include an anomaly or threat generated via a particular cybersecurity analytic. In other cases, the analytic result may include an aggregate of anomalies or threats generated via multiple cybersecurity analytics. For instance, assume a first analytic detected a first anomaly and a second analytic detected a second anomaly. In such a case, the anomalies may be aggregated as an analytic result.

At block 905, the analytic result, or data associated therewith, is provided to an external user computer system. For example, the analytic result may be provided for display to a user. In some cases, the analytic result is used to perform further data analysis or to generate an alert, either of which may be provided to another computer, such as an external user computer system. In some embodiments, the analytic result, or data associated therewith, is communicated to a subsequent Pulsar topic, or other distributed messaging system, for a subsequent data streaming process to be performed.

Figure 10A:
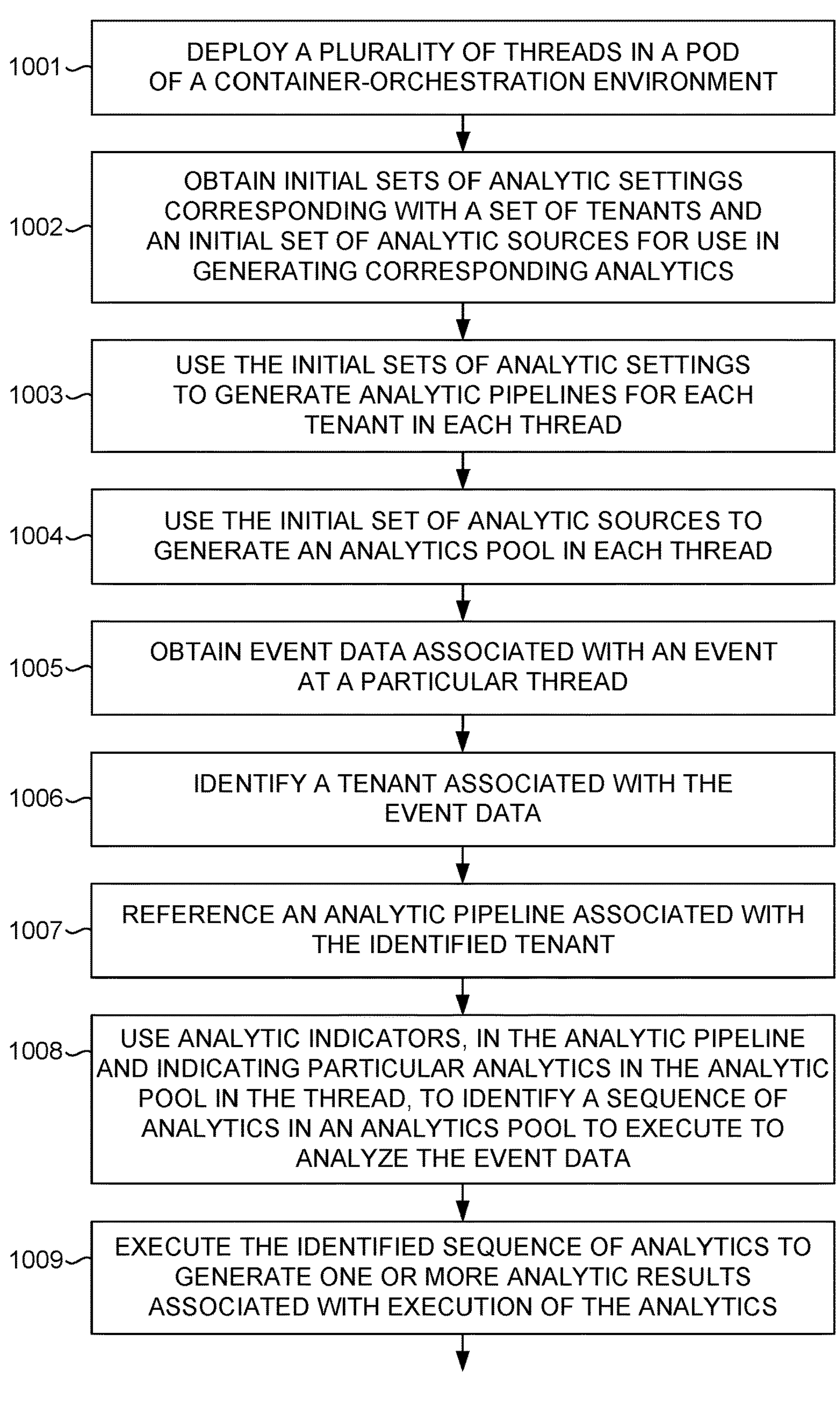
FIGS. 10A-10B provide another example of a process that may be performed to facilitate efficient management of analytics in an analytics management service, in accordance with embodiments described herein.
Figure 10B:
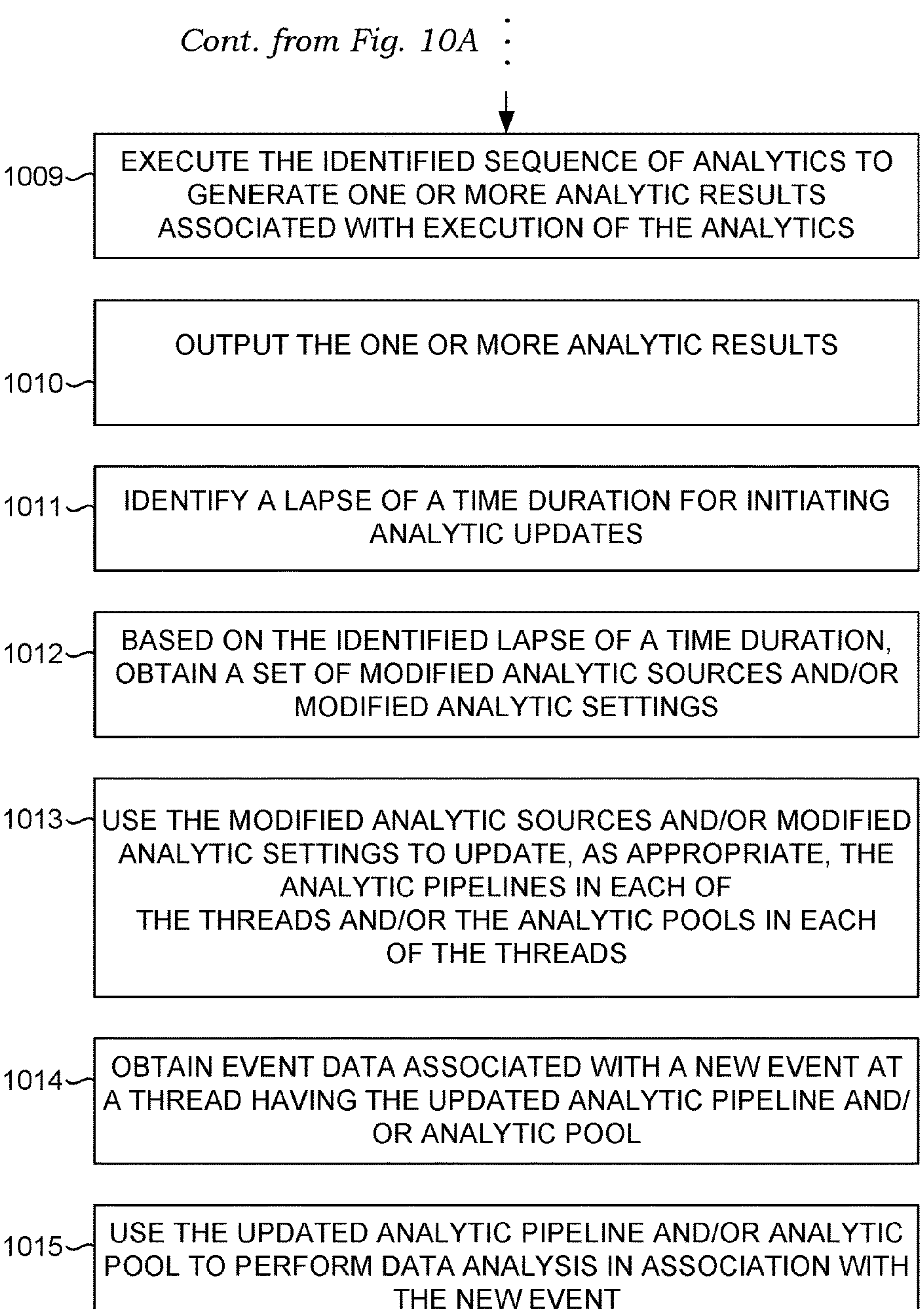

Turning to FIGS. 10A-10B, FIGS. 10A-10B illustrates an example of a process that may be performed to facilitate efficient management of analytics in an analytics management service, in accordance with embodiments described herein. In particular, FIGS. 10A-10B includes updating and executing analytics in an efficient manner in a container-orchestration environment. In some embodiments, aspects of FIGS. 10A-10B may be performed by an analytics management service, such as analytics management service 611 of FIG. 6.

Initially, at block 1001, a plurality of threads are deployed in a pod of a container-orchestration environment. For example, in accordance with deploying a pod to facilitate execution of analytics, a plurality of threads are deployed. The particular number of threads deployed may be a predetermined number (e.g., three threads per pod).

At block 1002, initial sets of analytic settings corresponding with a set of tenants is obtained, and an initial set of analytic sources for use in generating corresponding analytics is obtained. The analytic settings and/or analytic sources may be obtained via a tenant management service that provides the analytic settings and/or analytic sources to the analytics management service upon request.

At block 1003, the initial sets of analytic settings are used to generate analytics pipelines for each tenant in each thread. For example, assuming three sets of analytic settings are obtained in association with three tenants, three different analytics pipelines are generated for one thread and the three analytics pipelines are duplicated in the other two threads, resulting in three sets of three analytics pipelines (with one set in each thread).

At block 1004, the initial set of analytic sources is used to generate an analytics pool in each thread. As described herein, the analytics pool available in each thread is accessible for performing data analysis in association with various tenants.

At block 1005, event data associated with an event is obtained at a particular thread. Event data may be obtained, for example, via a distributed messaging service, such as Pulsar topic. At block 1006, a tenant associated with the event data is identified.

In accordance with identifying the tenant associated with the event data, at block 1007, an analytics pipeline associated with the identified tenant is referenced. For example, each analytics pipeline in a thread may correspond to a different tenant to represent desired analytics to use for data processing performed in association with the corresponding tenant.

At block 1008, analytic indicators, in the analytics pipeline and indicating particular analytics in the analytics pool in the thread, are used to identify a sequence of analytics in an analytics pool to execute to analyze the event data. Thereafter, at block 1009, the identified sequence of analytics is executed to generate one or more analytic results associated with execution of the analytics. The one or more analytic results are output at block 1010, for example, for display at a device, for further analysis, for generating an alert, etc.

At block 1011, a lapse of a time duration for initiating analytic updates is identified. For instance, a lapse of two minutes may be identified. Based on the identified lapse of a time duration, at block 1012, a set of modified analytic sources and/or modified analytic settings are obtained. In some cases, the modified analytic sources and/or modified analytic settings are obtained from a tenant management service based on a request to the tenant management service to provide such modified data. In embodiments, only data associated with the modified analytic sources and/or modified analytic settings are obtained, thereby reducing computer resource utilization.

At block 1013, the modified analytic sources and/or modified analytic settings are used to update, as appropriate, the analytics pipelines in each of the threads and/or the analytics pools in each of the threads. For example, assume an analytic setting associated with a particular tenant is obtained. In such a case, the analytics pipeline associated with that particular tenant is updated in each of the three threads.

At block 1014, event data associated with a new event is obtained at a thread having the updated analytics pipeline and/or analytics pool. As such, the updated analytics pipeline and/or analytics pool is used to perform data analysis in association with the new event, as indicated at block 1015.

6.0. Terminology

Computer programs typically comprise one or more instructions set at various times in various memory devices of a computing device, which, when read and executed by at least one processor, will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. Furthermore, use of "e.g.," is to be interpreted as providing a non-limiting example and does not imply that two things are identical or necessarily equate to each other.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrase "at least one of X, Y or Z" as used in general is to convey that an item, term, etc. may be either X, Y or Z, or any combination thereof.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data-processing apparatus to produce a machine, such that the instructions, which execute via the processor(s) of the computer or other programmable data-processing apparatus, create means for implementing the acts specified in the flow chart and/or block diagram block or blocks. These computer program instructions may also be stored in a non-transitory computer-readable memory that can direct a computer or other programmable data-processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data-processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further implementations of the disclosure. These and other changes can be made to the disclosure in light of the above Detailed Description. While the above description describes certain examples of the disclosure, and describes the best mode contemplated, no matter how detailed the above appears in text, the disclosure can be practiced in many ways. Details of the system may vary considerably in its specific implementation, while still being encompassed by the disclosure disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific examples disclosed in the specification, unless the above Detailed Description section explicitly defines such terms. Accordingly, the actual scope of the disclosure encompasses not only the disclosed examples, but also all equivalent ways of practicing or implementing the disclosure under the claims.

To reduce the number of claims, certain aspects of the disclosure are presented below in certain claim forms, but the applicant contemplates other aspects of the disclosure in any number of claim forms. For example, while only one aspect of the disclosure is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A computer-implemented method, comprising:

obtaining, by a first computer system, data representing an event associated with a tenant;

identifying an analytics pipeline corresponding to the tenant from among a set of analytics pipelines, each analytics pipeline of the set of analytics pipelines corresponding with a particular tenant of a plurality of tenants;

accessing, by the first computer system, the analytics pipeline corresponding to the tenant, the analytics pipeline including a sequence of analytic indicators referencing a set of cybersecurity analytics, from among cybersecurity analytics in an analytics pool, desired for use in analyzing the data representing the event, wherein the cybersecurity analytics in the analytics pool are available for use by the plurality of tenants;

applying, by the first computer system, the set of cybersecurity analytics from the analytics pool available to the plurality of tenants, referenced by the analytic indicators in the analytics pipeline, to the data to produce an analytic result, wherein each cybersecurity analytic in the analytics pool is configured to detect a cybersecurity-related anomaly or threat; and providing, by the first computer system, the analytic result, or first data associated therewith, to an external user computer system.

2. The computer-implemented method of claim 1, wherein the data is obtained via a distributed messaging system.

3. The computer-implemented method of claim 1, wherein the analytics pipeline is identified based on identifying the tenant associated with the data representing the event.

4. The computer-implemented method of claim 1, wherein the cybersecurity analytics in the analytics pool comprise each analytic available for use by the plurality of tenants.

5. The computer-implemented method of claim 1 further comprising:

obtaining, by the first computer system, new data representing a new event associated with a second tenant;

accessing, by the first computer system, a second analytics pipeline corresponding to the second tenant, the second analytics pipeline including a second sequence of analytic indicators referencing a second set of cybersecurity analytics, from among the cybersecurity analytics in the analytics pool, desired for use in analyzing the new data representing the new event;

applying, by the first computer system, the second set of cybersecurity analytics, referenced by the second sequence of analytic indicators in the second analytics pipeline, to the new data representing the new event to produce a second analytic result; and providing, by the first computer system, the second analytic result, or second data associated therewith, to a second external user computer system.

6. The computer-implemented method of claim 1, wherein a first thread associated with a pod of a container-orchestration environment includes the set of analytics pipelines corresponding to the plurality of tenants, wherein the set of analytics pipelines includes the analytics pipeline corresponding to the tenant, and the first thread further includes the analytics pool including the cybersecurity analytics available for use in association with any of the plurality of tenants.

7. The computer-implemented method of claim 6, wherein a second thread associated with the pod of the container-orchestration environment includes the set of analytics pipelines corresponding to the plurality of tenants, and the second thread further includes the analytics pool including the cybersecurity analytics available for use in association with any of the plurality of tenants.

8. The computer-implemented method of claim 1 further comprising generating the analytics pipeline corresponding to the tenant by:

obtaining analytic settings associated with the tenant, the analytic settings indicating enabled analytic indicators and disabled analytic indicators; and using the analytic settings associated with the tenant to generate the analytics pipeline corresponding to the tenant.

9. The computer-implemented method of claim 1 further comprising generating the analytics pool by:

obtaining analytic sources corresponding with the cybersecurity analytics;

using the analytic sources to generate the cybersecurity analytics by compiling source code of the analytic sources.

10. The computer-implemented method of claim 1 further comprising updating the analytics pipeline corresponding to the tenant by:

obtaining at least one updated analytic setting associated with the tenant; and using the at least one updated analytic setting associated with the tenant to update the analytics pipeline corresponding to the tenant.

11. The computer-implemented method of claim 10, wherein updating the analytics pipeline comprises adding a new analytic, deleting an existing analytic, or modifying the existing analytic.

12. The computer-implemented method of claim 10, wherein the at least one updated analytic setting is obtained from a tenant management service that manages analytic settings.

13. The computer-implemented method of claim 12, wherein the at least one updated analytic setting is provided by the tenant management service upon a lapse of a time duration.

14. The computer-implemented method of claim 1 further comprising updating the analytics pool by:

obtaining at least one updated analytic source; and using the at least one updated analytic source to update the analytics pool.

15. The computer-implemented method of claim 14, wherein the at least one updated analytic source is obtained from a tenant management service upon a lapse of a time duration.

16. A computing device, comprising:

a processor; and a non-transitory computer-readable medium having instructions stored thereon that, when executed by the processor, cause the processor to perform operations including:

obtaining, by a first computer system, data representing an event associated with a tenant;

identifying an analytics pipeline corresponding to the tenant from among a set of analytics pipelines, each analytics pipeline of the set of analytics pipelines corresponding with a particular tenant of a plurality of tenants;

accessing, by the first computer system, the analytics pipeline corresponding to the tenant, the analytics pipeline including a sequence of analytic indicators referencing a set of cybersecurity analytics, from among cybersecurity analytics in an analytics pool, desired for use in analyzing the data representing the event, wherein the cybersecurity analytics in the analytics pool are available for use by the plurality of tenants;

applying, by the first computer system, the set of cybersecurity analytics from the analytics pool available to the plurality of tenants, referenced by the analytic indicators in the analytics pipeline, to the data to produce an analytic result, wherein each cybersecurity analytic in the analytics pool is configured to detect a cybersecurity-related anomaly or threat; and providing, by the first computer system, the analytic result, or first data associated therewith, to an external user computer system.

17. The computing device of claim 16, wherein the operations further comprise:

obtaining analytic settings associated with the tenant, the analytic settings indicating enabled analytic indicators and disabled analytic indicators; and using the analytic settings associated with the tenant to generate the analytics pipeline corresponding to the tenant.

18. A non-transitory computer-readable medium having stored instructions thereon that, when executed by one or more processors, cause the one or more processors to perform operations including:

obtaining, by a first computer system, data representing an event associated with a tenant;

identifying an analytics pipeline corresponding to the tenant from among a set of analytics pipelines, each analytics pipeline of the set of analytics pipelines corresponding with a particular tenant of a plurality of tenants;

accessing, by the first computer system, the analytics pipeline corresponding to the tenant, the analytics pipeline including a sequence of analytic indicators referencing a set of cybersecurity analytics, from among cybersecurity analytics in an analytics pool, desired for use in analyzing the data representing the event, wherein the cybersecurity analytics in the analytics pool are available for use by the plurality of tenants;

applying, by the first computer system, the set of cybersecurity analytics from the analytics pool available to the plurality of tenants, referenced by the analytic indicators in the analytics pipeline, to the data to produce an analytic result, wherein each cybersecurity analytic in the analytics pool is configured to detect a cybersecurity-related anomaly or threat; and providing, by the first computer system, the analytic result, or first data associated therewith, to an external user computer system.

19. The medium of claim 18, wherein the operations further comprise:

obtaining at least one updated analytic source or at least one updated analytic setting; and using the at least one updated analytic source to update the analytics pool or the at least one updated analytic setting to update the analytics pipeline.

20. The medium of claim 19, wherein only the at least one updated analytic source or the at least one updated analytic setting is obtained from a tenant management service upon a lapse of a time duration or based on a timestamp indicating a time associated with a previous update.

* * * * *